United States Patent
Conti et al.

(10) Patent No.: US 7,539,308 B2
(45) Date of Patent: May 26, 2009

(54) QUANTUM STEGANOGRAPHY

(75) Inventors: Ralph S. Conti, Ypsilanti, MI (US);
Kenneth A. Augustyn, Plymouth, MI (US); Keith Kastella, Gregory, MI (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 1038 days.

(21) Appl. No.: 10/849,789

(22) Filed: May 21, 2004

(65) Prior Publication Data

US 2004/0258421 A1 Dec. 23, 2004

Related U.S. Application Data

(60) Provisional application No. 60/472,731, filed on May 23, 2003, provisional application No. 60/529,743, filed on Dec. 17, 2003.

(51) Int. Cl.
*H04K 1/00* (2006.01)
(52) U.S. Cl. ...................................... 380/256
(58) Field of Classification Search ................ 380/255, 380/56; 356/73.1; 398/140, 182, 202
See application file for complete search history.

(56) References Cited

U.S. PATENT DOCUMENTS

| | | | |
|---|---|---|---|
| 4,225,938 A | 9/1980 | Turpin | |
| 4,286,328 A | 8/1981 | Bocker | |
| 4,369,363 A | 1/1983 | Quint et al. | |
| 4,468,093 A | 8/1984 | Brown | |
| 4,633,427 A | 12/1986 | Bocker | |
| 5,339,182 A | 8/1994 | Kimble et al. | |
| 5,420,905 A | 5/1995 | Bertozzi | |
| 5,515,438 A | 5/1996 | Bennett et al. | |
| 5,796,477 A * | 8/1998 | Teich et al. | ............. 356/318 |
| 5,917,322 A | 6/1999 | Gershenfeld et al. | |

(Continued)

FOREIGN PATENT DOCUMENTS

EP 1091240 4/2001

(Continued)

OTHER PUBLICATIONS

Strekalov et al., Two-photon processes in faint biphoton fields, pp. 1-18, downloaded Mar. 9, 2005, http://arxiv.org.

(Continued)

*Primary Examiner*—Emmanuel L Moise
*Assistant Examiner*—Ali S Abyaneh
(74) *Attorney, Agent, or Firm*—Hunton & Williams LLP

(57) ABSTRACT

A system and method of detecting entangled photon pairs, each pair including a signal photon and an idler photon, is disclosed. Entangled photon pairs are provided having an entanglement time and an entanglement area selected to substantially increase an associated entangled two-photon cross-section of an associated target medium. The entangled photon pairs are also selected to have an energy distribution between the signal photon and the idler photon to substantially decrease an associated random two-photon absorption cross section of the target medium. The entangled photon pairs are directed to the target medium, and at least one entangled-photon pair being absorbed by the target medium is detected. The techniques for detecting entangled photons may be adapted to accommodate hiding information in entangled photons. That is, these techniques may be used for quantum steganography.

37 Claims, 29 Drawing Sheets

U.S. PATENT DOCUMENTS

| | | | |
|---|---|---|---|
| 6,057,541 | A | 5/2000 | Steenblik |
| 6,252,665 | B1 | 6/2001 | Williams et al. |
| 6,272,224 | B1 | 8/2001 | Mazourenko et al. |
| 6,289,104 | B1 | 9/2001 | Patterson et al. |
| 6,314,189 | B1 | 11/2001 | Motoyoshi et al. |
| 6,424,665 | B1 | 7/2002 | Kwiat et al. |
| 6,430,345 | B1 | 8/2002 | Dultz et al. |
| 6,444,999 | B1 | 9/2002 | Tomita |
| 6,473,719 | B1 | 10/2002 | Steenblik |
| 6,480,283 | B1 | 11/2002 | Williams et al. |
| 6,522,749 | B2 * | 2/2003 | Wang .................... 380/263 |
| 6,646,727 | B2 | 11/2003 | Saleh et al. |
| 6,678,054 | B1 | 1/2004 | Dress et al. |
| 2002/0018290 | A1 | 2/2002 | Birk et al. |
| 2002/0020819 | A1 | 2/2002 | Wolleschensky et al. |
| 2002/0036775 | A1 | 3/2002 | Wolleschensky et al. |
| 2002/0093632 | A1 | 7/2002 | Teich et al. |
| 2002/0097874 | A1 | 7/2002 | Foden et al. |
| 2002/0109840 | A1 | 8/2002 | Wolleschensky et al. |
| 2002/0140941 | A1 | 10/2002 | Pedigo |
| 2003/0002670 | A1 | 1/2003 | Wang |
| 2003/0086138 | A1 | 5/2003 | Pittman et al. |
| 2004/0036877 | A1 | 2/2004 | Sergienko et al. |
| 2004/0208638 | A1 * | 10/2004 | Jansen .................... 398/183 |
| 2005/0094818 | A1 | 5/2005 | Inoue et al. |

FOREIGN PATENT DOCUMENTS

| | | |
|---|---|---|
| WO | WO 02/45468 A2 | 6/2002 |
| WO | WO 03/019282 A2 | 3/2003 |
| WO | WO 03/019283 A2 | 3/2003 |
| WO | WO 03/019284 A2 | 3/2003 |

OTHER PUBLICATIONS

Santos et al., Measurement of the degree of polarization entanglement through position interference, Physical Review A, vol. 64, 023804, 2001, 6 pages.
Enzer et al., Entangled-photon six-state quantum cryptography, New Journal of Physics 4 (2002) 45.1-45.8.
Gatti et al., Multi-photon, multi-mode polarization entanglement in parametric down-conversion, pp. 1-22 (download date unknown), http://arxiv.org.
Bouwmeester et al., Experimental quantum teleportation, Nature, vol. 390, Dec. 11, 1997, pp. 575-579.
Sciarrino et al., Delayed-choice entanglement swapping with vacuum-one-photon quantum states, Physical Review A, 66, 024309 (2002).
Sergienko et al., Quantum cryptography with femtosecond parametric down conversion, Quantum Imaging Laboratory, pp. 1-8.
Altepeter et al., Ancilla-assisted quantum process tomography, Physical Review Letters, vol. 90, No. 19, May 16, 2003, 193601-to 193601-4.
Oneil, Quantum information studies, Department of Experimental Physics, {http://www.may.ie/academic/physics/quantum.shtml}, printed Feb. 25, 2004, 2 pages.
Giacomini et al., Active teleportation of a quantum bit, Physical Review A, 66, 030302(R) (2000).
Jost et al., Spatial correlations of spontaneously down-converted photon pairs detected with a single-photon-sensitive CCD camera, Opticas Express 81, Jul. 20, 1998, vol. 3, No. 2.
Caetano et al., Quantum image control through polarization entanglement in parametric down-conversion, Physical Review A 68, 023805 (2003).
Barbosa, Twin photons entangled in polarization and angular momentum, Eur. Phys. J. D22, 433-440 (2003).
Ribeiro et al., Image and coherence transfer in the stimulated down-conversion process, Physical Review A, vol. 60, No. 6, Dec. 1999, 5074-5078.
Monken et al., Transfer of angular spectrum and image formation in spontaneous parametric down-conversion, Physical Review A, vol. 57, No. 4, Apr. 1998, 3123-3126.
Ribeiro et al., Observation of image transfer and phase conjugation in stimulated down-conversion, Physical Review Letters, vol. 87, No. 13, Sep. 24, 2001, 133602-1 to 133602-4.
Fonseca et al., Quantum interference by a nonlocal double slit, Physical Review A, vol. 60, No. 2, Aug. 1999, 1530-1533.
Atature et al., Entanglement in cascaded-crsytal parametric down-conversion, Physical Review Letters, vol. 86, No. 18, Apr. 30, 2001, 4013-4016.
White et al., Nonmaximally entangled states: production, characterization, and utilization, Physical Review Letters, vol. 83, No. 16, Oct. 18, 1999, 3103-3107.
Kwiat et al., Ultrabright source of polarization-entangled photons, Physical Review A, vol. 60, No. 2, Aug. 1999, 773-776.
Kwiat et al., Experimental entanglement distillation and "hidden" non-locality, Letter to Nature, 1014-1017, 2001.
Grover, Quantum computers can search arbitrarily large databases by a single query, Physical Review Letters vol. 79, No. 23, Dec. 8, 1997, 4709-4712.
Berthiaume et al., The quantum challenge to structural complexity theory, 132-137.
Ekert et al., Quantum computation and Shor's factoring algorithm, Reviews of Modern Physics, vol. 68, No. 3, Jul. 1996, 733-753.
Blum, Density matrix theory and applications, 1-217, 1981.
Zhang et al., Experimental and theoretical aspects of quantum teleportation, Center for Engineering Science Advanced Research, 9 pages.
Abouraddy et al., Degree of entanglement for two qubits, Physical Review A, vol. 64, 050101-1 to 050101-4.
Semat et al., Introduction to Atomic and Nuclear Physics, Fifth Edition, Chp. 7, Elements of quantum mechanics, 186-215.
Ekert, Quantum cryptography based on Bell's theorem, Physical Review Letters, vol. 67, No. 6, Aug. 5, 1991, 661-663.
Schenker, A quantum leap in codes for secure transmissions, International Herald Tribune, printed Apr. 12, 2004, {http://www.iht.com/articles/126822.html}, 3 pages.
Johnson, Magiq employs quantum technology for secure encryption, Advanced Technology, printed Apr. 12, 2004 {http://www.eetimes.com/at/news/OEG20021105S0019}, 3 pages.
McCulagh, Start-up makes quantum leap into cryptography, C/NET News.com, printed Apr. 12, 2004, {http://news.com.com/2100-1029-5103373.html}, 3 pages.
Scully et al., Two-photon scheme for detecting the Bell basis using atomic coherence, Physical Review Letters, vol. 83, No. 21, Nov. 22, 1999, 4433-4436.
Braunstein et al., Dense coding for continuous variables, Physical Review A, vol. 61, 042302-1 to 04302-4.
Santos et al., Measurement of the degree of polarization entanglement through position interference, Physical Review A, vol. 64, 023804-1 to 023804-6.
Saleh et al., Entangled-photon virtual-state spectroscopy, Physical Review Letters, vol. 80, No. 16, Apr. 20, 1998, 3483-3486.
Oberparleiter et al., Optics Communications, 183 (2000) 133-137.
Georgiades et al., Nonclassical excitation for atoms in a squeezed vacuum, Physical Review Letters, vol. 75, No. 19, Nov. 6, 1995, 3426-3429.
Joobeur et al., Spatiotemporal coherence properties of entangled light beams generated by parametric down-conversion, Physical Review A, vol. 50, No. 4, Oct. 1994, 3349-3361.
Nasr et al., Biphoton focusing for two-photon excitation, Physical Review A, vol. 65, 023816-1 to 023816-6.
Abouraddy et al., Role of entanglement in two-photon imaging, Physical Review Letters, vol. 87, No. 12, Sep. 17, 2001, 123602-1 to 123602-4.
Boeuf et al., Calculating characteristics of non-collinear phase-matching in uniaxial biaxial crystals, Optical Technology Division, pp. 1-24.
Abouraddy et al., Double-slit interference on biphotons generated in spontaneous parametric downconversion from a thick crystal, Journal of Optics B: Quantum and Semiclassical Optics 3, 2001, S50-S54.
Kwiat et al., Experimental verification of decoherence-free subspaces, Science, vol. 290, Oct. 20, 2000, 498-500.

Naik et al., Entangled state quantum cryptography: eavesdropping on the Eckert protocol, Physical Review Letters, vol. 84, No. 20, May 15, 2000, 4733-4736.

Yabushita et al., Spectroscopy by frequency entangled photon pairs, pp. 1-11 (download date unknown), http://arxiv.org.

Perina et al., Multiphoton absorption cross section and virtual-state spectroscopy for the entangled $n$-photon state, Physical Review A, vol. 57, No. 5, May 1998, pp. 3972-3986.

Fei et al., Entangled-induced two-photon transparency, Physical Review Letters, vol. 78, No. 9, Mar. 3, 1997, pp. 1679-1682.

Yabushita et al., Spectroscopy by frequency entangled photon pairs, Physical Review A 69. 013806-1-013806-4 (2004).

Kurtsiefer et al., High-efficiency entangled photon pair collection in type-II parametric fluorescence, Physical Review A, vol. 64, 023802-1 to 023802-4.

Jost et al., Spatial correlations of spontaneously down-converted photon pairs detected with a single-photon-sensitive CCD camera, Optics Express, Jul. 20, 1998, vol. 3, No. 2, pp. 81-88.

Almeida et al., Transmission of quantum images through long distances, pp. 1-4, (download date unknown), http://arxiv.org.

Caetano et al., Quantum Physics, Abstract, Image formation by manipulation of the entangled angular spectrum, pp. 1-5, (download date unknown), http://arxiv.org.

Zavatta, Premio Italgas/Italgas Prize Energy and Environment 16th Edition, Summary of the Thesis "Debut in the World of Research".

Rubin et al., Theory two-photon entanglement in type-II optical parametric down-conversion, Physical Review A, vol. 50, No. 6, Dec. 1994, pp. 5122-5133.

Rarity et al., Experimental demonstration of single photon rangefinding using parametric downconversion, Applied Optics, vol. 29, No. 19, Jul. 1, 1990, pp. 2939-2943.

Waks et al., Security of quantum key distribution with entangled photons against individual attacks, Physical Review A, vol. 65, 052310-1 to 052310-16, 2002.

Ribeiro et al., Observation of image transfer and phase conjugation in stimulated down-conversion, pp. 1-6, (download date unknown), http://arxiv.org.

Caetano et al., Image-polarization entanglement in parametric down-conversion, 4 pages.

Ribeiro et al., Image and coherence transfer in the stimulated down-conversion process, pp. 1-5, (download date unknown), http://arxiv.org.

Caetano et al., Quantum distillation of position entanglement with the polarization degrees of freedom, ScienceDirect, Optics Communications, Mar. 3, 2004, (www.sciencedirect.com/science).

* cited by examiner

QUANTUM STEGANOGRAPHY

CROSS-REFERENCE TO RELATED APPLICATIONS

The present application claims priority to U.S. Provisional Patent Application Ser. No. 60/472,731 filed May 23, 2003, entitled "System and Method of Detecting Entangled Photons," to Kastella et al., the disclosure of which is expressly incorporated by reference herein in its entirety, and to U.S. Provisional Patent Application Ser. No. 60/529,743 filed Dec. 17, 2003, entitled "Secure Quantum Key Distribution Using Entangled Photons," to Conti et al., the disclosure of which is expressly incorporated by reference in its entirety.

BACKGROUND OF THE INVENTION

1. Field of the Invention

The invention relates to detecting entangled photons. In particular, the invention relates to discrimination between entangled photons and non-entangled photons.

2. Discussion of Background Information

Multiple photons may be random or entangled. Random photons are not entangled together and exist as independent entities. In contrast, entangled photons have a connection between their respective properties. Measuring properties of one or more photons in a set of multiply-entangled photons determines properties of the rest of the photons in the set. As understood by those of ordinary skill in the art and by way of non-limiting example, the quantum mechanical state of a set of n>2 multiply-entangled photons cannot be factored into a tensor product of n separate states.

Two photons entangled together are referred to as an entangled-photon pair (also, "biphotons"). Traditionally, photons comprising an entangled-photon pair are called "signal" and "idler" photons, where the signal photon has higher energy. Measuring properties of one photon of an entangled-photon pair determines properties of the other photon, even if the two entangled photons are separated by a distance. As understood by those of ordinary skill in the art and by way of non-limiting example, the quantum mechanical state of an entangled-photon pair cannot be factored into a tensor product of two individual quantum states.

Existing techniques for detecting entangled-photon pairs rely on single-photon counting to detect individual photons that form an entangled pair. These techniques use standard electronic devices to detect and correlate individual photons. Two photons detected in a short temporal interval may indicate that the photons form an entangled-photon pair. The entangled-pair count rate of existing techniques is limited by the speed of photon counting and correlating electronics. In particular, electronics overload limits the intensity of entangled beams that can be considered.

SUMMARY OF THE INVENTION

Because existing techniques can detect entangled photons only in low intensity beams, collection times are long. Moreover, because existing techniques require electronic devices to detect entangled-photon pairs, high-intensity beams of entangled photons cannot readily be used in applications such as entangled beam photo-lithography or entangled beam confocal microscopy.

It is therefore an object of the present invention to detect entangled photons. It is further an object of the present invention to detect entangled photons with a high detection rate. It is also an object of the present invention to detect entangled photons while avoiding detecting non-entangled photons.

According to an embodiment of the invention, a method of detecting entangled-photon pairs is provided, where each entangled-photon pair comprises a signal photon and an idler photon. The method includes providing entangled-photon pairs, at least a first portion of the entangled-photon pairs having an entanglement time and an entanglement area to substantially increase an associated entangled two-photon cross-section of an associated target medium. At least a second portion of the entangled-photon pairs are ensured as having an energy distribution between the signal photon and the idler photon to substantially decrease an associated random two-photon absorption cross section of the target medium. Photons included in the first portion and the second portion are directed to the target medium. At least one entangled-photon pair being absorbed by the target medium is detected.

According to another embodiment on the invention, a method of detecting entangled-photon pairs is provided, where each entangled-photon pair comprises a signal photon and an idler photon. A target medium is supplied. Entangled-photon pairs are received, at least a portion of the entangled-photon pairs being configured to have an entanglement time or an entanglement area to substantially maximize an associated entangled photon cross-section of the medium. The entangled photon pairs also have an energy distribution among the signal photon and the idler photon in each pair to substantially minimize an associated random two-photon absorption cross section of the medium. At least one entangled-photon pair absorption by the medium is detected.

According to another embodiment of the invention, a method of providing entangled-photon pairs having a large entangled-photon pair cross section and a small random photon pair cross section is provided. Entangled photon pairs are provided having at least one of: an entanglement time to substantially maximize an associated entangled photon cross-section for a predetermined target medium, and an entanglement area to substantially maximize an associated entangled photon cross-section for a pre-determined target medium. Entangled-photon pairs are selected having an energy distribution among a signal photon and an idler photon to substantially minimize an associated random photon pair absorption cross section of the target medium. The entangled photons are sent to a receiver configured to cause at least a portion of the entangled photons to come into contact with the target medium.

According to another embodiment of the invention, a method of detecting entangled photons is provided. Entangled photons tailored for entangled photon absorption by a corresponding target medium are produced. The entangled photons are conditioned to reduce random multi-photon absorption by the target medium. The entangled photons are directed to the target medium. At least one entangled-photon absorption by the target medium is detected.

According to another embodiment of the invention, a method of providing entangled photons having high entangled-photon absorption and low random multi-photon absorption for a corresponding target medium is provided. Entangled photons tailored for entangled photon absorption by the target medium are produced. The entangled photons are conditioned to reduce random multi-photon absorption by the target medium. The entangled photons are sent to a receiver configured to cause at least a portion of the entangled photons to come into contact with the target medium.

According to another embodiment of the invention, a method of detecting entangled photons is provided.

Entangled photons tailored for entangled-photon absorption by a corresponding target medium are received. These received entangled photons are conditioned to reduce random multi-photon absorption by the target medium. The entangled photons are caused to come into contact with the target medium. At least one entangled-photon absorption by the target medium is detected.

According to another embodiment of the invention, a system for detecting entangled photons is provided. The system includes an entangled photon source configured to produce entangled photons tailored for entangled-photon absorption by a corresponding target medium. The system also includes a screen configured to pass entangled photons having an energy distribution selected to reduce random multi-photon absorption by the target medium and a sensor configured to detect entangled-photon absorption by the target medium.

According to another embodiment of the invention, a system for producing entangled photons having high entangled-photon absorption and low random multi-photon absorption for a particular target medium is provided. The system includes an entangled photons source configured for producing entangled photons tailored for entangled-photon absorption by the target medium. The system also includes a screen configured to pass entangled-photon pairs having an energy distribution selected to reduce random photon absorption by the target medium.

According to another embodiment of the invention, a system for detecting entangled photons is provided. The system includes a target medium configured to absorb entangled photons tailored for entangled-photon absorption by the target medium, the entangled photons being conditioned to reduce random photon absorption by the target medium. The system also includes a sensor configured to detect at least one entangled photon absorption by the target medium.

According to another embodiment of the invention, a method of detecting entangled photons is provided. Entangled photons having properties suitable for entangled-photon absorption by a corresponding target medium are produced. The entangled photons are directed to the target medium. At least one entangled-photon absorption by the target medium is detected.

According to another embodiment of the invention, a method of providing entangled photons having a high entangled-photon absorption rate is provided. Entangled photons having properties suitable for entangled photon absorption by a corresponding target medium are produced. The entangled photons are sent to a receiver configured to cause at least a portion of the entangled photons to come into contact with the medium.

According to another embodiment of the invention, a method of detecting entangled photons is provided. Entangled photons having properties suitable for entangled-photon absorption by a corresponding target medium are received. The entangled photons are caused to come into contact with the target medium. At least one entangled-photon absorption by the target medium is detected.

According to another embodiment of the invention, a system for detecting entangled photons is provided. The system includes an entangled photon source configured to produce entangled photons having properties suitable for entangled-photon absorption by a corresponding target medium and a sensor configured to detect entangled-photon absorption by the target medium.

According to another embodiment of the invention, a system for producing entangled photons having high entangled-photon absorption is provided. The system includes an entangled photon source configured for producing entangled photons having properties suitable for entangled-photon absorption by a corresponding target medium.

According to another embodiment of the invention, a system for detecting entangled photos is provided. The system includes a target medium configured to absorb entangled photons having properties suitable for entangled-photon absorption by the target medium. The system also includes a sensor configured to detect entangled photon absorption by the target medium.

According to another embodiment of the invention, a method of detecting at least one bit of information manifested on entangled photons is provided. The method includes producing entangled photons and modulating at least one bit of information onto at least one entangled photon parameter to produce modulated entangled photons. The modulated entangled photons are transmitting, and at least a portion of the modulated entangled photons are received. A value of the at least one entangled photon parameter is detected in at least one set of entangled photons received by the receiving. The at least one bit of information is discerned based on the detecting.

Various optional and preferable features of the above embodiment include the following. The entangled photons may include a first photon and a second photon, the first photon being entangled with the second photon. The at least one entangled photon parameter may be one of: a delay between the first photon and the second photon, an entanglement time, relative frequencies of the first photon and the second photon, a polarization of the first photon and the second photon, a sum of frequencies of the first photon and the second photon, a location of the first photon relative to the second photon, and a momentum of the first photon and the second photon. The detecting may comprise detecting an entangled photon absorption by a material configured to absorb entangled photons and be substantially transparent to random photons. The detecting may comprise detecting an entangled photon absorption by a biological material. The transmitting may comprise transmitting a plurality of random photons. The plurality of random photons may comprise a plurality of random photons intended to provide one of: obfuscatory light, reverse obfuscatory light, and covering light. Parameter hopping, either preset or dynamic, may be used. The at least one bit of information may be used in a quantum cryptography protocol.

According to another embodiment of the invention, a method of detecting at least one bit of information carried by entangled photons is provided. A plurality of photons are received, the plurality of photons including at least one set of photons entangled together, the at least one set of photons entangled together having information modulated onto at least one entangled photon parameter, the plurality of photons being transmitted from a sender. An entangled photon absorption is detected. A state of the at least one entangled photon parameter of the at least one set of photons entangled together is deduced. The deducing reveals at least one bit of information modulated onto the at least one set of photons entangled together.

Various optional and preferable features of the above embodiment include the following. The at least one set of photons entangled together may comprise a first photon and a second photon, the first photon entangled with the second photon. The at least one entangled photon parameter may be one of: a delay between the first photon and the second photon, an entanglement time of the at least one set of photons entangled together, the relative frequencies of the first photon and the second photon, a polarization of at least one of the first photon and the second photon, a sum of frequencies of the first photon and the second photon, a location of the first photon relative to the second photon, and a momentum of at least one of the first photon and the second photon. The detecting an entangled photon absorption may comprise detecting an entangled photon absorption by a material configured to absorb entangled photons and be substantially transparent to random photons. The detecting an entangled photon absorption may comprise detecting an entangled photon absorption by a biological material. The receiving a plurality of photons may comprise receiving a plurality of random photons transmitted by the sender. The plurality of random photons may be modulated with information. The plurality of random photons may comprise a plurality of random photons intended to provide one of: obfuscatory light, reverse obfuscatory light, and covering light. Parameter hopping, either preset or dynamic, may be used. The at least one bit of information may be used in a quantum cryptography protocol.

According to another embodiment of the invention, a method of transmitting at least one bit of information carried by entangled photons is provided. A plurality of sets of photons entangled together is produced, the sets of photons entangled together having at least one entangled photon parameter. For at least one of the plurality of sets of photons entangled together, the at least one entangled photon parameter is modulated with information. A plurality of photons including the plurality of sets of photons entangled together are transmitted to a recipient. The recipient of the plurality of photons determines at least one bit of the information by deducing a state of the at least one entangled photon parameter in at least one set of photons entangled together.

Various optional and preferable features of the above embodiment include the following. Each set of photons entangled together may comprise a first photon and a second photon, the first photon entangled with the second photon. The at least one entangled photon parameter may be one of: a delay between the first photon and the second photon, an entanglement time of the at least one set of photons entangled together, the relative frequencies of the first photon and the second photon, a polarization of at least one of the first photon and the second photon, a sum of frequencies of the first photon and the second photon, a location of the first photon relative to the second photon, and a momentum of at least one of the first photon and the second photon. The recipient of the plurality of photons may deduce the state of the at least one entangled photon parameter in at least one set of photons entangled together by detecting an entangled photon absorption by a material configured to absorb entangled photons and be substantially transparent to random photons. The plurality of photons may comprise a plurality of random photons. The plurality of random photons may be modulated with information. The plurality of random photons may comprise a plurality of random photons intended to provide one of: obfuscatory light, reverse obfuscatory light, and covering light. Parameter hopping, either preset or dynamic, may be used. The at least one bit of information may be used in a quantum cryptography protocol.

According to another embodiment of the invention, an entangled photon set configured as an information transfer medium, the entangled photon set including at least two photons entangled together, the entangled photon set configured to carry information, is provided. The entangled photon set includes a first photon and a second photon. The first photon and the second photon are entangled together. The entangled photon set has an entangled photon parameter, the entangled photon parameter having a selected state, the selected state representing at least one bit of information. A receiver of the entangled photon set determines the value of the at least one bit of information by determining the selected state of the entangled photon parameter.

Various optional and preferable features of the above embodiment include the following. The entangled photon parameter may comprise one of: a delay between the first photon and the second photon, an entanglement time of the entangled photon set, the relative frequencies of the first photon and the second photon, a polarization of at least one of the first photon and the second photon, a sum of frequencies of the first photon and the second photon, a location of the first photon relative to the second photon, and a momentum of at least one of the first photon and the second photon. A receiver of the entangled photon set may determine the selected state of the entangled photon parameter by detecting an entangled photon absorption. The at least one bit of information may be used in a quantum cryptography protocol.

According to another embodiment of the invention, a method of receiving information carried by a plurality of entangled photon sets, each of the plurality of entangled photon sets configured to be in one of at least two configurations, each of the configurations representing particular information, is provided. A first medium suitable for entangled-photon absorption of entangled photons having a first set of properties is provided. A second medium suitable for entangled-photon absorption of entangled photons having a second set of properties is provided. A plurality of photons is received. The plurality of photons is directed to the first medium. The plurality of photons is directed to the second medium. An entangled-photon absorption by the first medium indicates first information and an entangled-photon absorption by the second medium indicates second information.

Various optional and preferable features of the above embodiment include the following. The plurality of photons may be processed after directing the plurality of photons to the first medium and before directing the plurality of photons to the second medium. The processing may comprise delaying a portion of the plurality of photons. The information may be used in a quantum cryptography protocol.

According to another embodiment of the invention, a system for conveying information in entangled photons is provided. The system includes a source of entangled photons and means for modulating information into at least one entangled photon parameter. The at least one entangled photon parameter of the entangled photons is modulated with information to produce modulated entangled photons.

Various optional and preferable features of the above embodiment include the following. The at least one entangled photon parameter may comprise at least one of: a delay between a first photon and a second photon, an entanglement time of an entangled photon set, relative frequencies of a first photon and a second photon, a polarization of at least one of a first photon and a second photon, a sum of frequencies of a first photon and a second photon, a location of a first photon relative to a second photon, and a momentum of a first photon and a second photon. The information may be used in a quantum cryptography protocol.

According to another embodiment of the invention, a system for receiving information conveyed in entangled photons is provided. The system includes optics for receiving entangled photons and means for determining the state of at least one entangled photon parameter. The system also includes a computer coupled to the means for determining. The computer is configured to report information conveyed by the state of the at least one entangled photon parameter.

Various optional and preferable features of the above embodiment include the following. The at least one entangled photon parameter may comprise at least one of: a delay between a first photon and a second photon, an entanglement time of an entangled photon set, relative frequencies of a first photon and a second photon, a polarization of at least one of a first photon and a second photon, a sum of frequencies of a first photon and a second photon, a location of a first photon relative to a second photon, and a momentum of a first photon and a second photon. The information may be used in a quantum cryptography protocol.

According to another embodiment of the invention, a method of detecting at least one bit of information manifested on entangled particles is provided. Entangled particles are produced. At least one bit of information is modulated onto at least one entangled particle parameter to produce modulated entangled particles. The modulated entangled particles are transmitted. At least a portion of the modulated entangled particles is received. A value of the at least one entangled particle parameter is revealed in at least one set of entangled particles received by the receiving. The at least one bit of information is discerned based on the detecting.

Various optional and preferable features of the above embodiment include the following. The entangled particles may include one or more atom, ion, nuclear particle, quantum dot, electron, electron hole, positron, exciton, or photon. The modulating may comprise modulating at least one of inter-particle delay, entanglement time, relative frequencies, relative polarizations, sum frequency, relative locations, momentum, or spin.

According to another embodiment of the invention, a method of detecting at least one bit of information carried by entangled particles is provided. A plurality of particles is received, the plurality of particles including at least one set of particles entangled together, the at least one set of particles entangled together having information modulated onto at least one entangled particle parameter, the plurality of particles being transmitted from a sender. The at least one set of particles entangled together is detected. A state of the at least one entangled particle parameter of the at least one set of particles entangled together is deduced. The deducing reveals at least one bit of information modulated onto the at least one set of particles entangled together.

Various optional and preferable features of the above embodiment include the following. The at least one set of particles entangled together may include one or more atom, ion, nuclear particle, quantum dot, electron, electron hole, positron, exciton, or photon. The at least one entangled particle parameter may comprise at least one of inter-particle delay, entanglement time, relative frequencies, relative polarizations, sum frequency, relative locations, momentum, or spin.

According to another embodiment of the invention, a method of transmitting at least one bit of information carried by entangled particles is provided. A plurality of sets of particles entangled together, the sets of particles entangled together having at least one entangled particle parameter, is produced. For at least one of the plurality of sets of particles entangled together, the at least one entangled particle parameter is modulated with information. A plurality of particles including the plurality of sets of particles entangled together is transmitted to a recipient. The recipient of the plurality of particles determines at least one bit of the information by deducing a state of the at least one entangled particle parameter in at least one set of particles entangled together.

Various optional and preferable features of the above embodiment include the following. The at least one set of particles entangled together may include one or more atom, ion, nuclear particle, quantum dot, electron, electron hole, positron, exciton, or photon. The at least one entangled particle parameter may comprise at least one of inter-particle delay, entanglement time, relative frequencies, relative polarizations, sum frequency, relative locations, momentum, or spin.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE EXEMPLARY EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, the description taken with the drawings provides a fundamental understanding of the present invention, making apparent to those skilled in the art how the several forms of the present invention may be embodied in practice.

Figure 1:
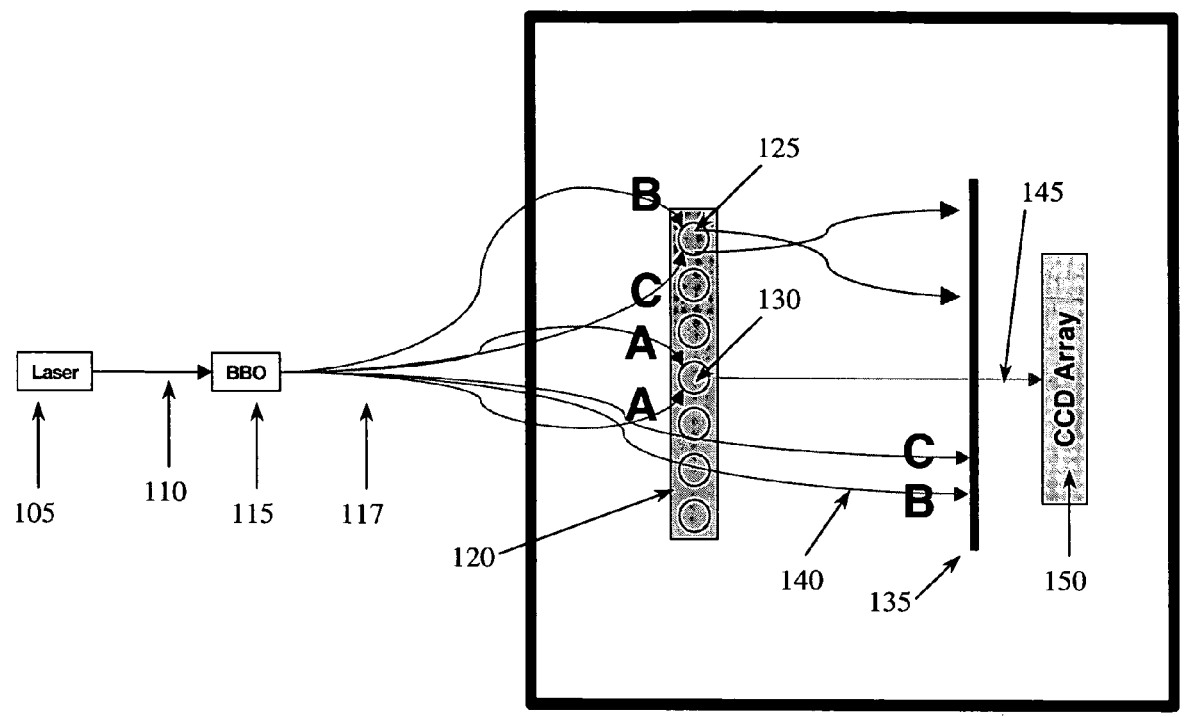
FIG. 1 is a schematic diagram of a generalized apparatus for detecting entangled-photon pairs.

FIG. 1 depicts an apparatus for detecting entangled-photon pairs. Laser 105 produces classical (i.e., non-entangled) blue light 110, which is sent to nonlinear crystal 115. Nonlinear crystal 115, discussed further below, converts classical light to entangled-photon light. Blue non-entangled photons 110 enter nonlinear crystal 115, and are there converted to red entangled-photon pairs 117, including, for example, entangled pairs AA, BB, and CC. Entangled-photon pairs 117 are thereafter directed to biphoton sensitive material ("BSM") 120.

Absorbing entangled-photon pairs makes BSM 120 fluoresce. Molecule 130 of BSM 120 first absorbs entangled-photon pair AA through the process of entangled-photon pair absorption. Entangled-photon pair absorption (also, "entangled two-photon absorption," "ETPA," or "biphoton absorption") is a type of two-photon absorption. Molecule 130 produces green fluorophoton 145 in response to absorbing entangled-photon pair AA. Fluorophoton 135 passes through green-pass filter 135 to strike charge coupled device (CCD) array 150. CCD array 150 detects green fluorophoton 145, which indicates entangled-photon pair absorption by BSM 120.

BSM 120 does not generally absorb random photons. The term "random" refers to both individual photons (that may be entangled with another photon or photons), and to multiple photons that are not entangled together (but that may be entangled with other photons).

Individual photons from entangled-photon pairs (e.g., photon B 140) are generally not absorbed by BSM 120. BSM 120 is effectively transparent to individual photons. Because individual photons from entangled pairs are generally not absorbed by BSM 120, individual photons do not cause BSM 120 to fluoresce and activate CCD array 150. Individual photons generally pass thorough BSM 120 without being absorbed and are stopped by green-pass filter 135. Individual photons therefore do not reach and are not detected by CCD array 150. Individual photons are examples of random photons.

Cousin photon pairs intersecting the same molecule of BSM 120 are generally not absorbed. Cousin photons are photons that are not entangled together, but may be entangled with other photons. By way of non-limiting example, cousin photon pair BC includes one photon from each of the entangled-photon pairs BB and CC. BSM molecule 125 does not absorb cousin photon pair BC. BSM 120 is effectively transparent to cousin photon pairs. Because cousin photon pairs are generally not absorbed by BSM 120, cousin photon pairs do not cause BSM 120 to fluoresce and activate CCD array 120. Instead, cousin photon pairs pass through BSM 120 and are stopped by green-pass filter 135 before reaching CCD array 150. Cousin photons are a type of random photons.

The particular colors of light described in reference to FIG. 1 are for exemplary purposes and are not meant to be limiting.

Figure 2:
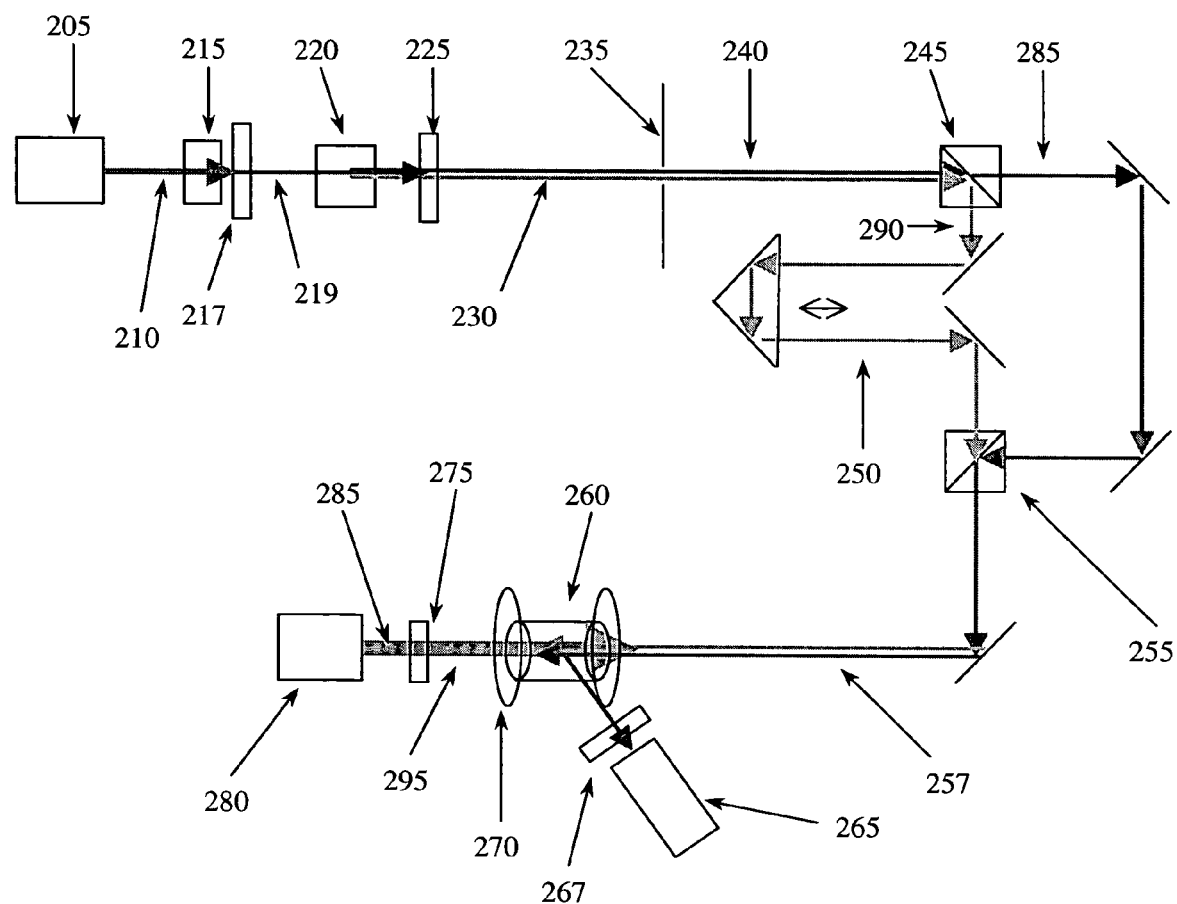
FIG. 2 is a schematic diagram of an apparatus for detecting entangled-photon pairs.

FIG. 2 depicts in detail an apparatus for detecting entangled-photon pairs. Pulsed dye laser 205 produces, by way of non-limiting example, 385 THz (778 nm wavelength) photons 210. Other light frequencies may be used in other embodiments. Light 210 passes through doubling crystal 215, which doubles the frequency of light 210 to produce 771 THz (389 nm) light 219. Filter 217 blocks any 385 THz light that might have gotten through doubling crystal 215, while allowing 771 THz light 219 to pass. Light 219 leaves filter 217 and enters a preferably 5 mm×5 mm×5 mm beta barium borate (BBO) crystal 220, which converts single photons into entangled-photon pairs 230 via collinear type II down-conversion. A 25 mm×10 mm×10 mm BBO crystal may be used in other embodiments. Such a crystal, having an 25 mm optical axis, allows for the production of signal photons and idler photons with narrow bandwidths. Other materials may be used that produce entangled-photon pairs in other embodiments. It is known to those of ordinary skill in the art how to determine whether a material produces entangled photons.

Collinear signal photon and idler photon beams need not be used in other embodiments of the present invention. By way of non-limiting example, an embodiment of the present invention may select signal photons at 3° from the center (pump beam) line. Continuing this example, the embodiment may select idler photons at 3° from the center line and diametrically opposed to the selected signal photons. The signal photon beam and idler photon beam are thus separated by a total of 6° in such an exemplary embodiment.

Entangled-photon pairs 230 are then culled to leave only pairs with a particular energy distribution. Frequency-selective aperture 235 selects entangled-photon pairs 240 having, by way of non-limiting example, one 385 THz (779 nm) photon and one 386 THz (777 nm) photon. The frequencies of the signal and idler photons sum to the frequency of light 219 (771 THz) that produced the entangled pairs. Frequency-selective aperture prevents entangled-photon pairs with unwanted energy distributions between the signal and idler from passing. In other embodiments, other energy distributions may be used.

Entangled-photon pairs 240 are then prepared by delaying one of the photons. To delay one photon, polarizing beam splitter ("PBS") 245 first separates each entangled-photon pair 240 into signal photon 290 and idler photon 285. Next, mirror apparatus 250 lengthens the path of, by way of non-limiting example, signal photon 290. The lengthened path produces a delay on the order of picoseconds. Photons 285, 290 are then returned to the same path 257 via PBS 255. The amount of delay is discussed further below in reference to FIGS. 8-10. In other embodiments, delaying one photon is not required.

Entangled-photon pairs 257 then enter prepared BSM cell 260, which contains, by way of non-limiting example, 3.00 linear meters of rubidium-87 ("$^{87}$Rb") vapor held at about 0.2 atmospheres pressure. BSM cell 260 produces fluorophotons of about 420 nm wavelength upon absorbing biphotons. Fluorophotons pass through interference filter 267, which allows 714 THz (420 nm) light to pass. By way of non-limiting example, avalanche photodiode (APD) 265 then detects fluorophotons.

Prior to absorbing entangled-photon pairs, the quantum state of the $^{87}$Rb in BSM cell 260 is preferably prepared. The $^{87}$Rb in BSM cell 260 is first pumped via external cavity diode laser ("ECDL") 280. ECDL 280 produces 377 THz (795 nm) light 285, which is circularly polarized by quarter-wave plate combination 275 and directed to BSM cell 260. Circularly polarized light 295 transfers angular momentum to the $^{87}$Rb in BSM cell 260. This angular momentum pumps the quantum state of the $^{87}$Rb to a preferred state for absorbing biphotons. BSM cell 265 is further prepared by magnetic field coils 270, which condition the quantum mechanical hyperfine levels of the $^{87}$Rb in BSM cell 265. The preferred initial quantum mechanical state for $^{87}$Rb in BSM cell 260 is discussed further below in reference to FIG. 6. Magnetic field coils 270 impose a polarization direction for an initial $^{87}$Rb state and also select a final state. Two possible transitions are available for $^{87}$Rb prepared as described. One transition produces fluorescence as a result of biphoton absorption, described above. The other transition does not occur because of the selection of the frequencies of signal and idler light 257. Other ways of preparing the $^{87}$Rb quantum state are contemplated; the above-described preparation is not meant to be limiting. In other embodiments, no BSM quantum state preparation is required.

Parameters similar to those of the embodiment of FIG. 2 may be employed in another embodiment of the present invention. Such an embodiment produces evidence of entangled-photon absorption by ejecting 762 nm fluorophotons. These fluorophotons are sufficiently different in wavelength from the signal photons and idler photons so as to be capable of selection using an appropriately-configured filter. As with the embodiment of FIG. 2, an APD may be used to detect the fluorophotons. A 3.0 cm long $^{87}$Rb vapor cell may be used.

Figure 3:
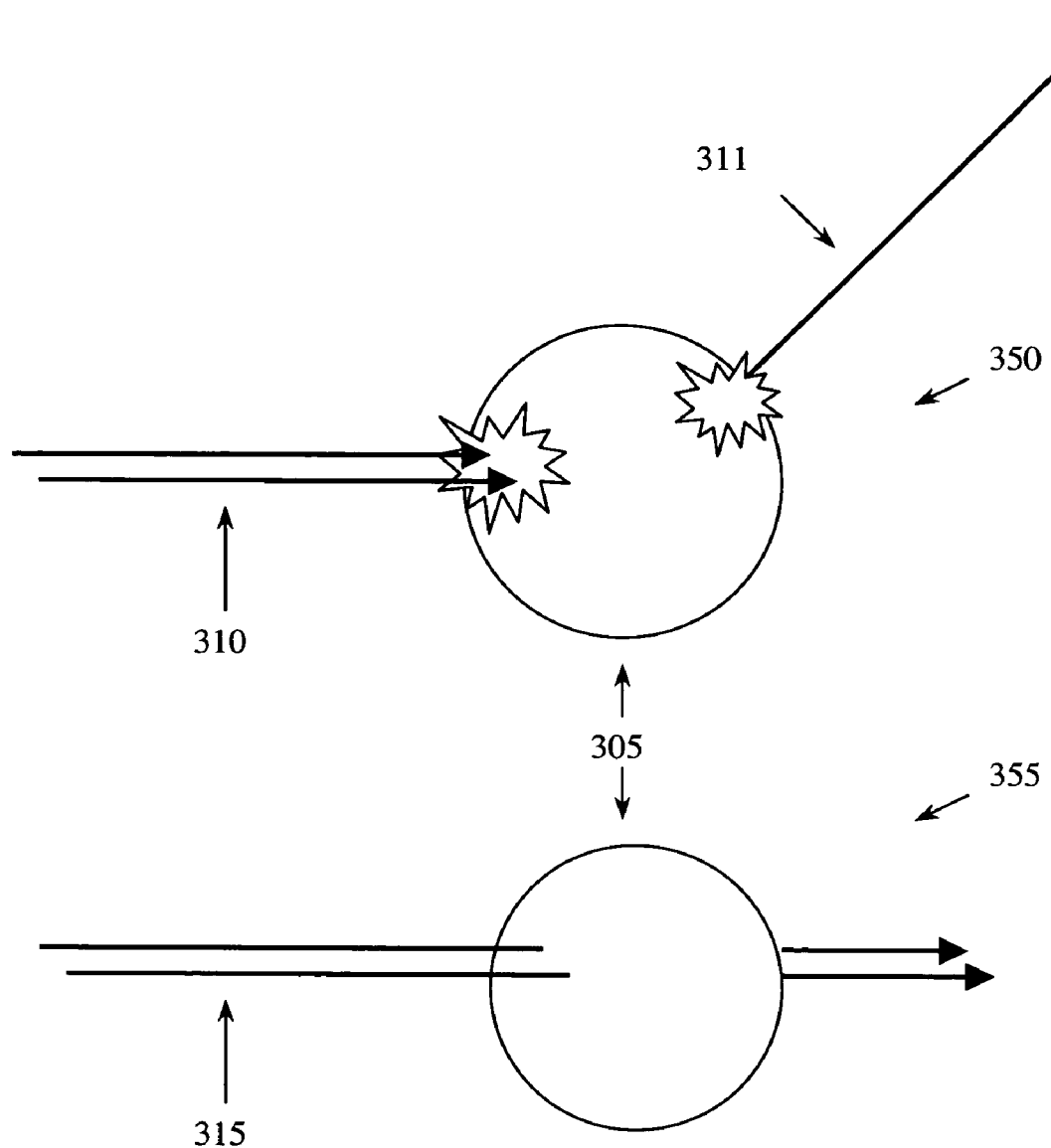
FIG. 3 depicts a molecule with a large entangled two-photon adsorption cross section and a small random two-photon absorption cross section.

FIG. 3 schematically illustrates a material 305 with a large entangled two-photon adsorption (ETPA) cross-section and a small random two-photon absorption (RTPA) cross-section. The description of FIG. 3 is not limited to any particular embodiment. The cross-section of a material 305 for a particular type of radiation (e.g., entangled-photon pairs, random photon pairs) indicates the probability of absorbing that type of radiation. Material 305 absorbs 350 entangled-photon pairs 310 (which produces fluorophoton 311) with a high probability. The same material 305 allows random photons 315 to pass 355 without being absorbed, also with a high probability (e.g., molecule 305 is substantially transparent to random photon pairs). Material 305 therefore has an entangled two-photon absorption cross-section that is larger than its random two-photon absorption cross-section.

RTPA cross-section indicates how transparent material 305 is to random photon pairs 315. The smaller the RTPA cross-section, the less likely material 305 is to absorb random photon pairs 315. The RTPA cross-section of material 305 may be described as, by way of non-limiting example:

$$\sigma_e = \frac{\pi}{2}\omega_1\omega_2\delta(\varepsilon_f - \varepsilon_i - \omega_1 - \omega_2)|M_r|^2. \quad (1)$$

In equation (1), $\delta$ is a function that is zero, unless its argument is zero in which case its value is one. $\epsilon_i$ is the initial electron energy of the material in initial state $|\psi_i\rangle$. $\epsilon_f$ is the final electron energy of the material in final state $|\psi_f\rangle$ after random two-photon absorption. $\omega_1$ is the first photon's frequency. $\omega_2$ is the second photon's frequency. $M_r$ is the random two-photon absorption matrix element described further below in reference to equation (3). Equation (1) indicates that the RTPA cross section is generally zero unless the sum of the frequencies of the two photons is equal to the difference between an initial energy and a permissible final energy of the molecule (i.e., unless $\epsilon_f - \epsilon_i = \omega_1 + \omega_2$). When that condition obtains, the RTPA cross section is equal to $\pi/2$ times the product of the two photon frequencies, times the absolute value of the RTPA matrix element squared. Other equations may be used to describe RTPA cross-section. Modifications of equation (1) may also be used.

The rate of random photon absorption tells the rate at which a particular material absorbs random photons. By way of non-limiting example, the rate of random two-photon absorption may be described as:

$$R_r = \frac{\pi}{2}\omega_1\omega_2|M_r|^2\delta(\varepsilon_f - \varepsilon_i - \omega_1 - \omega_2)\phi^2. \quad (2)$$

The parameters of equation (2) are the same as described above in reference to equation (1), except that $\phi$ represents the flux of the random photons incident on the material in question, in terms of number of events per area per time. The rate of random photon absorption is generally equal to the RTPA cross section multiplied by the square of the flux of the incident random photons. Other equations for describing random photon absorption rates may be used in addition to, or instead of, equation (2). Modifications of equation (2) may also be used.

The RTPA matrix element $M_r$ is related to the RTPA cross-section. The smaller the RTPA matrix element, the more transparent the material is to random photon pairs. The RTPA matrix element $M_r$ may be described as, by way of non-limiting example:

$$M_r \equiv \sum_j \left\{ \frac{D_{21}^{(j)}}{\Delta_1^{(j)} - i\kappa_j/2} + \frac{D_{12}^{(j)}}{\Delta_2^{(j)} - i\kappa_j/2} \right\}. \quad (3)$$

Figure 4:
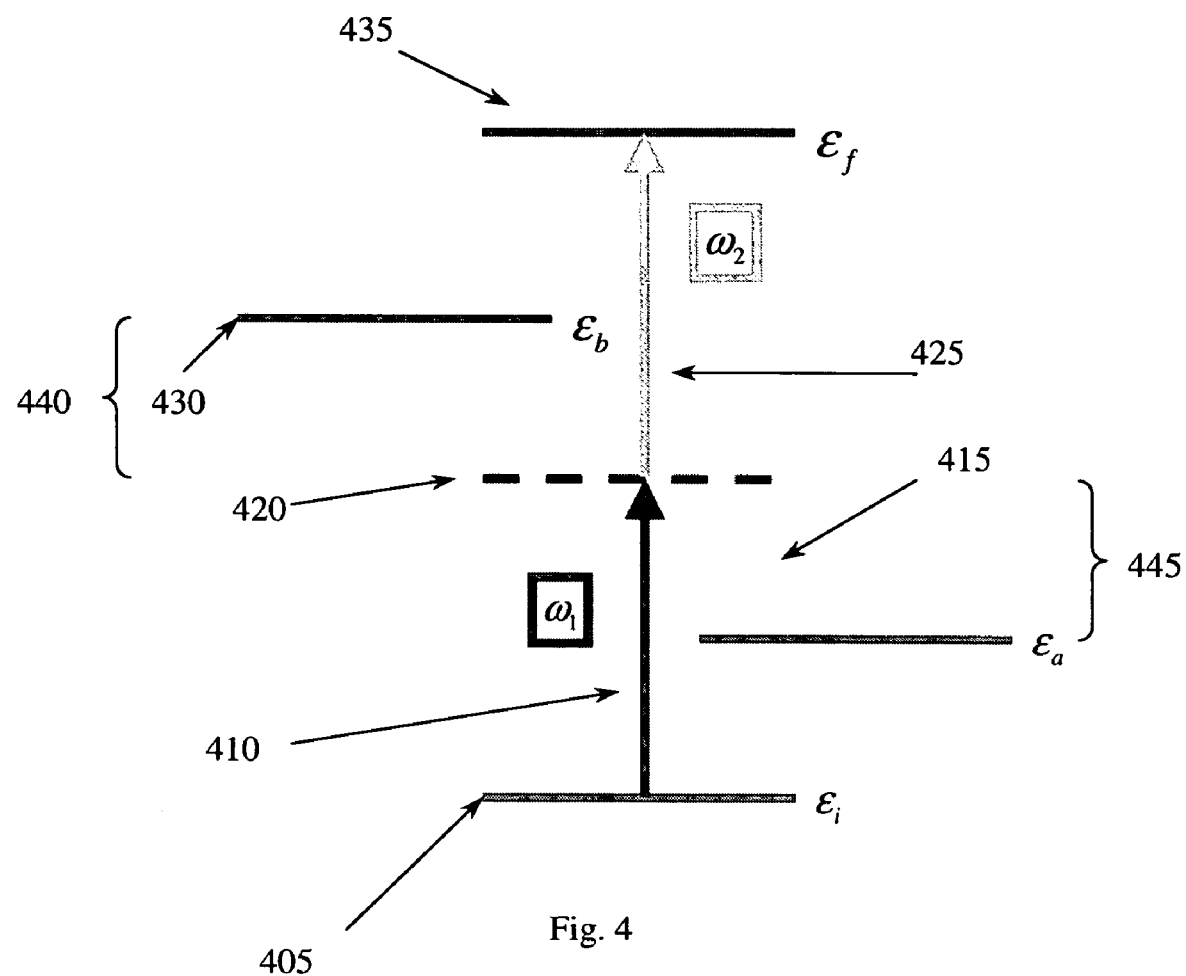
FIG. 4 is a schematic diagram of energy levels in a molecule.

In equation (3), the index j of the sum spans energy states $|\psi_j\rangle$ intermediate between $|\psi_i\rangle$ and $|\psi_f\rangle$ with energies $\epsilon_j$ for $j \geq 1$. Note that for calculation purposes, j may span all, or just a selection of, intermediate states (generally, the more states spanned by j, the more accurate the calculation). Energy mismatches, discussed further below in reference to FIG. 4, are denoted $\Delta_1^{(j)} = \epsilon_j - \epsilon_i - \omega_1$ and $\Delta_2^{(j)} = \epsilon_j - \epsilon_i - \omega_2$. The line width of each state $|\psi_j\rangle$, known to those of ordinary skill in the art, is denoted $\kappa_j$. Each state $|\psi_j\rangle$ exists for a period of time, and the line width $\kappa_j$ is related to the reciprocal of the lifetime of state $|\psi_j\rangle$. Preferably, each line width is much smaller than the corresponding energy mismatch (i.e., $\kappa_j \ll \Delta_i^{(j)}$ for i=1,2).

The transition dipole element, generally given by $D_{kl}^{(j)} = \langle\psi_j|d_k|\psi_j\rangle\langle\psi_j|d_l|\psi_i\rangle$, represents the ease with which a charge may move within the material, where each $d_p$ is the dipole operator of polarization p, and either k=1 and l=2, or k=2 and l=1. Equation (3) accounts for both possible orders of arrival of the two photons of frequencies $\omega_1$ and $\omega_2$. The first term in brackets in equation (3) represents the photon of frequency $\omega_1$ being absorbed first. The second term represents the photon of frequency $\omega_2$ being absorbed first. Alternate equations for calculating RTPA matrix elements may be used in addition to or instead of equation (3). Modifications of equation (3) may also be used.

ETPA cross-section tells how transparent material 305 is to entangled-photon pairs 310. The larger the ETPA cross-section, the more likely material 305 absorbs entangled-photon pairs 310. The ETPA cross-section of material 305 may be described as, by way of non-limiting example:

$$\sigma_e = \frac{\pi}{4A_e T_e} \omega_1 \omega_2 \delta(\varepsilon_f - \varepsilon_i - \omega_1 - \omega_2)|M_e|^2. \quad (4)$$

In equation (4), $\delta$, $\epsilon_i$, $\epsilon_f$ are as defined above in reference to equation (1). In addition, $\omega_1$ and $\omega_2$ are the frequencies of the entangled signal and idler photons, respectively. The $\delta$ in equation (4) indicates that generally, for entangled two-photon absorption to occur, the sum of the frequencies of the signal and idler photons must equal the difference between the molecule's permissible initial and final energies (i.e., $\epsilon_f - \epsilon_i = \omega_1 + \omega_2$). Equation (4) states that, in that case, the ETPA cross-section is typically equal to $\pi/4$ times the product of the two photon frequencies, times the absolute value of the RTPA matrix element squared, divided by entanglement area $A_e$ and entanglement time $T_e$. Reducing the size of $A_e$ and $T_e$ (described further below in reference to FIGS. 7-13) will generally increase ETPA cross section. Alternate equations for describing ETPA matrix elements may be used in addition to or instead of equation (4). Modifications of equation (4) may also be used.

The rate of entangled-photon absorption tells the rate at which a particular material absorbs entangled photons. The rate of entangled-photon absorption may be described as, by way of non-limiting example:

$$R_e = \frac{\pi}{2}\omega_1\omega_2|M_e|^2\delta(\varepsilon_f - \varepsilon_i - \omega_1 - \omega_2)\phi_c\phi. \quad (5)$$

The parameters of equation (5) are the same as described above in reference to equation (4), except that $\phi$ represents the flux of the entangled photons incident on the material in question, and the critical flux is given by $\phi_c = \frac{1}{2}T_e A_e$. Equation (5) indicates that the rate of entangled-photon absorption is generally equal to the ETPA cross section multiplied by the actual flux of the incident random photons, divided by twice the product of the entanglement time and the entanglement area. Alternate equations for calculating the entangled-photon absorption rate may be used in addition to or instead of equation (5). Modifications of equation (5) may also be used.

The ETPA matrix element $M_e$ is related to the ETPA cross-section. The larger the ETPA matrix element, the more likely it is that entangled-photon pairs will be absorbed. The ETPA matrix element $M_e$ may be described as, by way of non-limiting example:

$$M_e \equiv \sum_j \left\{ D_{21}^{(j)} \frac{1 - \exp[iT_e(\Delta_1^{(j)} - i\kappa_j/2)]}{\Delta_1^{(j)} - i\kappa_j/2} + D_{12}^{(j)} \frac{1 - \exp[iT_e(\Delta_2^{(j)} - i\kappa_j/2)]}{\Delta_1^{(j)} - i\kappa_j/2} \right\}. \quad (6)$$

In equation (6), j, $D_{kl}^{(j)}$, $\Delta_1^{(j)}$, $\Delta_2^{(j)}$, and $\kappa_j$ are as above in reference to equation (3). Equation (6) differs from equation (3) in that each term in the brackets has an additional factor, namely $\exp[-iT_e(\Delta_k^{(j)}-i\kappa_j/2)]$ for k=1, 2. The differences between equations (3) and (6) indicate that a material's RTPA matrix element may differ from its ETPA matrix element. Alternate equations for calculating the ETPA matrix element may be used in addition to or instead of equation (6). Modifications of equation (6) may also be used.

FIG. 4 is a schematic diagram of a generic molecule's energy levels. Energy levels are shown as horizontal bars. Bars closer to the top of the drawing represent higher energy levels than those represented by bars closer to the bottom. Molecular energy levels generally affect both random and entangled two-photon absorption. FIG. 4 depicts a molecule with four (4) distinct energy levels 405, 415, 430, 435. However, molecules with more or less than four energy levels may be used. By way of non-limiting example, initial ground state 405 has energy $\epsilon_i = 0$, first intermediate state 415 has energy $\epsilon_a = E/3$, second intermediate state 430 has energy $\epsilon_b = 2E/3$, and final state 435 has energy $\epsilon_f = E$. Absorbing a properly-conditioned photon pair excites the material from an initial state 405 to a final state 435. Before two-photon absorption, the molecule is in initial state 405 with energy $\epsilon_i$. A first photon of frequency $\omega_1$ then excites the molecule, causing a transition 410 to virtual state 420. The energy $\omega_1$ of virtual state 420 might not equal either of the intermediate energy levels $\epsilon_a$ and $\epsilon_b$. A second photon of frequency $\omega_2$ subsequently excites the molecule, causing a transition 425 that places the molecule in final state 435 with energy $\epsilon_f$.

In reference to FIG. 4, RTPA and ETPA matrix elements may be calculated, by way of non-limiting example, for a material with four energy levels. By way of non-limiting example, for this material, dipole matrix elements may be equal: $\langle\psi_j|d_k|\psi_a\rangle = \langle\psi_j|d_k|\psi_b\rangle = \langle\psi_b|d_l|\psi_i\rangle = \langle\psi_a|d_l|\psi_i\rangle = \delta$. The pump frequency of the light source is preferably $\omega_p = E$. Again by way of non-limiting example, consider degenerate signal and idler photons (i.e., having the same energy), with a $\omega_1 = \omega_2 = E/2$. Energy mismatches calculated from these parameters are $\Delta_1^{(a)} = \Delta_2^{(a)} = \epsilon_a - \epsilon_i - \omega_1 = E/3 - E/2 = -E/6$ and $\Delta_1^{(b)} = \Delta_2^{(b)} = \epsilon_b - \epsilon_i - \omega_1 = 2E/3 - E/2 = E/6$. Preferably, line width $\kappa_j$ is much smaller than the energy E. Accordingly, the RTPA matrix element may be described as, by way of non-limiting example:

$$M_r \equiv \frac{D_{12}^{(a)}}{\Delta_2^{(a)} - i\kappa_a/2} + \frac{D_{21}^{(a)}}{\Delta_2^{(a)} - i\kappa_a/2} + \frac{D_{12}^{(b)}}{\Delta_2^{(b)} - i\kappa_b/2} + \frac{D_{21}^{(b)}}{\Delta_2^{(b)} - i\kappa_b/2} \quad (7)$$

$$= 2\delta^2 \left( \frac{6}{E - i\kappa_a/2} + \frac{6}{E - i\kappa_b/2} \right)$$

$$\approx 6i\delta^2 \left( \frac{\kappa_b - \kappa_a}{E^2} \right) \approx 0.$$

Equation (7) indicates that the RTPA cross-section is typically strongly suppressed when the line-width is small compared to the energy spacing (i.e., when $\kappa_j \ll E$). The ETPA matrix element may be described as, by way of non-limiting example:

$$M_e \equiv -\frac{12\delta^2}{E}(\exp[-iT_e(\Delta^{(a)})] + \exp[iT_e(\Delta^{(b)})]) \quad (8)$$

$$= -\frac{12\delta^2}{E}(\exp[-iT_e(-E/6)] + \exp[iT_e(E/6)]).$$

$$= -\frac{24\delta^2}{E}\sin[T_e E/6]$$

Small terms (e.g., on the order $\kappa/E$) are dropped from equation (8). Entanglement time $T_e$ may be chosen to make ETPA matrix element large. By way of non-limiting example, choosing entangled-photon pairs with an entanglement time such that $T_e E/6 = \pi/2 \bmod(\pi)$ yields a large ETPA matrix element (e.g., $|M_e| = 24\delta^2/E \gg 0$). Hence, the ETPA matrix element is much bigger than the RTPA matrix element (i.e., $|M_e| \gg |M_r|$), and there is a high probability of entangled-photon pair absorption and a low probability of random photon pair absorption at a given flux.

FIG. 4 also depicts energy mismatches 440, 445 between virtual state 420 and intermediate states 415, 430. Energy mismatches, which are related to virtual state lifetimes, may be used in calculating both ETPA and RTPA matrix elements and cross-sections. By way of non-limiting example, energy mismatches 440, 445 are equal in the molecule of FIG. 4; however, other types of energy mismatches may be used. Virtual state 420 generally only exists for a short period of time. The lifetime of virtual state 420 is inversely proportional to energy mismatches 440, 445. A larger energy mismatch 440, 445 generally indicates a shorter virtual state lifetime. In symbols, $T_{VS} \sim 1/\Delta_k^{(j)}$, where $T_{VS}$ is the virtual state lifetime of the state, and $\Delta_k^{(j)}$ is the energy mismatch. The energy mismatch between state 415 having energy $\epsilon_a$ and virtual state 420 is given by $\Delta_1^{(a)} = \epsilon_a - \epsilon_i - \omega_1$. The energy mismatch between state 430 having energy $\epsilon_b$ and virtual state 420 is given by $\Delta_1^{(b)} = \epsilon_b - \epsilon_i - \omega_1$. In general, $\Delta_k^{(j)} = \epsilon_j - \epsilon_i - \omega_k$ denotes the energy difference, relative to initial state $\epsilon_i$, between material state energy $\epsilon_j$ and the energy $\omega_k$ supplied by the k-th photon.

Figure 5:
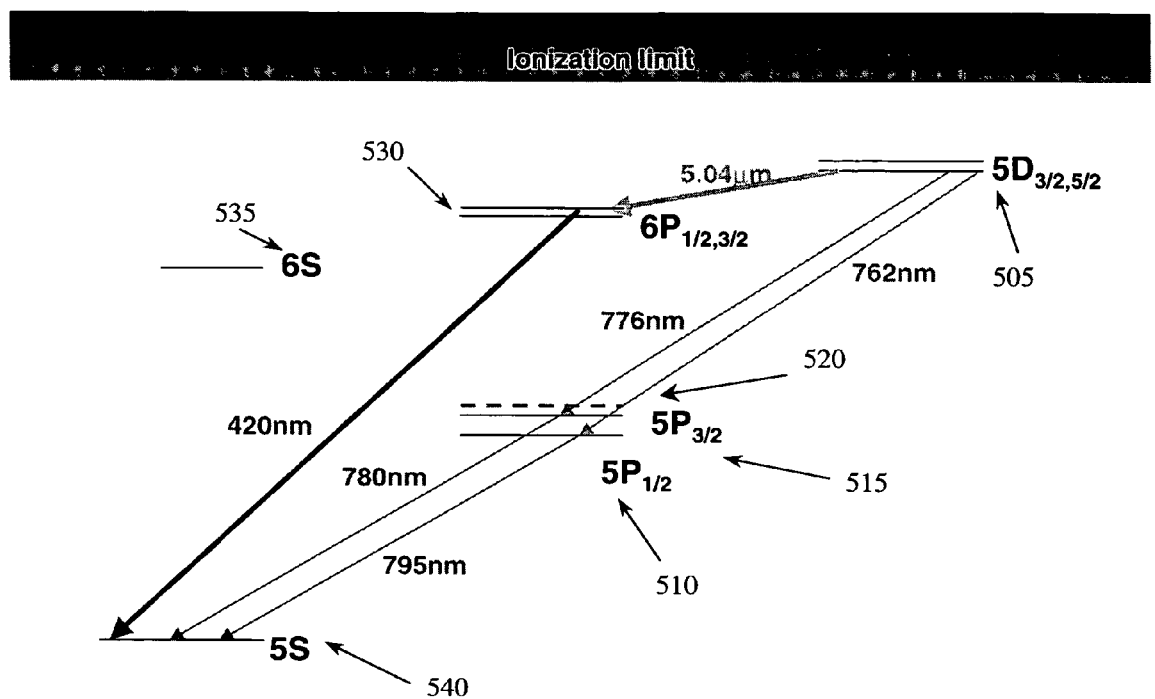
FIG. 5 depicts rubidium-87 ("$^{87}$Rb") energy level de-excitation from an excited 5D state.

FIG. 5 depicts one possible energy level de-excitation for $^{87}$Rb that may be used to detect entangled-photon pair absorption. In particular, FIG. 5 illustrates fluorometric decay paths in a $^{87}$Rb molecule whose outer electron has been excited to a 5D$_{3/2, 1/2}$ state 505, which may occur as a result of entangled two-photon absorption. FIG. 5 is associated with the apparatus of FIG. 2. With approximately 40% probability, excited state 505 will decay to ground state 540 (5S) through a 6P$_{1/2, 3/2}$ state 530. The transition from excited state 505 to 6P$_{1/2, 3/2}$ 530 will produce a 5.04 μm wavelength fluorophoton, while the transition from 6P$_{1/2, 3/2}$ to ground 540 produces a 420 nm wavelength fluorophoton. The 420 nm fluorophoton, which may be easily distinguished from the other photons due to its unique frequency, may preferably be detected as an indication of entangled-photon absorption. With approximately 60% probability, the 5D$_{3/2, 1/2}$ state 505 will decay to ground state 540 via either 5P$_{1/2}$ 510 or 5P$_{3/2}$ 515 states. Decay from the initial excited state 505 to 5P$_{1/2}$ 510 to ground state 505 releases 776 nm and 780 nm fluorophotons, respectively. Decay from excited state 505 to 5P$_{3/2}$ 515 to ground state 505 releases 762 nm and 795 nm fluorophotons, respectively. Any of the aforementioned fluorophotons may be detected as an indicia of entangled-photon absorption.

Figure 6:
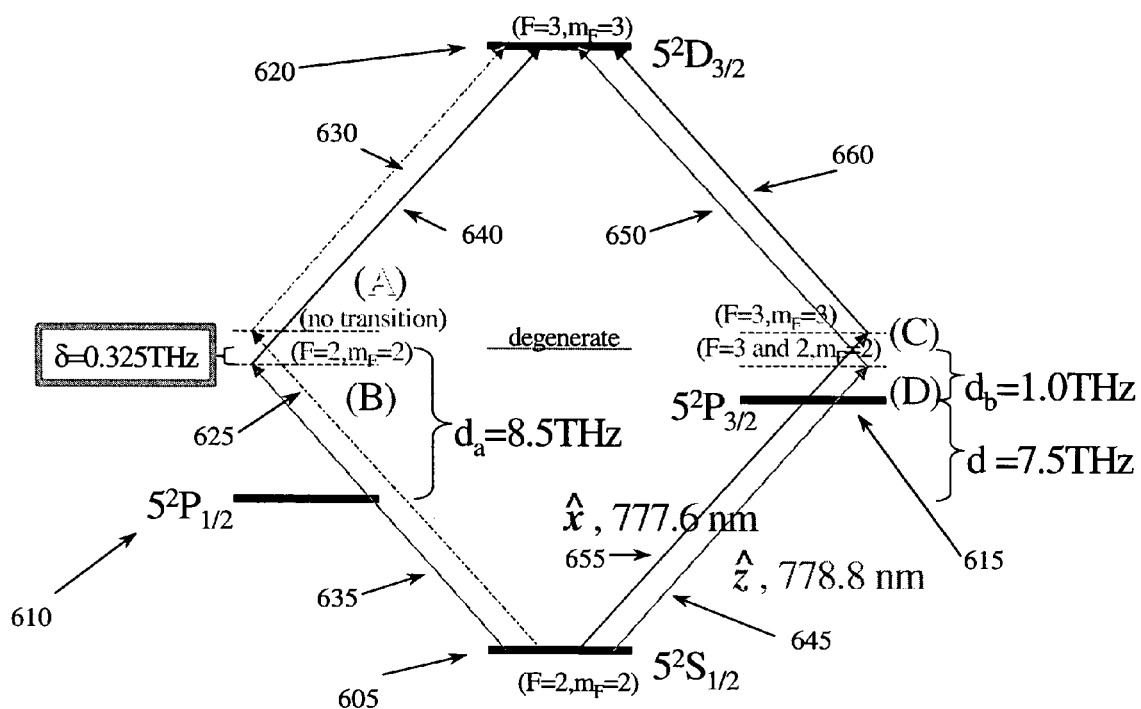
FIG. 6 depicts $^{87}$Rb entangled two-photon absorption energy transitions to a 5D state.

FIG. 6 depicts 5S to 5D $^{87}$Rb entangled two-photon absorption energy transitions. These $^{87}$Rb transitions may be used as a biphoton sensitive material (BSM) that is transparent to random photon pairs; however, other transitions may be used. To verify random photon pair transparency, the RTPA matrix element is calculated and factored as, by way of non-limiting example:

$$M_r = \frac{D_{zx}^{(1/2)}}{\Delta_x^{(1/2)}} + \frac{D_{xz}^{(1/2)}}{\Delta_z^{(1/2)}} + \frac{D_{zx}^{(3/2)}}{\Delta_x^{(3/2)}} + \frac{D_{xz}^{(3/2)}}{\Delta_x^{(3/2)}} \equiv (A + B + C + D)R_{PS}R_{DP}. \quad (9)$$

In equation (9), A, B, C, and D are the angular part of matrix element $M_r$. $R_{PS}$ is the radial part of matrix element $M_r$. More particularly, $R_{PS}$ is the radial part of the matrix element for the transition from ground state S to intermediate state P. $R_{DP}$ is associated with the principle quantum number of matrix element $M_r$. In particular, $R_{DP}$ is the radial part of the matrix element for the transition from intermediate state P to final state D. For z- and x-polarized photons, the transition amplitudes A, B, C, and D from equation (9) are solved for as, by way of non-limiting example:

$$A = \frac{0}{d_a + \delta}, B = \frac{1/(3\sqrt{6})}{d_a - \delta}, C = \frac{1/(5\sqrt{6})}{d_b + \delta}, D = \frac{2/(15\sqrt{6})}{d_b - \delta}. \quad (10)$$

In equation (10), $d_a = (2\pi)$ 8.5 THz, $d_b = (2\pi)$ 1.0 THz and $d = (2\pi)$ 7.5 THz for $^{87}$Rb. These values are meant as illustrative example and are not to be taken as limiting. Terms A, B, C, and D correspond to the first, second, third, and fourth terms in the sum of equation (9), respectively. Again by way of non-limiting example, selecting entangled-photon pairs with distance to degeneracy $\delta = (\omega_1 - \omega_2)/2$ such that $$\delta = d_b \frac{d_a + 5d_b}{5d_a + d_b}$$

results in nearly complete suppression of random two-photon absorption. Note that for this example, the signal and idler energies are not quite degenerate since the distance to degeneracy is not equal to zero (i.e., $\delta \neq 0$). Substituting $\delta$ into equation (9) yields, again by way of non-limiting example:

$$B = \frac{1}{15\sqrt{6}}\left(\frac{5d_a + d_b}{d_a^2 - d_b^2}\right) C = \quad (11)$$

$$\frac{1}{15\sqrt{6}}\left(\frac{5d_a + d_b}{2d_b(d_a - d_b)}\right) D = \frac{-1}{15\sqrt{6}}\left(\frac{5d_a + d_b}{2d_b(d_a - d_b)}\right).$$

Thus, for entangled-photon pair absorption and random photon pair transparency in $^{87}$Rb, the following parameters are preferable: $\delta = (2\pi)$ 0.310 THz, A=0, B=0.00264 per picosecond (ps$^{-1}$), C=0.00991 ps$^{-1}$, and D=−0.01256 ps$^{-1}$. Other parameters, however, may be used in the alternative. Refined calculations, for example, may yield that $\delta = (2\pi)$ 0.320 THz. Alternate calculations may yield that $\delta = (2\pi)$ 0.325 THz. For appropriately selected entangled-photon pairs, the ETPA matrix element may be approximated as, by way of non-limiting example:

$$M_e/R_{PS}R_{DP} = A(1 - \exp(-iT_e\Delta_x^{(1/2)})) + B(1 - \exp(-iT_e\Delta_z^{(1/2)})) \quad (12)$$
$$+ C(1 - \exp(-iT_e\Delta_x^{(3/2)})) + D(1 - \exp(-iT_e\Delta_z^{(3/2)})).$$

The resulting ETPA transition rate may be approximated as, again by way of non-limiting example:

$$\left|\frac{M_e}{R_{PS}R_{DP}}\right|^2 = -4CD\sin^2(\delta T_e) + \quad (13)$$
$$2(C+D)[C(\cos(dT_e) - 1) + D(\cos(d+2\delta)T_e - 1)].$$

Values for $T_e$, $A_e$, and $\tau$, discussed further below, may be selected to increase the probability of entangled-photon pair absorption to desired levels.

FIG. 6 also depicts a $^{87}$Rb entangled two-photon absorption process for a 778.8 nm z-polarized signal photon and a x-polarized 777.6 nm idler photon. In particular, FIG. 6 depicts biphoton absorption exciting a $^{87}$Rb molecule from initial state $5^2S_{1/2}$ 605 with hyperfine structure parameters F=2, $m_F$=2 to final state $5^2D_{3/2}$ 620 with hyperfine structure parameters F=3, $m_F$=3. Other signal and idler wavelengths and material transitions may be used. This particular excitation can occur in three different ways, each associated with a different photon order of arrival and real intermediate energy level 610, 615. In particular, path 635, 640 corresponds to B in equation (9), is associated with the $5^2P_{1/2}$ state, and represents the z-polarized photon arriving before the x-polarized photon. Path 645, 650 corresponds to C in equation (9), is associated with the $5^2P_{3/2}$ state, and represents the x-polarized photon arriving before the z-polarized photon. Path 655, 660 corresponds to D in equation (9) is associated with the $5^2P_{3/2}$ state, and represents the z-polarized photon arriving before the x-polarized photon. Path 625, 630 corresponds to A from equation (9). Because A=0, no transition occurs according to path 625, 630. That is, for the associated $^{87}$Rb state $5^2P_{1/2}$ as illustrated in FIG. 6, no transition occurs when the x-polarized photon is absorbed before the z-polarized photon.

The parameters and configurations (e.g., paths, material, energy levels, hyperfine structure parameters, photon energies, etc.) illustrated by and described in reference to FIG. 6 above are for exemplary purposes and are not meant to be limiting.

Figure 7:
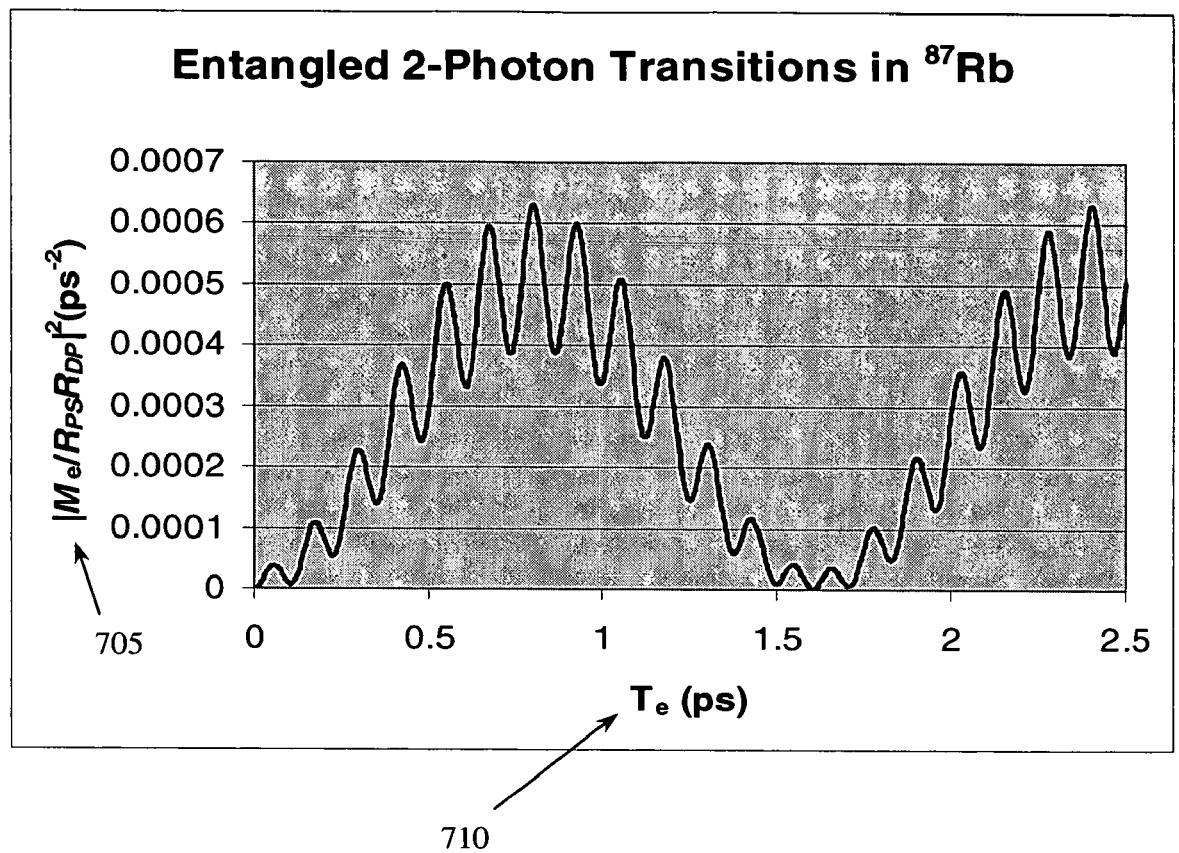
FIG. 7 depicts an approximation to an entangled two-photon absorption matrix element for $^{87}$Rb as a function of entanglement time for the embodiment of FIG. 2.

FIG. 7 is a chart illustrating how entanglement time affects entangled two-photon absorption for the transitions associated with FIG. 6. In FIG. 7, the horizontal axis depicts an approximation 705 to an ETPA matrix element for a 5S to 5D $^{87}$Rb transition, and the vertical axis represents entanglement time 710. By way of non-limiting example, the ETPA matrix element for $^{87}$Rb is large when the entanglement time 710 is approximately 0.833 picoseconds (ps) or 2.40 ps, and small for entanglement times 710 of approximately 0.100 ps or 1.60 ps. An entanglement time of 4.00 ps will also produce a large $^{87}$Rb ETPA matrix element. In general, other materials and their associated ETPA transitions have analogous charts to that of FIG. 7.

In general, entanglement time $T_e$ 710 is a quantity associated with the spread in phase differences between signal and associated idler photons. That is, entanglement time relates to the collection of differences in phase between signal and associated idler photons produced by an entangled photon source (e.g., a non-linear crystal). Entanglement time may be, by way of non-limiting example, considered as the average time difference between when ordinary and extraordinary rays leave a nonlinear crystal. Ordinary rays leaving a nonlinear crystal are typically associated with idler photons, and extraordinary rays leaving a nonlinear crystal are typically associated with signal photons. By way of non-limiting example, entanglement time 710 is a function of the length l of a non-linear crystal used to produce the entangled photons, and may be described as $T_e = l(n_o - n_e)/2c$, where $n_o$, $n_e$ are indices of refraction associated with ordinary and extraordinary crystal directions, respectively. To increase the magnitude of the ETPA matrix element, the distance to degeneracy $\delta$ multiplied by the entanglement time preferably equals $\pi/2$ radians (i.e., $\delta T_e = \pi/2$) in order to maximize the term $\sin(\delta T_e)$. More generally, the distance to degeneracy multiplied by the entanglement time preferably equals an odd integer multiple of $\pi/2$ radians (i.e., $\delta T_e = n\pi/2$ for an odd integer n). To increase the magnitude of the ETPA cross-section, it suffices to maximize $|M_e|^2/T_e$. By way of non-limiting example, this yields, for the parameters discussed above in reference to FIG. 6, $T_e = 5 \times 10^{-13}$ seconds, and l=5 mm. Other values for $\delta$, $T_e$, and l may be used in the alternative.

Favorable suppression of random entangled-photon absorption may be achieved using larger values for l, which allow for narrow signal photon and idler photon bandwidths. By way of non-limiting example, an entanglement time of $T_e = 2.5 \times 10^{-12}$ seconds and a non-linear crystal length of l=25 mm may be used.

Entanglement time 710 generally affects the ETPA cross-section independently from the RTPA cross-section. In most cases, it is typically possible to produce entangled photons with an entanglement time 710 that allows for entangled two-photon absorption, without substantially affecting their random (not entangled) two-photon absorption properties.

Figure 8:
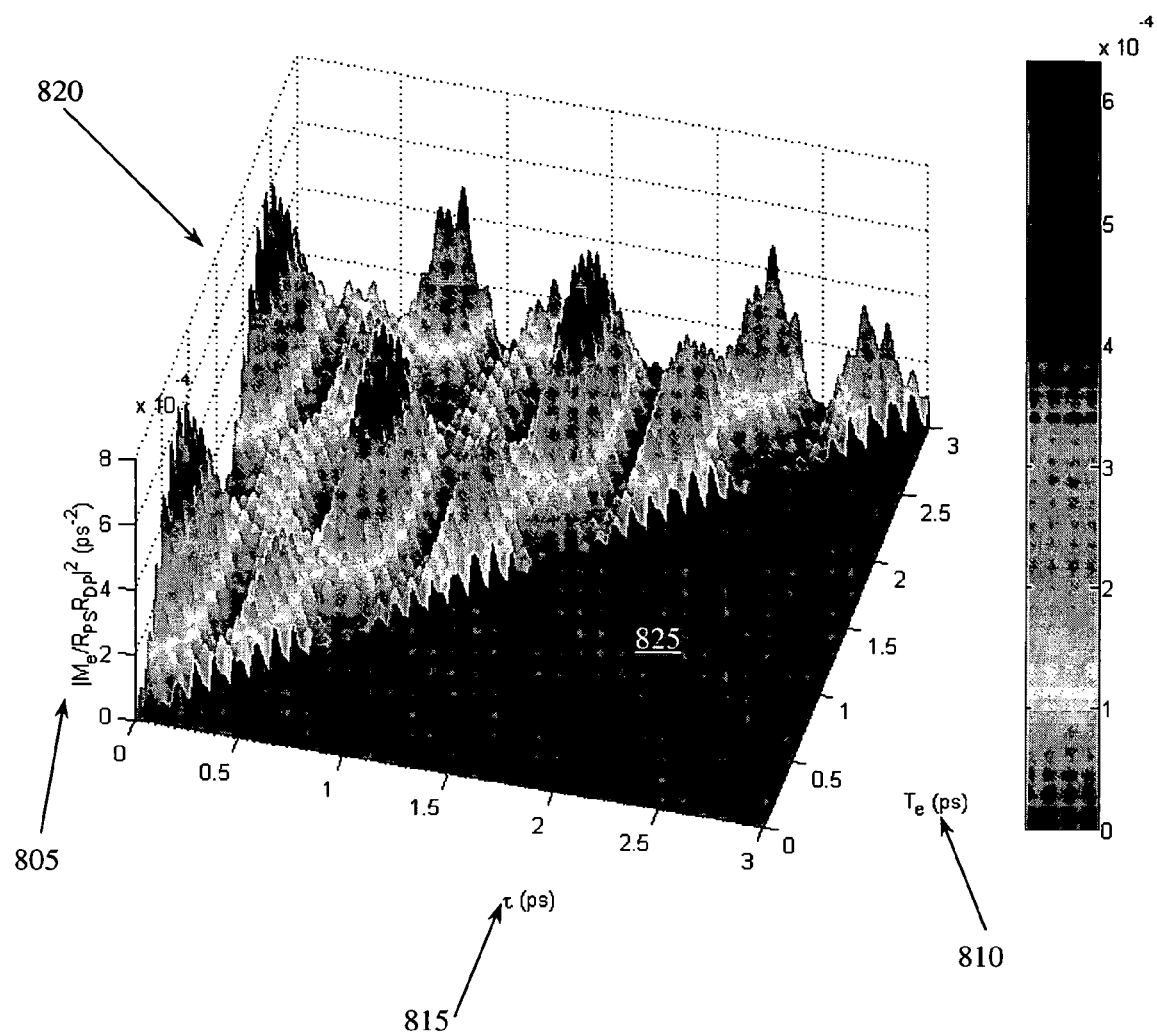
FIG. 8 is a plot of an approximation to an entangled two-photon absorption matrix element for $^{87}$Rb as a function of both entanglement time and delay time for the embodiment of FIG. 2.

FIG. 8 is a chart illustrating how both entanglement time 810 and delay time 815 affect entangled two-photon absorption for the transition of FIG. 6. Delay time 815, denoted "$\tau$", measures how long one photon is delayed with respect to the other. By way of non-limiting example, delay time 815 is accomplished via mirror apparatus portion 250 of FIG. 2. In FIG. 8, ETPA matrix element approximation 805 as a function of entanglement time 810 and delay time 815 may be described as, by way of non-limiting example:

$$\left|\frac{M_e}{R_{PS}R_{DP}}\right|^2 = B^2\cos^2((d_a - \delta)\tau) + C^2\cos^2((d_a + \delta)\tau) + \quad (14)$$
$$D^2\cos^2((d_b - \delta)\tau) + 2BC\cos(dT_e)\cos((d_a - \delta)\tau)\cos((d_a + \delta)\tau) +$$
$$2BD\cos((d - 2\delta)T_e)\cos((d_a - \delta)\tau)\cos((d_b - \delta)\tau) +$$
$$2CD\cos(2\delta T_e)\cos((d_b + \delta)\tau)\cos((d_b - \delta)\tau).$$

In equation (14), $R_{PS}$, $R_{DP}$, B, C, D, $d_a$, $d_b$, d, and $\delta$ are as above in reference to FIG. 6. FIG. 8 is a plot of equation (14). The entanglement time slice 820 of FIG. 8 for zero delay time (i.e., when $\tau$=0) is identical to the graph of FIG. 7. Region 825 corresponds to the delay time being greater than the entanglement time. In general, other materials and their associated ETPA transitions have analogous charts to that of FIG. 8.

Figure 9:
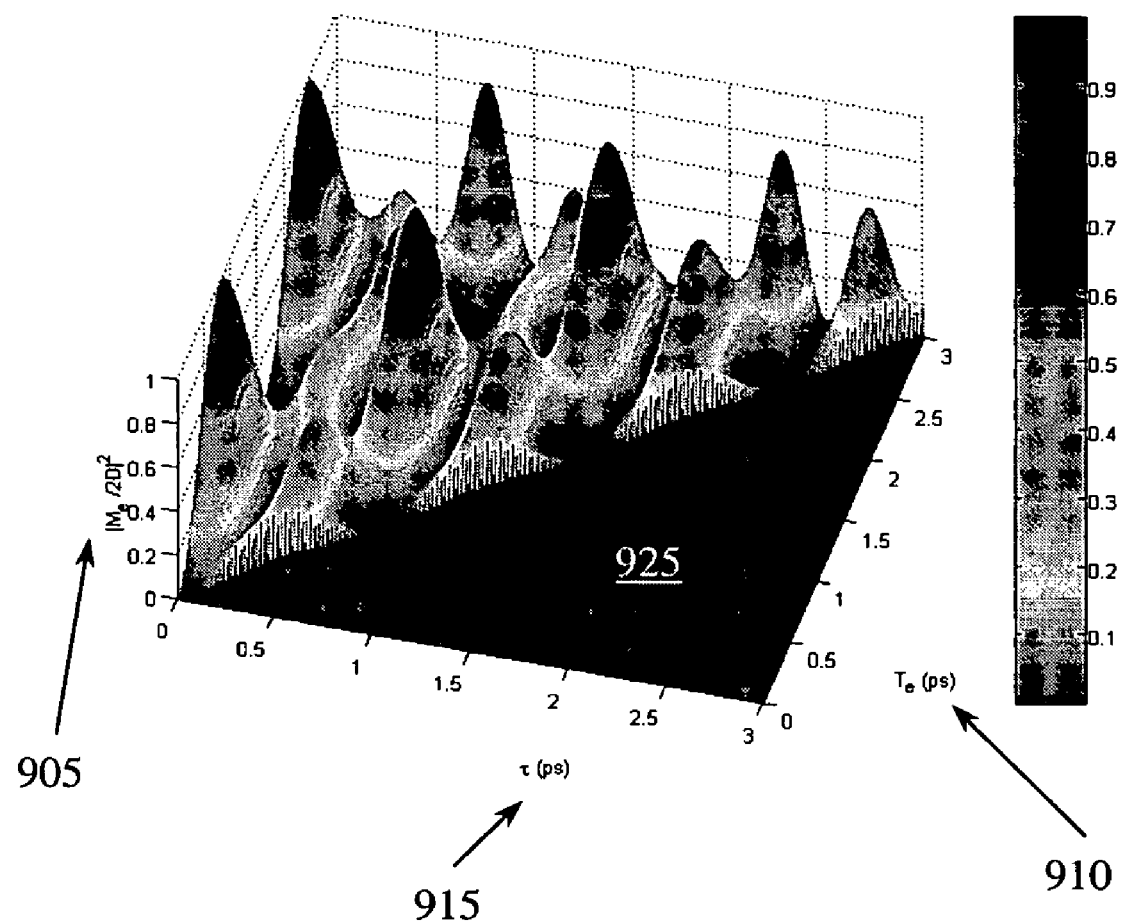
FIG. 9 is a simplified version of the plot of FIG. 8.

FIG. 9 is a plot of a simplified approximation 905 to the ETPA matrix element for $^{87}$Rb associated with FIG. 6 as a function of both entanglement time 910 and delay time 915. That is, FIG. 9 is a plot of the graph depicted in FIG. 8 after high frequency components have been removed. The resulting plot depicts the largest contributing term in the right-hand-side of equation (14), which my be represented as, by way of non-limiting example:

$$\left|\frac{M_e}{R_{PS}R_{DP}}\right|^2 \cong \qquad (15)$$
$$4D^2[\sin^2 d_b \tau(\sin^2 \delta\tau - \sin^2 \delta T_e) + \sin^2 \delta T_e \cos^2 \delta\tau] \text{ where } |\tau| \le T_e.$$

Equation (15) is the result of removing terms dependent on B (these terms are generally smaller than the others) from equation (14). Region 925 corresponds to the delay time being greater than the entanglement time, which makes it appear that the entangled photon originated from outside the nonlinear crystal. Delay time τ may be negative (not shown in FIG. 9) consistent with equation (15).

Figure 10:
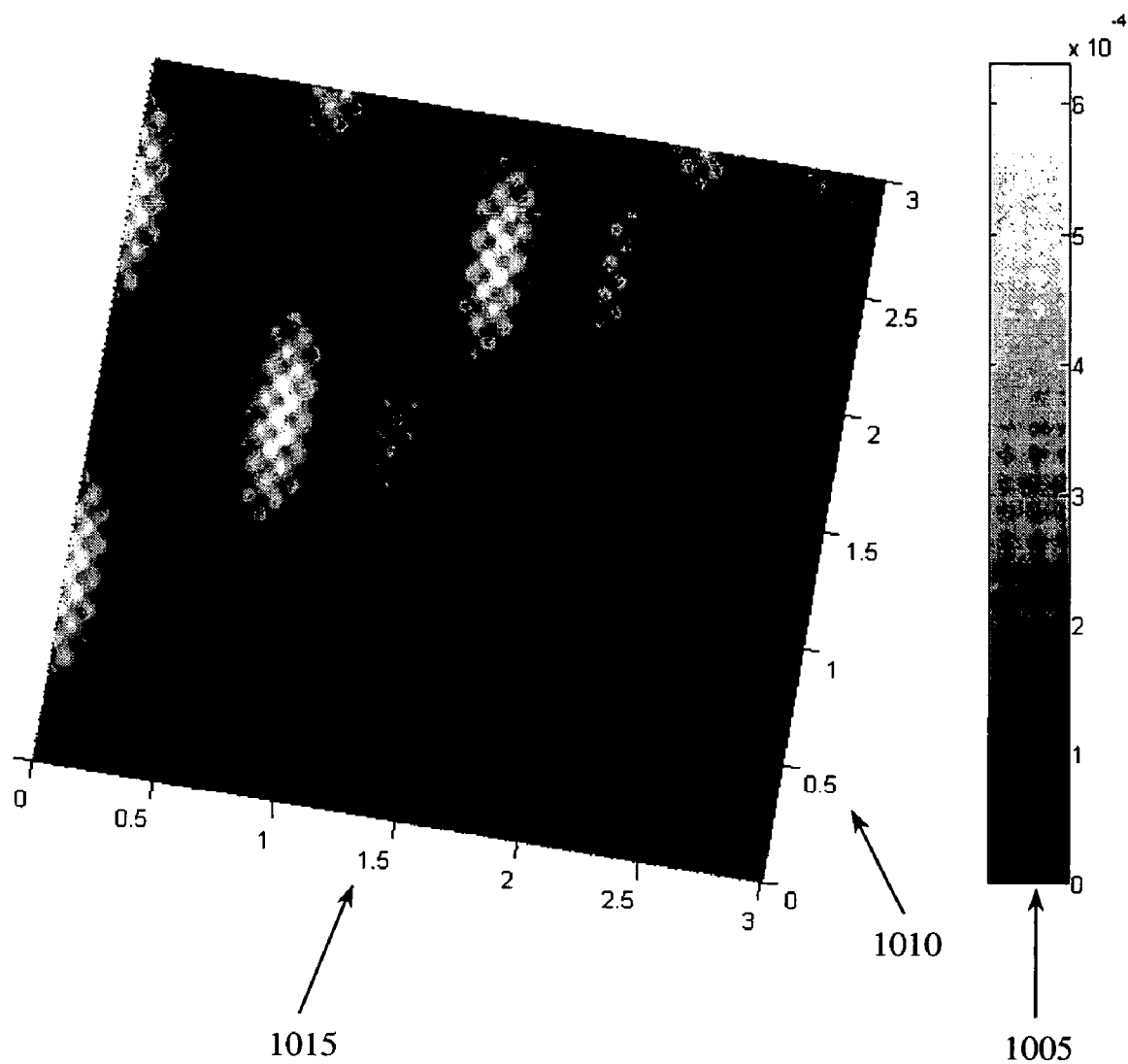
FIG. 10 is a top view detail of the plot of FIG. 8.

FIG. 10 is a top view detail of the plot of FIG. 8. Shades of grey 1005 represent an approximation of the ETPA cross-section described by equation (14) as a function of entanglement time 1010 and delay time 1015.

Figure 11:
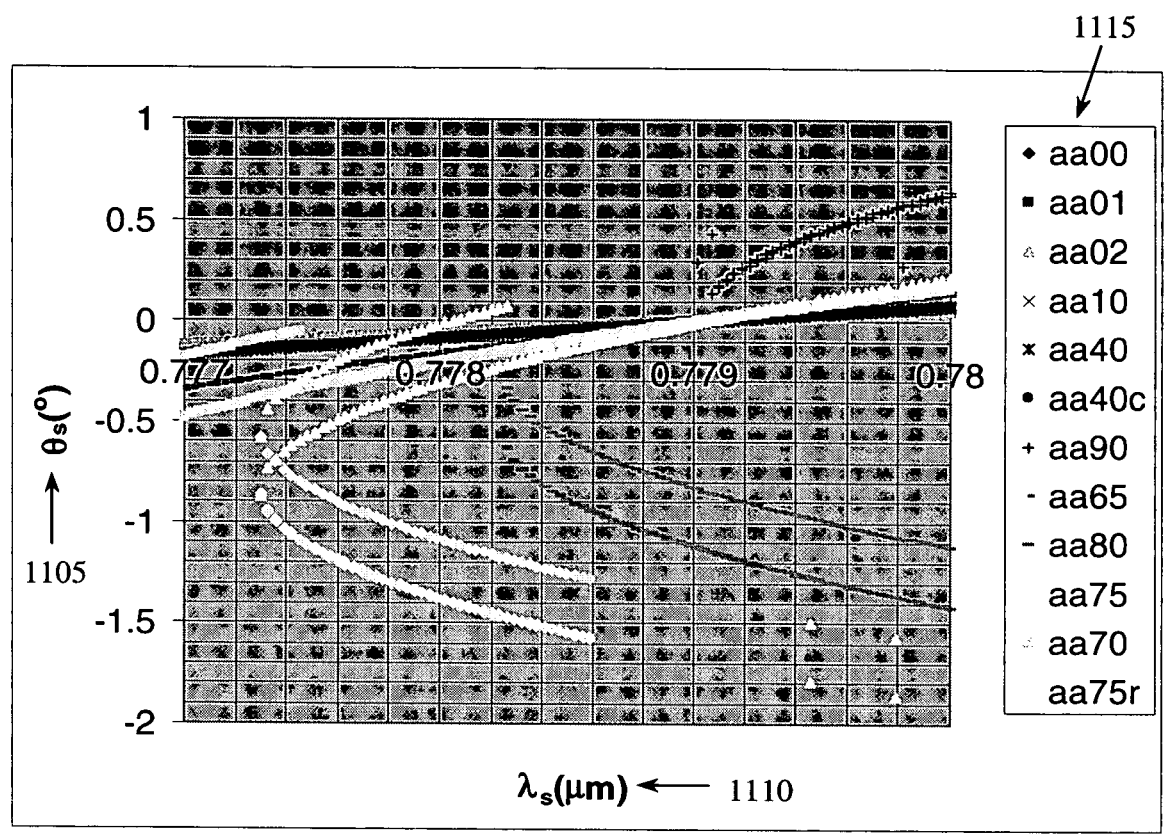
FIG. 11 is a phase matching plot for beta barium borate.

FIG. 11 is a plot of BBO parameters (e.g., wavelengths, angles, etc.) for entangled-photon pair production and selection. Specifically, signal photon wavelengths $\lambda_s$ 1110 at different azimuthal angles aa 1115 appear at different signal photon opening angles $\theta_s$ 1105. Signal photon opening angles $\theta_s$ 1105 are measured in degrees with respect to the originating beam (i.e., the pump beam). Thus, a signal photon opening angle $\theta_s$ 1105 is the angle formed between the pump beam and the signal photon's trajectory. Azimuthal angles aa 1115 are measured from the xz-plane, which may be chosen to be parallel to the crystal sides for uniaxial crystals such as BBO. Azimuthal angles aa 1115 are measured counterclockwise starting from the lower half of the xz-plane to the point at which the signal photon exits the crystal.

One of ordinary skill in the art can calculate corresponding idler photon parameters from the data of FIG. 11. Alternately, a corresponding chart for idler photons may be generated by those of ordinary skill in the art. By way of non-limiting example, techniques for producing such a chart are taught in Boeuf et al., *Calculating Characteristics of Non-collinear Phase-matching in Uniaxial and Biaxial Crystals* (draft Aug. 27, 1999), available from the National Bureau of Standards.

The graph depicted in FIG. 11 may be used to select parameters of a frequency-selective aperture (e.g., 235 of FIG. 2). In particular, the graph of FIG. 11 indicates where signal photons of different wavelengths appear upon exiting the crystal. Idler photon locations may be determined from FIG. 11 or from an analogous chart. By setting a frequency-selective aperture to allow signal photons and corresponding idler photons of particular wavelengths to pass, biphotons of various energy distributions (as measured by, e.g., distance to degeneracy δ of FIG. 6) may be chosen. One of ordinary skill in the art may configure such a frequency-selective aperture using FIG. 11.

The graph depicted in FIG. 11 may also be used to determine entanglement area $A_e$. Entanglement area is a quantity associated with the region in which a single photon gives rise to two entangled photons. The entanglement area may be approximated as, by way of non-limiting example: $A_e \approx \lambda_s \lambda_i / [\sin(\theta_s) \sin(\theta_i)]$, where $\lambda_s$, $\lambda_i$ are the wavelengths of the signal and idler photons, respectively, and $\theta_s$, $\theta_i$ are the opening angles of the signal and idler photons, respectively.

Figure 12:
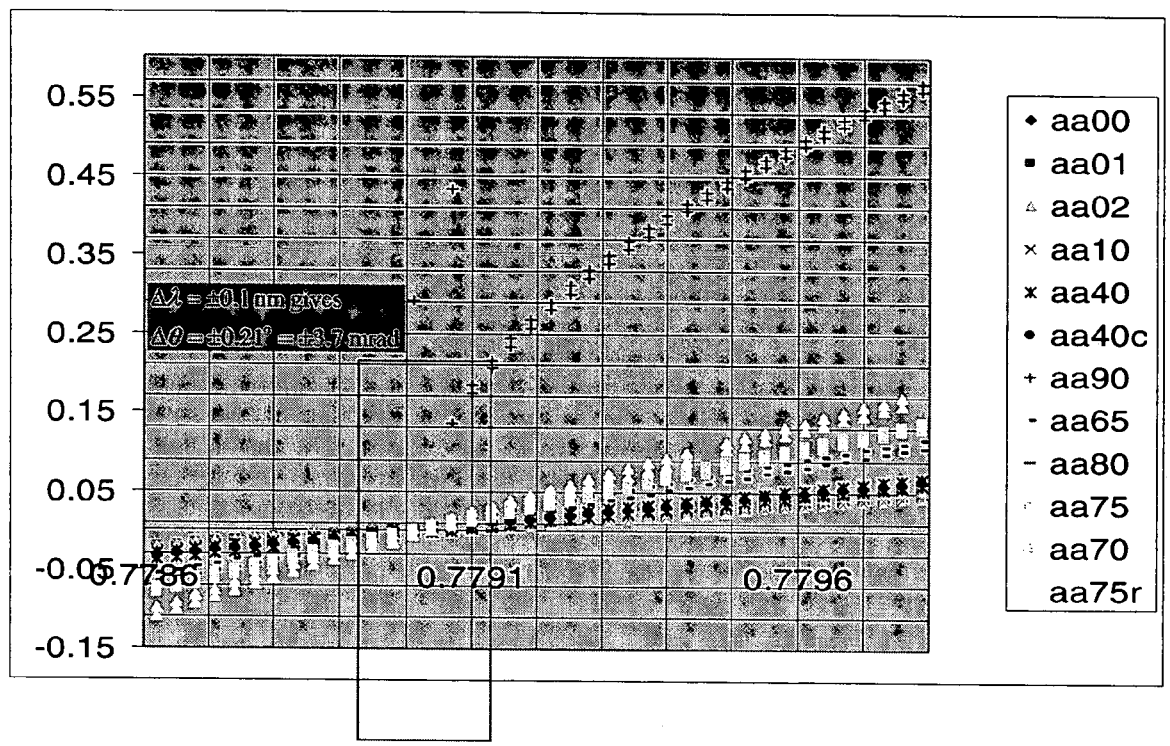
FIGS. 12 and 13 are detail portions of the plot of FIG. 11.
Figure 13:
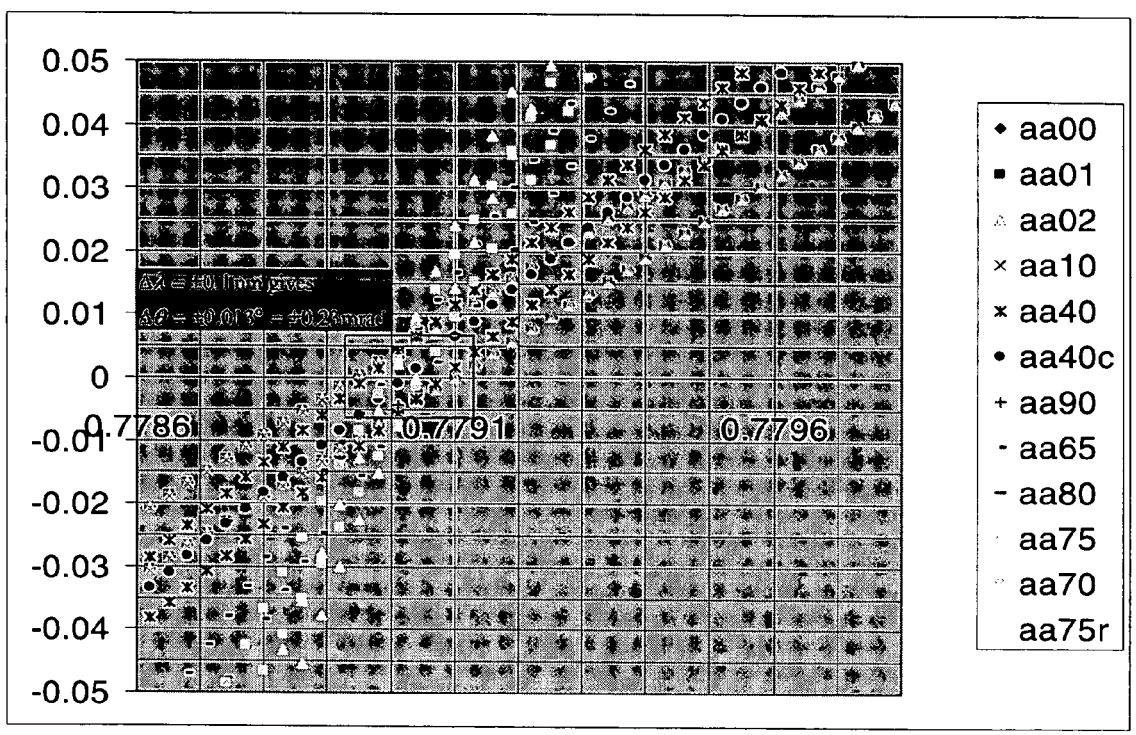

FIGS. 12 and 13 are detail portions of the graph of FIG. 11.

Figure 14:
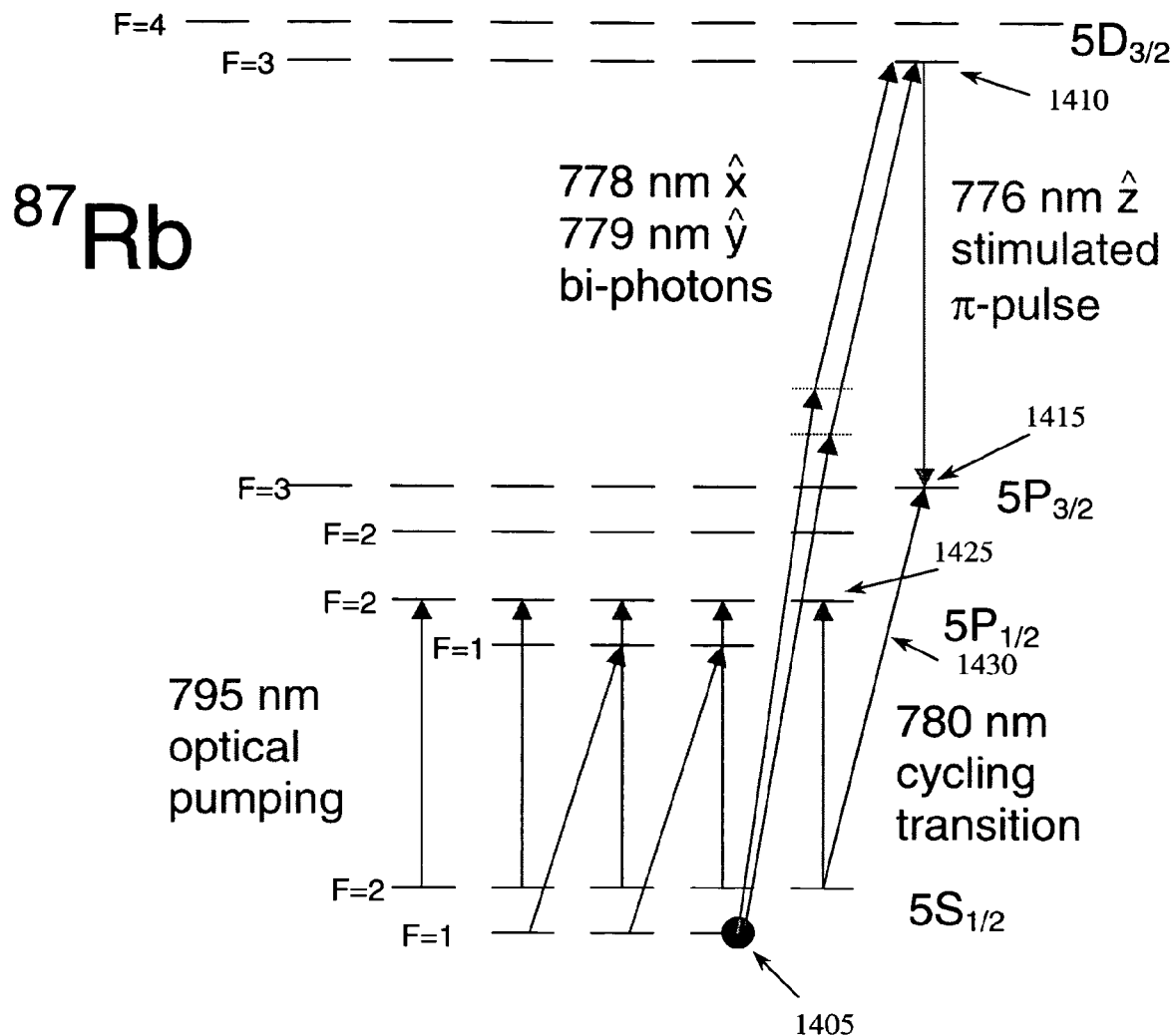
FIG. 14 is a schematic diagram of entangled photon detection using cycling transitions.

FIG. 14 depicts a preferable way to enhance entangled-photon-absorption detection. In particular, FIG. 14 depicts $^{87}$Rb energy levels used for cycling transitions. Preferably, fluorophotons cause repeated cycling of photons, thereby enhancing biphoton-absorption detection. Each row in FIG. 14 corresponds to the total angular momentum taking into account nuclear spin, which is usually denoted by F. Each column corresponds to the projection of F onto the z-axis, normally denoted by $m_f$ (z-axis refers to a convention in the art associated with an alignment of a non-linear crystal). The z-axis here is parallel to a direction of propagation of the signal photons and the idler photons. The $^{87}$Rb is preferably prepared by optically pumping with 795 nm circularly polarized light prior to absorption detection. This conditioning tends to drive the $^{87}$Rb state to $5S_{1/2}$ with hyperfine structure parameters F=1 and $m_f$=1, 1405. The 795 nm optical pump is then turned off, and the $^{87}$Rb receives entangled photons. From this state 1405, entangled-photon absorption excites the $^{87}$Rb to $5D_{3/2}$, F=3, and $m_f$=3 1410. A 776 nm z stimulated laser π-pulse is propagated $^{87}$Rb, which causes excited state 1410 to drop to $5P_{3/2}$, F=3, and $m_f$=3, 1415. From there, the state falls to F=2 state 1425, from which it repeatedly gets excited back up to $5P_{1/2}$, F=2, $m_f$=2 state 1425 by way of a 780 nm cycling transition.

Figure 15:
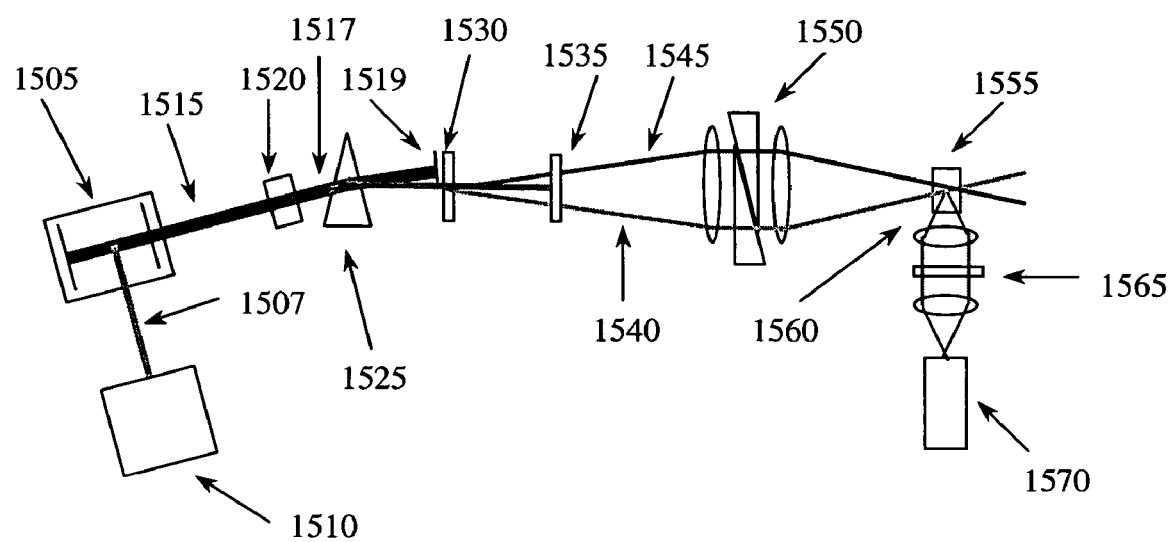
FIG. 15 depicts an apparatus for detecting entangled photons.

FIG. 15 depicts an entangled photon detector. To produce the initial photons, YAG laser 1510 pumps dye laser 1505 with, by way of non-limiting example, 532 nm light 1507. Dye laser 1505 produces 760 nm light 1515, which is directed to doubling crystal 1520. Doubling crystal 1520 converts 760 nm light to 380 nm light 1517. Red block prism 1525 separates 380 nm light from any remaining 760 nm light. Remaining 760 nm light is blocked by shield 1519, and 380 nm light is directed to BBO crystal 1530. Filter 1535 removes 380 nm light that might have passed through BBO crystal 1530, and allows, by way of non-limiting example, 554 nm signal photons 1540 and 1209 nm idler photons 1545 to pass. After variable delay 1550 (e.g., a Babinet compensator) signal photons 1540 and idler photons 1545 are directed to BSM cell 1555 (containing, e.g., $^{87}$Rb). BSM fluoresces in response to entangled photon absorption, producing 420 nm fluorophotons 1560. Interference filter 1565 screens out unwanted photons, allowing only 420 nm fluorophotons 1560 to reach photomultiplier tube 1570. Photomultiplier tube 1570 detects fluorophotons 1560, thereby indicating entangled photon absorption. YAG laser may be, by way of non-limiting example, a DCR2a manufactured by Spectra-Physics of Mountain View, Calif. Dye may be LDS 765, manufactured by Exciton, Inc. of Dayton, Ohio.

Figure 16:
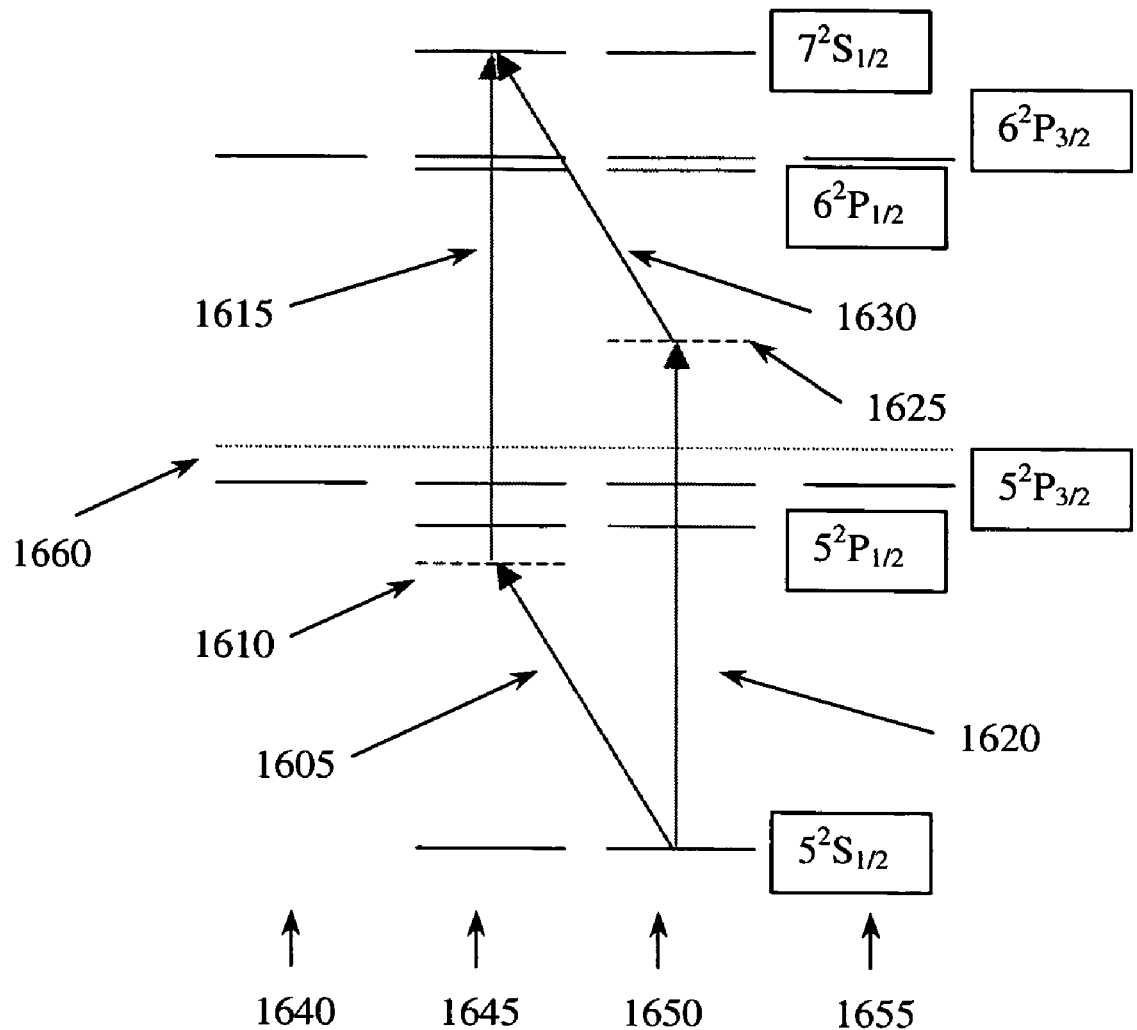
FIG. 16 depicts $^{87}$Rb entangled two-photon absorption energy transitions for the embodiment of FIG. 15.

FIG. 16 depicts an ETPA energy level transition consistent with the apparatus of FIG. 15. That is, FIG. 16 depicts an entangled photon absorption exciting a $^{87}$Rb molecule from initial state $5^2S_{1/2}$ with $m_j$=½ to excited state $7^2S_{1/2}$ with $m_j$=-½ (where $m_j$ is the projection of total angular momentum onto the z-axis). This excitation can occur in two different ways, each associated with a different photon order of arrival. Path 1605, 1615 corresponds to the x-polarized 1209 nm idler photon arriving before the z-polarized 554 nm signal photon. In this path, idler photon 1605 transitions the energy level to virtual state 1610. Separate amplitudes exist for each of the four intermediate states $5^2P_{1/2}$, $5^2P_{3/2}$, $6^2P_{1/2}$, and $6^2P_{3/2}$ with $m_j$=-1/2 for this order of photon arrival. Path 1620, 1630 corresponds to the z-polarized 554 nm signal photon arriving before the x-polarized 1209 nm idler photon. In this path, signal photon 1605 transitions the energy level to virtual state 1625. There are similarly separate amplitudes for each of the four intermediate states $5^2P_{1/2}$, $5^2P_{3/2}$, $6^2P_{1/2}$, and $6^2P_{3/2}$ with $m_j$=1/2 when the signal photon arrives before the idler photon. Each column of FIG. 16 corresponds to a different total angular momentum projection onto the z-axis (i.e., $m_J$). In particular, columns 1640, 1645, 1650, 1655 correspond to an $m_J$ of $-\frac{3}{2}$, $-\frac{1}{2}$, $\frac{1}{2}$, and $\frac{3}{2}$, respectively. The photon degeneracy level is denoted in FIG. 16 by line 1660. The above-described transition is exemplary and is not meant to be limiting.

The transition between $5^2S_{1/2}$ and $7^2S_{1/2}$ energy levels depicted in FIG. 16 has several advantages. In particular, it is the only transition that can be driven according to the pump frequency, and the distance from actual to virtual states is large compared with the hyperfine splittings. Initial and final state preparation is therefore unnecessary. Additionally, the detuning from degeneracy δ is relatively large, approximately 146 THz. This allows for strong suppression of RTPA that is relatively insensitive to variations in signal and idler photon frequencies.

Figure 17:
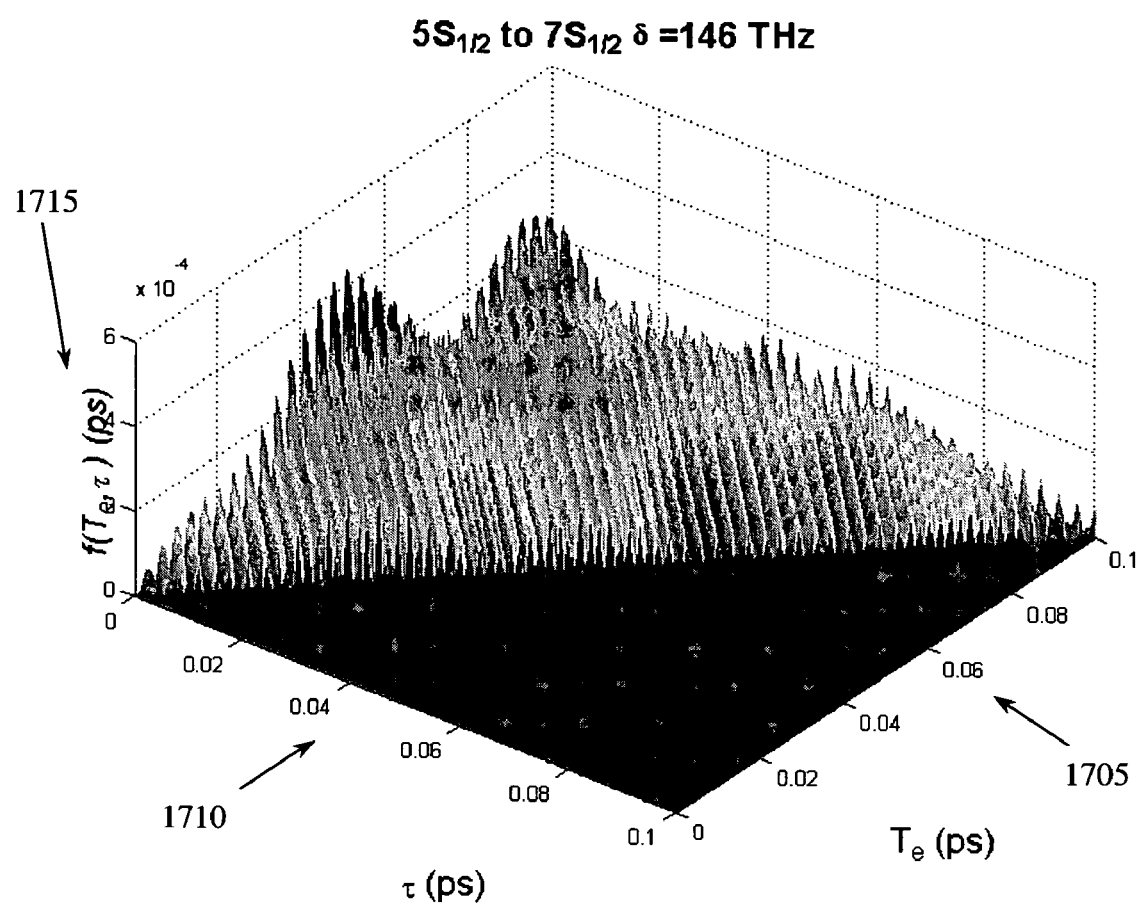
FIG. 17 is a plot of an approximation to an entangled two-photon absorption cross-section for $^{87}$Rb consistent with the embodiment of FIG. 15.

FIG. 17 is a plot of an approximation to an entangled two-photon absorption cross-section for $^{87}$Rb consistent with the embodiment of FIGS. 15 and 16. ETPA cross-section may be described, by way of non-limiting example, as:

$$\sigma_e = \frac{\pi \omega_s \omega_i |M_e|^2}{4 T_e A_e \Delta \omega_p} = \frac{\pi \omega_s \omega_i}{4 A_e \Delta \omega_p} \frac{R_{7SSP}^2 R_{5P5S}^2}{81} f(T_e, \tau). \quad (16)$$

The parameters of equation (16) are the same as those described above in reference to equation (4), except $\Delta\omega_p$ represents the bandwidth of the pump laser, $$R_{7SSP}^2 = 1.5 a_0^2$$

is the radial matrix element for the 5P to 7S transition, and $$R_{5P5S}^2 = 26.4 a_0^2$$

is the radial matrix element for the 5S to 5P transition, where $a_0$ is the Bohr radius. In equation (16), $f(T_e, \tau)$ represents the portion of $\sigma_e$ that is dependent on entanglement time and delay times $T_e$ and $\tau$, respectively. It is $f(T_e, \tau)$ that is graphed in FIG. 17. The entanglement area $A_e$ in equation (16) is approximately proportional to the square of the ratio of pump wavelength to signal photon angle. This may be represented as, by way of non-limiting example:

$$A_e \sim \left(\frac{\lambda_p}{\theta_s}\right)^2 = 1.4 \times 10^{-7} \text{cm}^2. \quad (17)$$

The ETPA cross-section for the embodiment of FIGS. 15-17 may be described using equation (11) as, by way of non limiting example:

$$\sigma_e = \frac{\pi (540.667 \times 10^{12})(248.13 \times 10^{12})(2\pi)}{4(1.4 \times 10^{-7})(2 \times 10^9)} \quad (18)$$

$$\frac{(1.5)(26.4)(0.529 \times 10^{-8})^4}{81} f(T_e, \tau)$$

$$= 9.05 \times 10^{-7} f(T_e, \tau)(\text{cm}^2)$$

-continued $$\sigma_e^{(\max)} = 9.05 \times 10^{-7} (4.2 \times 10^{-16})(\text{cm}^2)$$

$$\sigma_e^{(\max)} = 3.8 \times 10^{-22} (\text{cm}^2)$$

In equation (18), $$\sigma_e^{(\max)}$$

approximates the maximal value that $\sigma_e$ may take on as $T_e$ and $\tau$ vary. Note that $\sigma_e$ and $$\sigma_e^{(\max)}$$

are not limited to the above, exemplary values. Furthermore, the values substituted into equation (15) to arrive at equation (18) are meant to be exemplary and are not meant to be limiting.

Figure 18:
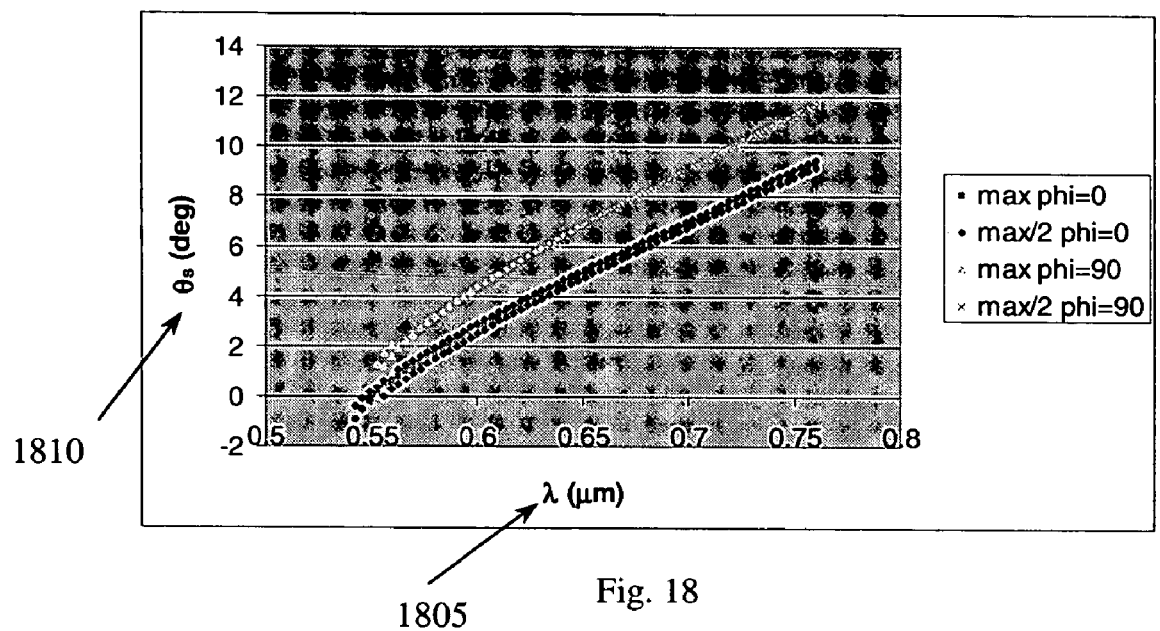
FIG. 18 is a phase-matching plot for beta barium borate that depicts parameters relevant to the embodiment of FIG. 15.

FIG. 18 is a phase-matching plot for beta barium borate that depicts parameters relevant to, inter alia, the embodiment of FIGS. 15-17. In particular, FIG. 18 depicts signal photon angle 1810 as a function of signal photon wavelength 1805 for a pump azimuthal angle of 56°.

The rate of ETPA detection (i.e., the number of ETPA absorption detections per laser pulse) may be described for, inter alia, the embodiment of FIGS. 15-17 as follows. For an exemplary, non-limiting angle between the crystal axis and pump beam of $\theta_p = 56°$, the non-linear coefficient for BBO may be described as, by way of non-limiting example:

$$\chi_{\text{eff}} = \chi_{BBO} \sin^2\theta_p = \sin^2\theta_p * 5.5 \times 10^{-9} \text{ cm/statV} = 3.8 \times 10^{-9} \text{ cm/statV}. \quad (19)$$

The ratio of signal photon stream power $P_s$ to pump photon stream power $P_p$ may be described as, by way of non-limiting example:

$$\frac{P_s}{P_p} = \frac{4\pi^2 n_s \hbar \omega_s^4 \omega_i l \theta_p^2 \chi_{BBO}^2 \sin^4 \theta_p}{|n_s - n_i| n_p c^4} \quad (20)$$

$$= \frac{4\pi^2 (1.590497)(1.054572 \times 10^{-27})(5.407 \times 10^{14})^4}{|-0.061513|(1.61085)(2.998 \times 10^{10})^4}$$

$$= 2.48 \times 10^{-6} l \theta_p^2$$

$$= 1.24 \times 10^{-7} \theta_p^2.$$

Equation (20) assumes, by way of non-limiting example, a crystal of length l=0.05 cm. The symbols $n_s$, $n_i$, $n_p$ represent the indices of refraction for the signal, idler, and pump photons, respectively, and c is the speed of light. For a YAG laser power of about 3.6 W, it is generally possible to achieve a pump laser power of about 0.5 W. For a 20% doubling crystal efficiency, the average pump power into the BBO crystal would be about 100 mW, or 10 mJ per 5 ns duration pulse at a 10 Hz repeat rate with a $0.5 \times 10^{-7}$ duty factor. With these parameters, the rate of signal photon production at an angle of maximal production may be described as, by way of non-limiting example:

$$R_s = \frac{4\pi^2 n_s \omega_s^3 \omega_i l \theta_p^2 \chi_{BBO}^2 \sin^4 \theta_p}{|n_s - n_i| n_p c^4} P_p \qquad (21)$$

$$= \frac{4\pi^2 (1.590497)(5.407 \times 10^{14})^3}{|-0.061513|(1.61085)(2.998 \times 10^{10})^4} P_p$$

$$= \frac{(2.4813 \times 10^{14})(2\pi)^4 l \theta^2 (3.8 \times 10^{-9})^2}{|-0.061513|(1.61085)(2.998 \times 10^{10})^4} P_p$$

$$= 6.924 \times 10^{12} l \theta_p^2 P_p (W)$$

$$= 3.46 \times 10^{11} \theta^2 P_p (W)$$

The parameters of equation (21) are as above. For a signal photon bandwidth spanning 530 nm to 650 nm, the acceptance angle of 5.7° gives a solid angle of 0.01, and $R_s$=3.5×$10^9$ $P_p$W. Thus, the average rate of biphoton pair production would be $R_s$=3.5×$10^8$ s$^{-1}$. This yields a rate of 3.5×$10^7$ biphotons produced per laser pulse. At 340° C., $^{87}$Rb density is $\rho$=$10^{17}$ cm$^{-3}$. For a beam divergence of 0.1 radian, an entanglement area of (4 μm)$^2$ can typically be maintained over about 40 μm longitudinally. These parameters give an absorption probability of $P_{abs}$=$\sigma \rho l_{int}$=1.5×$10^{-7}$. With a detection efficiency of $\eta_{det}$=$10^{-3}$ this gives a detection rate $R_{det}$=$\eta_{det} R_s P_{abs}$=0.05 s$^{-1}$, or one ETPA detection every 200 laser pulses. Note that the calculations, quantities, and parameters considered in this paragraph are exemplary, and are not meant to be limiting.

Entangled photon detection has a variety of applications. By way of non-limiting example, entangled-photon pairs can carry information in their delay times. Each entangled-photon pair can encode one of several (e.g., three, four, eight, 50, etc.) information states, each information state represented by a different specific delay time. A sender modulates information into a plurality of entangled photon pairs by delaying one photon (by way of non-limiting example, the signal photon) of each pair according to the desired information state encoded by that pair. A receiver determines which delay time each entangled-photon pair encodes by passing the entangled-photon pairs through a bank of BSM cells.

Figure 19:
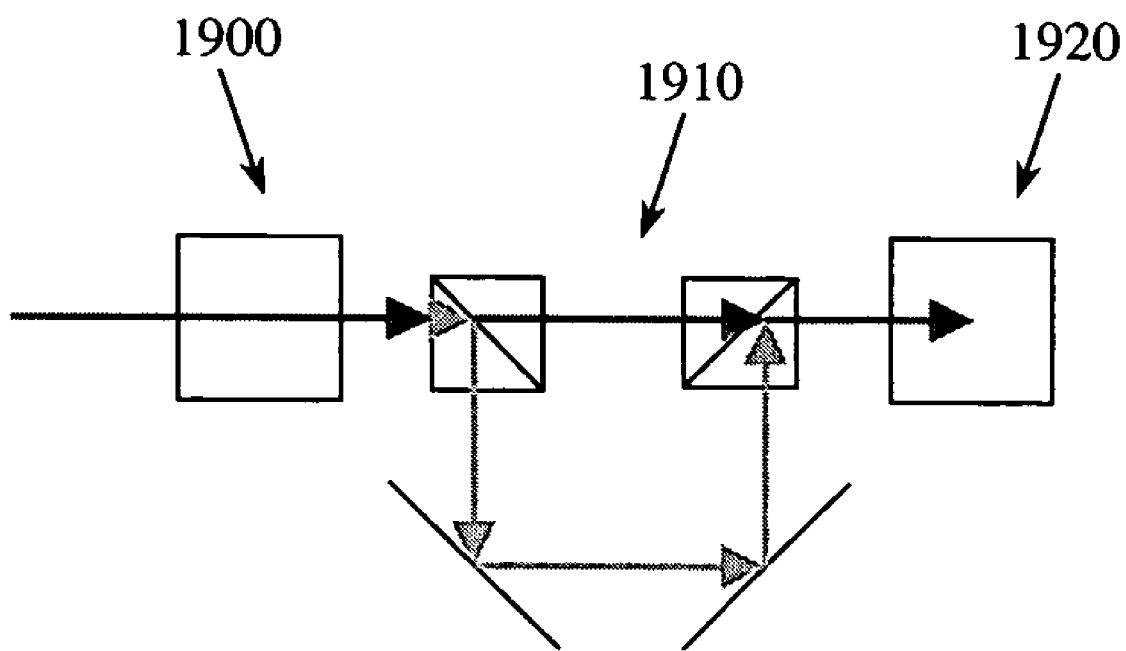
FIG. 19 depicts a receiver for information-encoded biphotons.

FIG. 19 depicts, by way of non-limiting example, a bank of two such BSM cells 1900, 1920. Each BSM cell is separated from its neighboring cell by a delay line 1910 designed to delay one of the photons (in this non-limiting example, the idler photon) by a particular delay time. In FIG. 19, BSM cell 1900 is separated from BSM cell 1920 by delay line 1910. An entangled-photon pair with a delay time of τ will be absorbed by the n-th BSM cell, where the cumulative delay times produced by the delay lines after the first n−1 BSM cells sum to τ. The delay time encoded by a particular entangled-photon pair may thereby be determined by monitoring which BSM cell registers an ETPA absorption. In this manner, entangled-photon pairs may carry multi-state information. For a particular embodiment where each entangled-photon pair carries one of two states in its delay time, standard binary encoding may be affected. Similarly, by using $2^n$ distinguishable delays, it is possible to encode n bits of information in single entangled pair. Multiply-entangled photons (e.g., three or more) may also carry information in delay times among each component photon.

Figure 20:
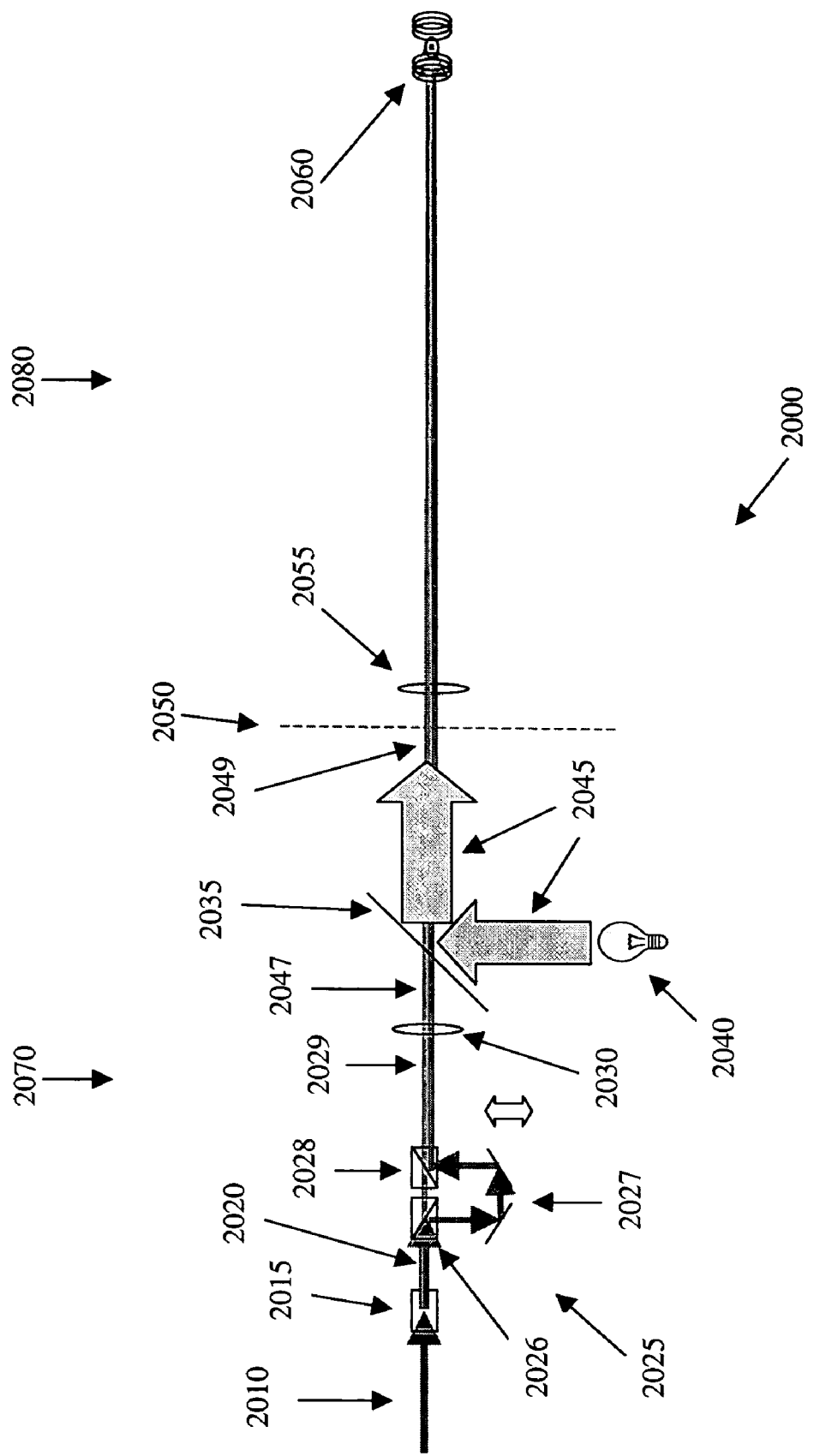
FIG. 20 depicts a quantum steganography system according to an embodiment of the present invention.

FIG. 20 depicts a quantum steganography system 2000 according to an embodiment of the present invention. System 2000 includes a sender portion 2070 and a receiver portion 2080. In sender portion 2070, beam 2010 is directed to non-linear crystal 2015, which produces entangled photon beam 2020. Beam 2010 may be generated using a laser or a low-intensity (e.g., single-photon) source. Entangled photon beam 2020 is directed to controllable delay 2025.

Entangled photon beam 2020 enters controllable delay 2025 at first PBS 2026, where it is split into a signal photon beam and a corresponding idler photon beam. By way of non-limiting example, the signal photon beam passes straight through first PBS 2026 and second PBS 2028. Continuing this example, the corresponding idler photon beam is directed by first PBS 2026 to translatable mirror set 2027, which directs the idler photon beam to second PBS 2028. Second PBS 2029 returns the idler photon beam to the path of the signal photon beam to produce entangled-photon beam 2029.

Controllable delay 2025 modulates information into the inter-biphoton time interval by physically translating mirror set 2027. In delay mode, translatable mirror set 2027 is positioned such that the idler photon beam is delayed with respect to the signal photon beam. In no-delay mode, translatable mirror set 2027 is adjusted such that no inter-biphoton delay results. The signal photon path may require insertion of a slight delay in order to match the brief diversion of the idler photons by adjustable delay 2025 when in no-delay mode. By way of non-limiting example, binary information may be modulated into inter-biphoton delay times by associating a binary zero (0) with no-delay mode and associating a binary one (1) with delay mode. Thus, manipulating controllable delay 2025 modulates information into the inter-biphoton time interval of transmitted biphotons. A controllable delay embodiment with no moving parts that may be substituted for controllable delay 2025 is presented below in reference to FIG. 21. Other techniques for controlling inter-biphoton delay are also possible.

After exiting controllable delay 2025, beam 2029 is prepared for transmission to receiver portion 2080. Beam 2029 is directed to collimation optics 2030, which converts beam 2029 into beam 2047 configured to travel to receiver portion 2080. Optional confounding light source 2040 produces confounding light 2045. Polarizing beam splitter 2035 injects confounding light 2045 into beam 2047 to produce combined beam 2049. Dotted line 2050 demarcates sender portion 2070 from receiver portion 2080. As such, dotted line 2050 may represent free space, optical fiber, atmosphere, vacuum, or any other suitable transmission medium.

At receiver portion 2080, focusing optics 2055 receives and directs combined beam 2049 to BSM device 2060. BSM device 2060 absorbs and detects entangled-photons and does not detect random photons as described herein. More particularly, BSM device 2060 detects entangled photon pairs whose constituent photons arrive at and are absorbed by the same BSM molecule within the associated entanglement time. Controllable delay 2025, when in delay mode, preferably delays one photon of each entangled-photon pair by an amount of time greater than the associated entanglement time (e.g., on the order of one picosecond). Thus, entangled photon pairs whose constituent photons are separated in time by controllable delay 2025 are generally not detected by BSM device 2060. Entangled photons whose constituent photons are not delayed relative to each-other are generally detected by BSM device 2060. Controllable delay 2025 thereby determines the results of entangled photon detection by receiver portion 2080.

Receiver portion 2080 generates output data corresponding to the information modulated into entangled photon beam 2049 by sender portion 2070. When controllable delay 2025 is in delay mode, entangled photons produced by sender portion 2070 are not detected by receiver portion 2080; when controllable delay 2025 is in no-delay mode, receiver portion 2080 detects the transmitted entangled photons. Thus, the embodiment of FIG. 20 detects modulated information as the presence or absence of entangled photons with no inter-biphoton delay ("on-off encoding"). Receiver portion 2080 detects and outputs the delay modes as conventionally-represented binary zeros (0) and ones (1) (e.g., as two distinct voltage levels). By way of non-limiting example, a bit value of zero (0) corresponds to detecting an entangled-photon pair, and a bit value of one (1) corresponds to no detection. Receiver portion 2080 may report its output data to a conventional computer (not shown), where it may be output in human-readable form or further processed (e.g., converted to text according to ASCII codes).

Because no entangled photons are detected when controllable delay 2025 is in delay mode, receiver portion 2080 is preferably synchronized with sender portion 2070 in order to correctly determine the information modulated into the transmitted entangled photons. Convention clocking logic is preferably included in sender portion 2070 and receiver portion 2080 for this purpose. Such clocking logic partitions the operation time into distinct time bins, each of which corresponds to a transmitted bit of information. Receiver portion 2080 reports a bit associated with each time bin according to whether or not receiver portion 2080 has detected an entangled-photon pair during that time bin. Any number of entangled-photon pairs may be transmitted in each time bin. Because security obtains using the present embodiment even without intercept detection, each time bin may contain multiple entangled-photon pairs without sacrificing security.

Confounding light, when used, may be any of a variety of types. Confounding light may be narrow or broad spectrum. Confounding light source 2040 may be a laser, an incandescent or fluorescent lamp, or any other light source. Confounding light 2045 may contain light of the same frequency, frequencies, polarization, or polarizations as any, or a combination, of the signal photons, the idler photons, and pump beam 2010. Confounding light may contain other frequencies or polarizations in addition or in the alternative. Confounding light 2045 may be "covering" light, that is, light intended to cover the presence of the underlying entangled photons. Such covering light is preferably broad spectrum light. More preferably, covering light is high-intensity white light. Confounding light 2045 may be obfuscatory, or designed to obscure or deflect attention from the underlying modulated entangled photons. Obfuscatory light is preferably conventionally modulated (e.g., AM or FM) with a false message. More preferably, obfuscatory covering light is narrow-band and conventionally modulated with statistically uniformly-distributed noise so as to mimic an encrypted message. Confounding light 2045 may be used for reverse obfuscation. Reverse obfuscation refers to combining a relatively high-intensity entangled-photon beam containing information with a relatively weak random photon beam containing a false message encoded using traditional modulation techniques. The relatively weak random photon beam may be narrow-band or broad-band. In reverse obfuscation, the brighter entangled-photon beam contains the message intended to be transmitted. In any of these techniques, the false or decoy message may contain actual information or may be simulated or real noise.

Ambient light, such as Raleigh-scattered sunlight, may also serve as confounding light for the modulated entangled photons. Classical techniques for detecting entangled photons are useless in the presence of such ambient light, particularly if the entangled-photon beam is low intensity. Such a low-intensity entangled-photon beam may be generated at a lower transmission rate than the rate of ambient light photons of the same color and polarization. A potential eavesdropper not expecting entangled photons cannot detect a message encoded in an entangled photon property (such as inter-biphoton time intervals) in the presence of ambient light.

Confounding light may be used to hide or distract attention from the intended message encoded in the entangled photons. A potential eavesdropper would likely commit resources to decrypting or acting on the false or decoy message and miss the information hidden in the entangled photons. Entangled photons may be detected according to the techniques taught herein regardless as to the presence of random photons. Moreover, entangled photons may be detected and distinguished from random photons even if random photons of the same frequency and/or polarization (as the signal photons, idler photons, or pump beam) are simultaneously present. Traditional techniques for detecting entangled photons (e.g., electronic coincidence counting) cannot distinguish entangled photons from random photons that happen to arrive at detectors simultaneously. The embodiment of FIG. 20 thus effectively hides information in entangled photons, which are preferably present together with confounding light random photons.

Quantum steganography as disclosed herein provides many advantages over other forms of information hiding. Entangled photon beam 2047 may be produced to be uniform in all of the classical physics parameters, such as intensity, color, and polarization. No receiver-side processing of individual photons will distinguish the entangled photons. Inter-biphoton delay is a relative property of an entangled photon pair, and as such can only be extracted by a receiver if both members of the pair are detected. The information stored in the pair is ephemeral and will not survive the absorption of either member. No amount of post-processing of information gained by detecting individual photons will yield information contained in entangled-photon properties. Moreover, no classical test is capable of revealing inter-biphoton delays in beam 2047. The entangled photons of beam 2047 may only be detected by quantum mechanical techniques. Thus, even without confounding light, modulated inter-biphoton delays cannot be detected by any technique of classical physics.

Figure 21:
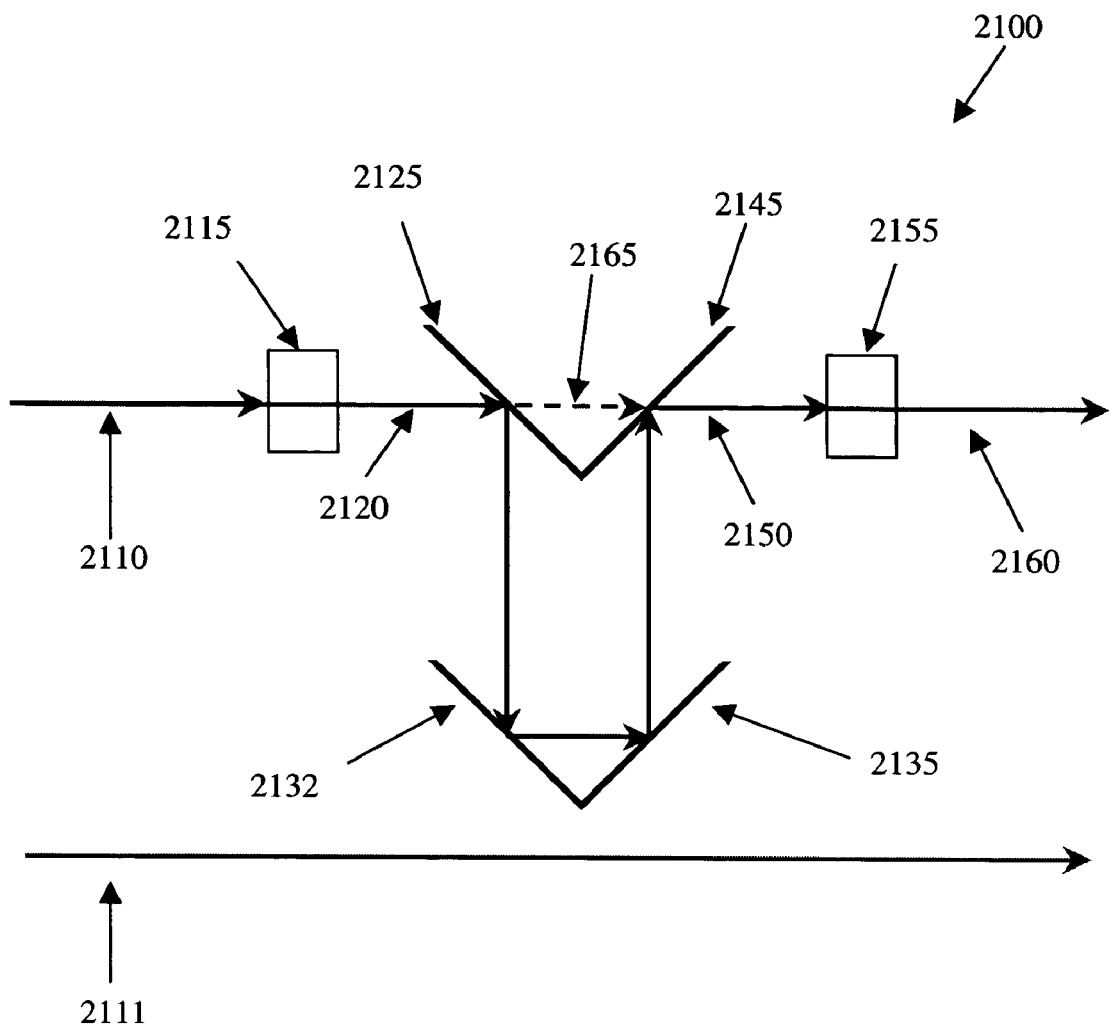
FIG. 21 depicts a controllable delay according to an embodiment of the present invention.

FIG. 21 depicts a controllable delay 2100 according to an embodiment of the present invention. The controllable delay embodiment of FIG. 21 uses no moving parts and may be substituted for controllable delays 2025, 2227, 2525, and 2725 in the embodiments of FIGS. 20, 22, 25, and 27, respectively. For such a substitution, an entangled-photon beam (e.g., 2020 of FIG. 20) may be first separated (not shown) into signal photons 2111 and idler photons 2110 using, for example, a PBS. One of the beams, by way of non-limiting example idler photon beam 2110, is passed through controllable delay 2100 before being re-joined (not shown), if applicable, at the output of controllable delay 2100 with signal photon beam 2111.

Controllable delay 2100 employs Pockel cells 2115, 2155, which are electro-optical crystals capable of changing horizontally-polarized photons into vertically-polarized photons and vice-versa when activated. Controllable delay 2100 is in delay mode and introduces an inter-biphoton delay when Pockel cells 2115, 2155 are activated. By way of non-limiting example, idler photons 2110 entering controllable delay 2100 are horizontally polarized. These entering horizontally-polarized photons 2110 are converted to vertically-polarized photons 2120 by activated first Pockel cell 2115. Vertically-polarized photons 2120 are directed by first polarizing beam splitter 2125 to first mirror 2132 and then second mirror 2135. Photons leaving second mirror 2135 are directed by second polarizing beam splitter 2145 to second Pockel cell 2155. Activated second Pockel cell 2155 converts the vertically-polarized photons back to horizontal polarization and passes them from controllable delay 2100 to join (not shown) signal photon beam 2111.

Controllable delay 2100 is in no-delay mode and introduces no inter-biphoton delay when Pockel cells 2115, 2155 are inactive. Entering horizontally-polarized idler photons 2110 pass through inactive first Pockel cell 2115 unaffected. These photons 2120 pass through first polarizing beam splitter 2125 as depicted by dotted line 2165. Photons 2165 pass through second polarizing beam splitter 2145 and inactive second Pockel cell 2155 unchanged. Idler photons 2160 exiting controllable delay 2100 may subsequently join (not shown) their corresponding signal photons 2111 using, by way of non-limiting example, a PBS.

Figure 22:
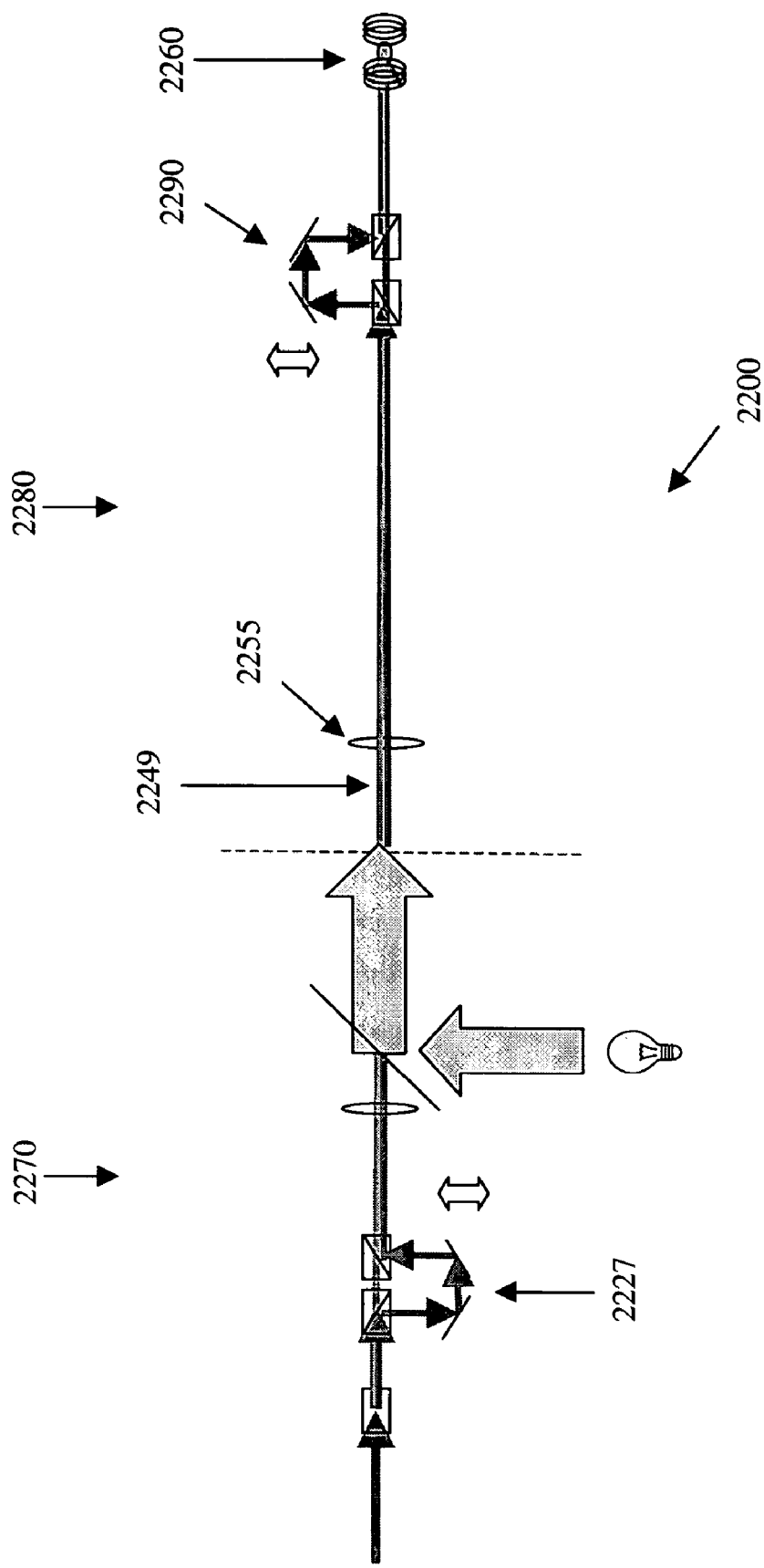
FIG. 22 depicts a quantum steganography system with a receiver delay according to an embodiment of the present invention.

FIG. 22 depicts a quantum steganography system 2200 with a receiver delay according to an embodiment of the present invention. System 2200 includes sender portion 2270 and receiver portion 2280. Sender portion 2270 is essentially identical to sender portion 2070 of the embodiment of FIG. 20. Sender portion 2270 produces entangled photons, and controllable delay 2227 (or substitute controllable delay 2100) modulates information into the biphotons' inter-biphoton time interval. More particularly, sender portion 2270 modulates the inter-biphoton delay of transmitted biphotons into one of two states, represented as $\Delta t_1$ and $\Delta t_2$. One of $\Delta t_1$ and $\Delta t_2$ may be zero (0), in which case the modulation scheme is as described above in reference to FIG. 20. Alternately, both $\Delta t_1$ and $\Delta t_2$ are non-zero, in which case $\Delta t_1$ and $\Delta t_2$ preferably differ from each-other by a time interval greater than the entanglement time (i.e., $|\Delta t_1 - \Delta t_2| > T_e$), and $\Delta t_1$ and $\Delta t_2$ are both preferably greater than the entanglement time (i.e., $\Delta t_1 > T_e$ and $\Delta t_2 > T_e$). Binary information may be encoded by associating one of $\Delta t_1$ and $\Delta t_2$ with a binary value of zero (0) and associating the other of $\Delta t_1$ and $\Delta t_2$ with a binary value of one (1).

Receiver portion 2280 receives beam 2249 via focusing optics 2255 and directs it to receiver delay 2290. Receiver delay 2290 is essentially identical in construction to controllable delay 2027. Receiver delay 2290 is generally set to produce the same time delay interval as that produced by controllable delay 2227 when in delay mode (typically greater than the entanglement time). However, where by way of non-limiting example, signal photons are sent through controllable delay 2227 in sender portion 2270, it is the corresponding idler photons that are sent through receiver delay 2290 in receiver portion 2280. Thus, receiver delay 2290 removes an inter-biphoton delay if present in received entangled photons and introduces an inter-biphoton delay if absent in received entangled photons. BSM device 2260 detects incident biphotons whose inter-biphoton delay is within the biphotons' entanglement time and does not detect random or entangled photons with an inter-biphoton delay greater than the biphotons' entanglement time. Accordingly, BSM device 2260 detects entangled photons that were delayed by controllable delay 2227 and does not detect entangled photons that were not delayed by controllable delay 2227. The embodiment of FIG. 22 thus employs on-off encoding and preferably includes clocking logic as discussed above in reference to FIG. 20. As with the embodiment of FIG. 20, receiver portion 2280 converts detected information into conventionally-represented binary zeros (0) and ones (1) and reports its output data to a conventional computer.

The embodiment of FIG. 22 is well-suited for delay hopping. "Delay hopping" encompasses changing at least one intra-biphoton delay (or intra-multi-photon delay for multiply-entangled photon embodiments) encoding convention while entangled photons are being sent. That is, delay hopping occurs when the interpretation of one of the modulation inter-biphoton time intervals $\Delta t_1$ and $\Delta t_2$ changes during transmission. As described above and by way of non-limiting example, sender portion 2270 employs two-state modulation of the inter-biphoton time interval. That is, preferably the entangled photons are modulated by configuring each inter-biphoton time interval as one of two states: $\Delta t_1$ and $\Delta t_2$. An embodiment that employs delay hopping may change one or both of $\Delta t_1$ and $\Delta t_2$ during operation so that subsequently-transmitted biphotons are modulated using the new state(s). (Embodiments discussed below that modulate using more than two inter-biphoton time intervals may change one or more such states during delay hopping.) To accomplish delay hopping, sender portion 2270 may merely alter the translation position(s) of controllable delay 2227 to affect alternate inter-biphoton delays (e.g., $\Delta t_1'$ instead of $\Delta t_1$ and/or $\Delta t_2'$ instead of $\Delta t_2$). Alternately, to implement delay hopping, sender portion may employ serial delay 2400 of FIG. 24, discussed further below. Delay hopping preferably occurs many times during operation (e.g., after every 8, 10, or 100 bits transmitted, or after certain time intervals), and with many different possible delay states (e.g., 3, 8, or 100).

Receiver delay 2290 is preferably set to match at least one of the modulation delays at all times. Receiver portion 2290 detects entangled-photon pairs whose inter-biphoton delay matches the delay affected by receiver delay 2290. When such a matching occurs, receiver portion 2280 detecting an entangled-photon pair reports, by way of non-limiting example, a logical one (1) bit value for the corresponding time bin. Receiver portion 2280 in a delay hopping embodiment adjusts fixed delay 2290 during operation to match at least one of the new delays whenever sending portion 2270 implements a new delay state. Over time, a particular logical bit value (in this example, one (1)) may therefore correspond to several different inter-biphoton delays in delay-hopping embodiments. Continuing the example, note that receiver portion 2280 need not alter receiver delay 2290 every time sender portion 2280 implements a new delay state. Rather, receiver portion 2280 typically implements a new delay state when sender portion 2270 changes the delay that corresponds with detecting an entangled photon pair. Such detection corresponds with "on" in on-off encoding, and in this example is represented by the particular logical bit value of one (1).

Delay hopping modes include preset delay hopping and dynamic delay hopping. "Preset delay hopping" encompasses delay hopping for a communication according to a schedule for altering sender and receiver delay states that is shared between sender portion 2270 and receiver portion 2280 prior to the communication. Such a delay-hopping schedule may be sent in a prior communication between sender portion 2270 and receiver portion 2280. Alternately, or in addition, the delay-hopping schedule may be transmitted over a different communication channel, such as the internet, telephony, or a messenger. Preferably, the delay-hopping schedule is encrypted when send over a classical (non-quantum) channel.

"Dynamic delay hopping" encompasses delay hopping according to information specifying modulation inter-biphoton time interval changes that is transmitted during the communication. Such delay-hopping information may be transmitted as part of the communication itself or via a separate channel, such as the internet or a telecommunications channel. For the former, delay-hopping information is preferably transmitted at regular intervals in the quantum channel and according to pre-arranged conventions regarding which inter-biphoton time intervals correspond to which transmitted delay-hopping information.

Conveying the dynamic delay hopping information over the quantum steganographic channel circumvents even an eavesdropper's knowledge of the method of transmission. An eavesdropper attempting to launch a so-called "man-in-the-middle" attack would require very efficient intercept and retransmit capability and prior knowledge of the method and hopping schedule to intercept the message without noticeably degrading the data channel. This gives the authorized receiver a few orders of magnitude advantage over an eavesdropper, which requires that the eavesdropper make it up in better intercept efficiency than the receiver. As disclosed herein, the modulated entangled-photon beam may be on the order of single-photon-pair intensity, and the receiver-side BSM is capable of detecting single entangled-photon pairs. A legitimate receiver's single-photon-pair detection efficiency coupled with delay-hopping ensures that the message is effectively intercept-proof.

Figure 23:
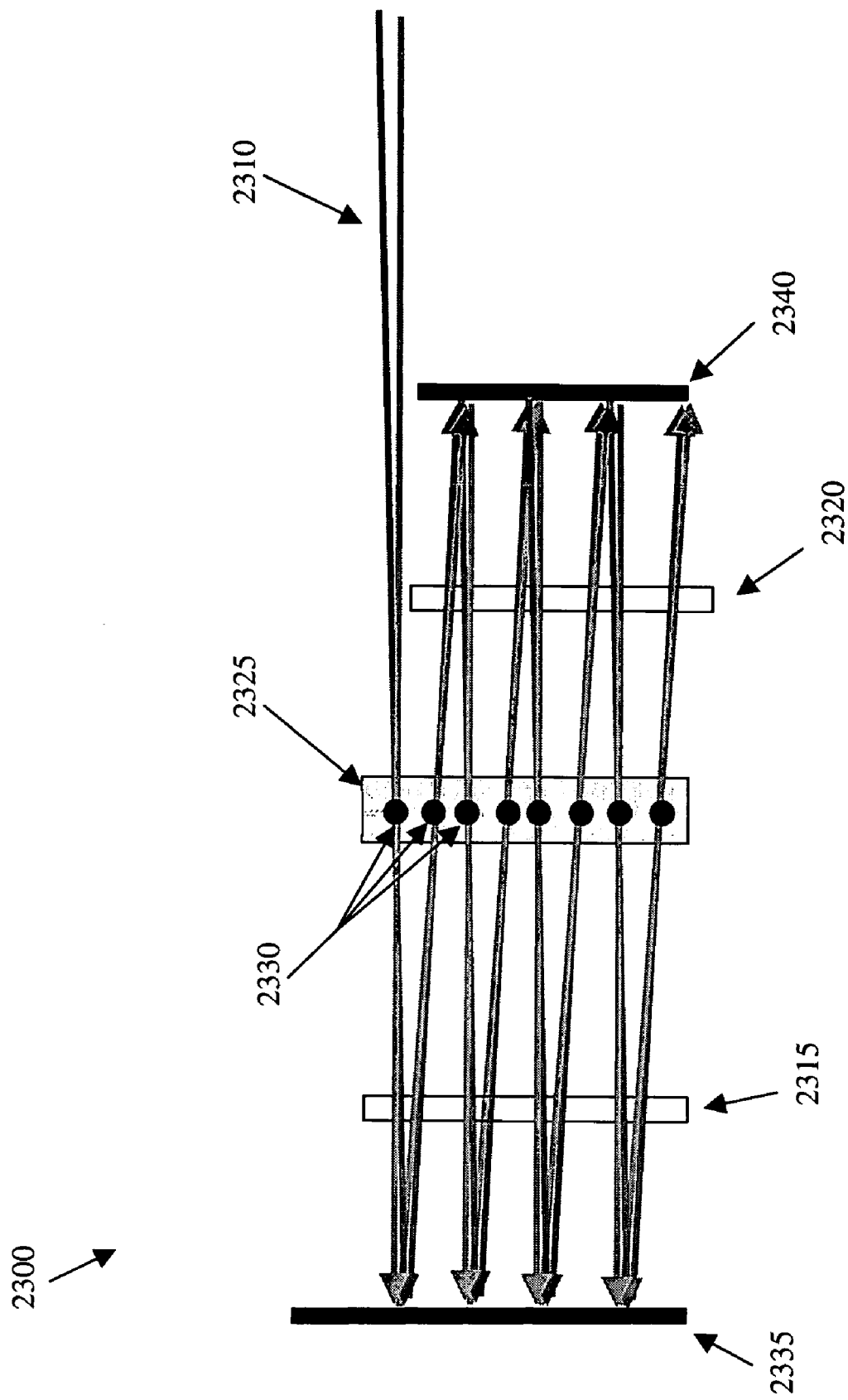
FIG. 23 depicts a serial entangled-photon detector according to an embodiment of the present invention.

FIG. 23 depicts a serial entangled-photon detector 2300 according to an embodiment of the present invention. Such a detector is capable of detecting entangled photons having a variety of inter-biphoton time intervals. More particularly, detector 2300 is capable of detecting and distinguishing entangled photons with any one of seven (7) different inter-biphoton delays, or no inter-biphoton delay at all. Detector 2300 accordingly has eight (8) different BSM regions 2330 in a single BSM vapor cell 2325. Each BSM region 2330 is coupled to a fluorescence detector or other detector, which detects indicia of entangled-photon absorption and may report the same to a standard computer (not shown). Detectors capable of detecting and distinguishing other numbers of inter-biphoton delays are also possible.

For detector 2300 to detect biphotons with different inter-biphoton delays, a pair of birefringent phase delay filters 2315, 2320 are used to delay propagation of each (by way of non-limiting example) signal photon relative to its corresponding idler photon. BSM vapor cell 2325 detects biphotons when they arrive at a BSM region 2330 within their entanglement time. An entangled-photon pair having an inter-biphoton delay greater than its entanglement time will pass through a BSM region as if the region were transparent. That is, a biphoton will pass through BSM regions unaffected until its inter-biphoton delay is adjusted to be below its entanglement time. Each pass through birefringent phase delay filter 2315 or 2320 delays the signal photon (by way of non-limiting example) with respect to the idler photon. Once the signal photon is sufficiently delayed such that the inter-biphoton delay is less than the entanglement time of the biphoton, the biphoton will be absorbed by the following region in the linear array of BSM regions 2330 and cause fluorescence. Consequently, the particular BSM region 2330 that fluoresces in the linear array of BSM regions 2330 identifies the particular inter-biphoton delay that was imparted to the biphoton.

Referring to detector 2300, a biphoton will pass to a first region in the linear array of BSM regions 2325 without encountering either of birefringent phase delay filters 2315, 2320. If this first region in the linear array fluoresces, then the inter-biphoton time interval of the absorbed biphoton is zero. If the biphoton is not absorbed by the first region and propagates to the second region, it passes through birefringent phase delay filter 2315 twice, thereby slowing down one photon of the pair thus reducing the relative time delay between the signal and idler photons by one unit of time delay. (A unit of time delay here is preferably any delay greater than the associated entanglement time. Other units of time delay are also possible.) If the second region in the linear array of BSM 2330 fluoresces when the biphoton reaches it, then the biphoton initially carried an inter-biphoton delay represented by one unit of time delay. This process of reflection by mirrors 2335, 2340 and reduction of the time delay by one unit of time by birefringent phase delays 2315, 2320 continues until the signal and idler photons have a relative time delay less than the entanglement time $T_e$. The location of fluorescence within array of BSM regions 2330 therefore indicates the inter-biphoton time interval of the absorbed biphoton. Note that serial detector 2300 is capable of simultaneously detecting multiple biphotons having multiple different inter-biphoton time intervals.

Figure 24:
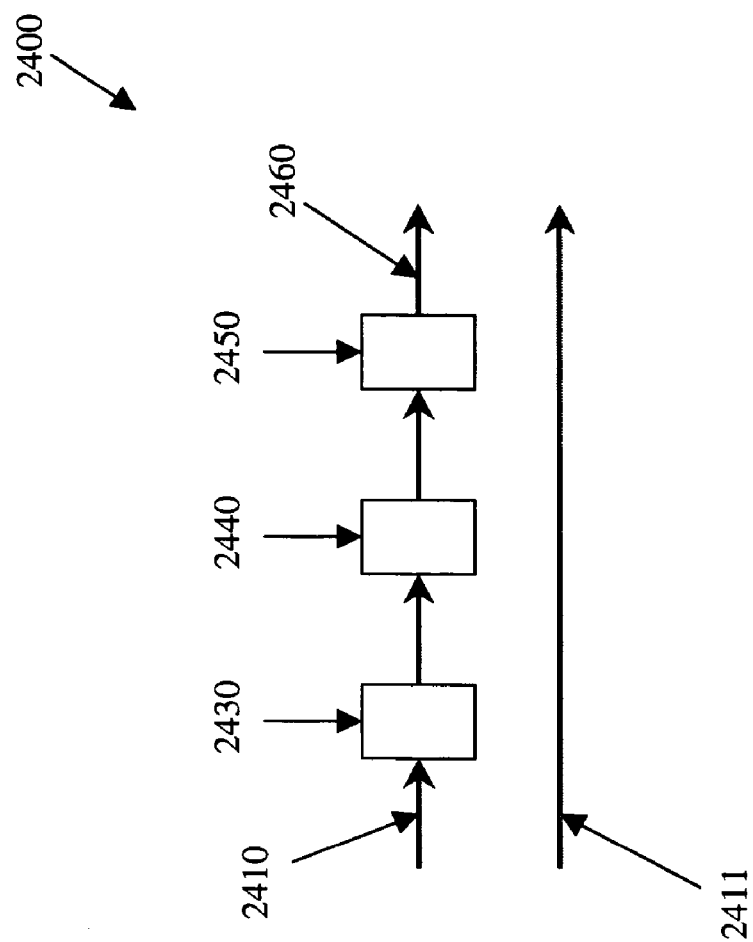
FIG. 24 depicts a serial delay according to an embodiment of the present invention.

FIG. 24 depicts a serial delay 2400 according to an embodiment of the present invention. Serial delay 2400 is capable of imparting any of seven (7) different inter-biphoton delays or no delay at all. For operation of serial delay 2400, a biphoton beam may be first separated (not shown) into signal photon beam 2411 and idler photon beam 2410 using, e.g., a PBS. By way of non-limiting example, idler photon beam 2410 is directed to first controllable delay 2430. Controllable delays 2430, 2440, 2450, are constructed in the same manner as controllable delay 2100 of FIG. 21, except that each of controllable delay 2430, 2440, 2450 imparts a different delay time. More particularly, first controllable delay 2430 is configured to controllably impart a delay of $\Delta t$, second controllable delay 2440 is configured to controllably impart a delay of $2\Delta t$, and third controllable delay 2450 is configured to controllably impart a delay of $4\Delta t$, where $\Delta t$ is a selected time interval preferably greater than the entanglement of the biphotons at issue. Other delays are also possible. Each controllable delay 2430, 2440, 2450 is capable of independent activation. If none of controllable delays 2430, 2440, 2450 are activated, then idler photon beam 2410 will not be delayed at all relative to signal photon beam 2411. Selective activation of controllable delays 2430, 2440, 2450, allows for the imposition of inter-biphoton delays of any multiple less than or equal to seven (7) of $\Delta t$. That is, controllable delay 2400 may impart a delay of 0, $\Delta t$, $2\Delta t$, $3\Delta t$, $4\Delta t$, $5\Delta t$, $6\Delta t$, or $7\Delta t$. These eight different inter-biphoton delays correspond to three bits of information, one bit corresponding to each of controllable delays 2430, 2440, and 2450. To impart an inter-biphoton delay of $5\Delta t$, for example, controllable delays 2450 and 2430 are activated (corresponding to the most-significant bit and the least-significant bit, respectively). Activated controllable delay 2450 imparts a delay of $4\Delta t$ and activated controllable delay 2430 imparts a delay of $\Delta t$. Because the delays imparted by each of controllable delays 2430, 2440, 2450 sum, the net delay imparted by such activation is $5\Delta t = 4\Delta t + \Delta t$. Signal photon beam 2411 and exiting idler photon beam 2460 are preferably rejoined (not shown) after serial delay 2400. Serial delay capable of imposing other numbers of delays are also possible.

Figure 25:
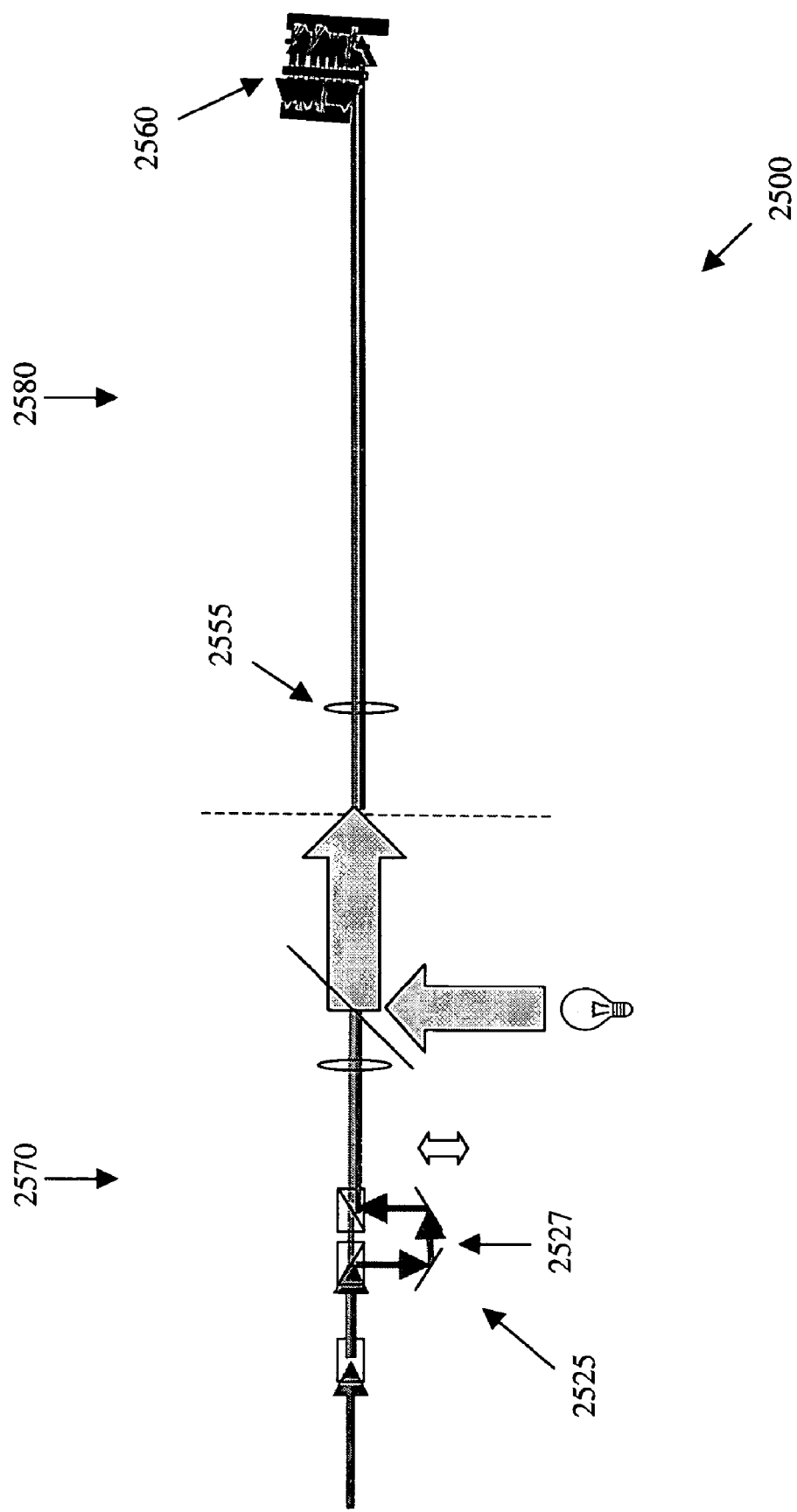
FIG. 25 depicts a quantum steganography system 2500 with a serial entangled-photon detector according to an embodiment of the present invention.

FIG. 25 depicts a quantum steganography system 2500 with a serial entangled-photon detector according to an embodiment of the present invention. System 2500 includes a sender portion 2570 and a receiver portion 2580. Sender portion 2570 is constructed essentially identical to sender portion 2070 of the embodiment of FIG. 20. In particular, sender portion 2570 produces entangled photons, and controllable delay 2527 (or, for example, substitute serial delay 2400) modulates information into the biphotons' inter-biphoton time interval. However, controllable delay 2525 is configured to selectively impart any one of seven (7) different inter-biphoton delays or no delay at all, for a total of eight (8) possible inter-biphoton time intervals. These different delays are accomplished by positioning translatable mirror set 2527 in one of eight (8) different positions. Accordingly, each transmitted biphoton is capable of containing eight different states, which may be thought of as three bits of information.

Preferably, each of the seven delays are multiples of the least nonzero inter-biphoton time interval (e.g., $\Delta t$), which is greater than the entanglement time of the associated entangled photons. Under such a scheme, the following delays are available: 0, $\Delta t$, $2\Delta t$, $3\Delta t$, $4\Delta t$, $5\Delta t$, $6\Delta t$, and $7\Delta t$. Other quantities of delays (e.g., 3, 10, 50, 100) are also contemplated.

Receiver portion 2580 detects and reports the inter-biphoton time intervals of the biphotons that it receives. Focusing optics 2555 receives and directs combined beam 2549 to serial detector 2560. Serial detector 2560 detects biphotons having any of the eight different inter-biphoton time intervals as described above in reference to FIG. 23. Other numbers of inter-biphoton delays are also possible. Note that because receiver portion 2580 is capable of detecting biphotons having any of seven different inter-biphoton delays as well as biphotons having no inter-biphoton delay at all, there is no need for clocking logic to synchronize sender portion 2570 and receiver portion 2580. Nevertheless, clocking logic and synchronization may be employed. The embodiment of FIG. 25 encodes information in the inter-biphoton delays of detected biphotons rather than encoding information in the presence or absence of detected biphotons. That is, information is thus manifested in the inter-biphoton time intervals of biphotons, all of which are detected, as opposed to manifesting information in whether biphotons are detected at all.

In an embodiment of the present invention, controllable delay 2525 of the embodiment of FIG. 25 is replaced with a serial delay such as 2400 of FIG. 24. Such a replacement eliminates moving parts from sender portion 2570. In this embodiment, the eight possible inter-biphoton time intervals are affected by serial delay 2400 instead of controllable delay 2525.

The embodiment of FIG. 25 is capable of transmitting information according to a variety of protocols. By way of non-limiting example, each entangled-photon pair may be thought of as conveying one of eight different possible numbers according to which inter-biphoton delay is imposed. For convenience, the eight different delays available may be labeled $\Delta t_1$, $\Delta t_2$, $\Delta t_3$, $\Delta t_4$, $\Delta t_5$, $\Delta t_6$, $\Delta t_7$, and $\Delta t_8$. Each of these eight different states may converted to conventionally-represented values in a computer according to a variety of conventions. For example, each state maybe converted into a binary representation of the index of the state. That is, $\Delta t_1$ may be converted to a binary representation of the numeral 1, $\Delta t_2$ converted to a binary representation of the numeral 2, $\Delta t_3$ converted to a binary representation of the numeral 3, and so on. In such a representation, each entangled-photon pair carries three bits of information because three bits are required to represent eight different states. Alternately, the eight delay states may be partitioned into those that correspond to a binary one (1) and those that correspond to a binary zero (0). For such a protocol, each entangled-photon pair conveys a single bit.

The embodiment of FIG. 25 is well-suited for delay hopping. By way of non-limiting example, the embodiment of FIG. 25 may be used to transmit binary information coded as two distinct inter-biphoton delays. Continuing this example, the particular inter-biphoton time intervals that correspond to binary zero (0) and one (1) may be changed according to a delay-hopping scheme. An exemplary delay hopping scheme is discussed presently. For the first three received biphotons, zero (0) corresponds with $\Delta t_6$ and one (1) corresponds with $\Delta t_2$. For the next three received biphotons, zero (0) corresponds with $\Delta t_1$ and one (1) corresponds with $\Delta t_3$. And for the next three received biphotons, zero (0) corresponds with $\Delta t_2$ and one (1) corresponds with $\Delta t_5$. According to this exemplary scheme, the detected sequence of delays ($\Delta t_6$, $\Delta t_2$, $\Delta t_2$, $\Delta t_1$, $\Delta t_1$, $\Delta t_3$, $\Delta t_2$, $\Delta t_5$, $\Delta t_2$) corresponds with the following bit values: (0, 1, 1, 0, 0, 1, 0, 1, 0). Delay hopping for the embodiment of FIG. 25 may be preset or dynamic. Thus, the particular mappings between detected inter-biphoton time intervals and their interpretation as bit values may be conveyed from a sender to a receiver ahead of time, or may be conveyed as part of the information transferred by way of entangled photons. Other schemes are also possible.

Figure 26:
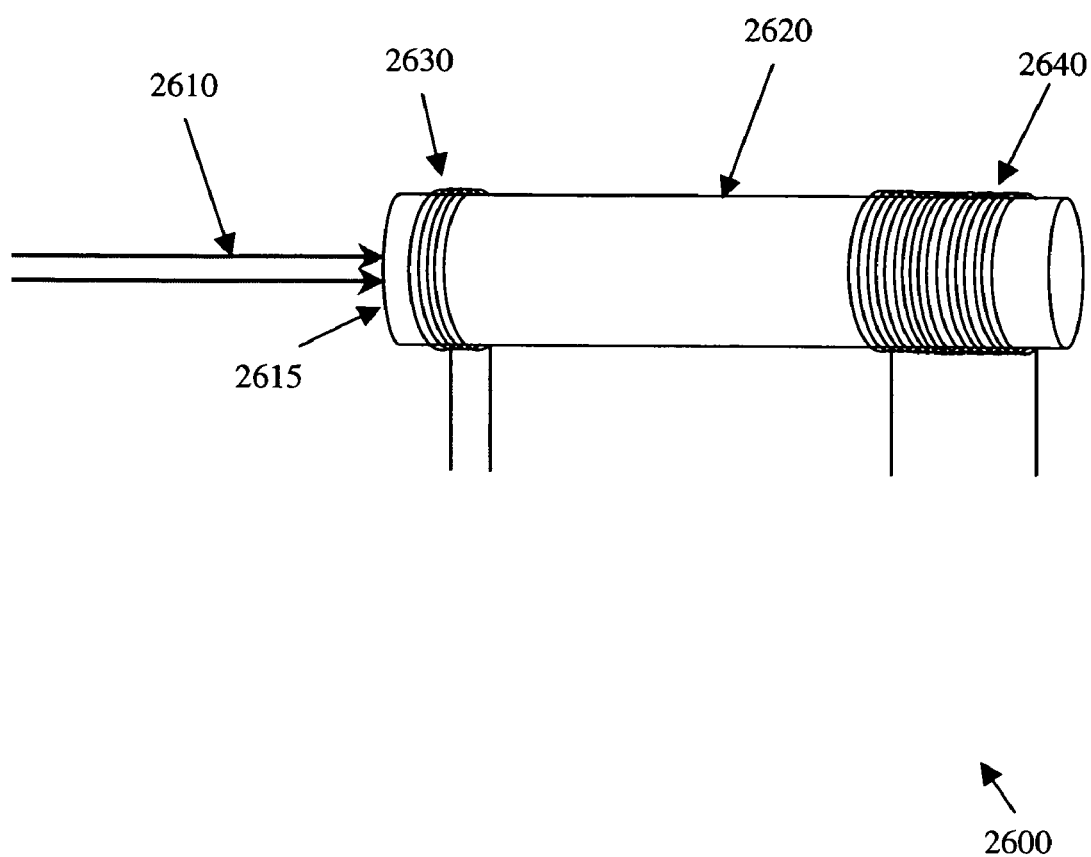
FIG. 26 depicts a BSM vapor cell configured to detect and distinguish entangled photons of different sum frequencies.

FIG. 26 depicts a BSM vapor cell 2600 configured to detect and distinguish entangled photons of different sum frequencies. The embodiment of FIG. 26 includes an optical aperture 2615 through which entangled photons 2610 pass into BSM vapor cell 2620. BSM vapor cell 2620 has first coil 2630 wound around one end to form an electromagnet. Second coil 2640 is disposed about the opposite end of BSM vapor cell 2620 to form a second electromagnet. The windings in coil 2630 may be less numerous than that of coil 2640.

Coils 2630, 2640 preferably form a magnetic field gradient along BSM vapor cell 2620 when electrical current is applied. In general, the presence and strength of a magnetic field conditions the final transition frequency of BSM atoms. More particularly, a magnetic field may be imposed that prepares the BSM atoms to absorb entangled-photon pairs of selected sum frequencies. (Here, "sum frequency" refers to the sum of the signal photon frequency and idler photon frequency. For multiply-entangled photons, it refers to the sum of the frequencies of the photons in an entangled-photon set) BSM vapor cell 2620 absorbs entangled photon pairs of different sum frequencies at different locations due the presence of a magnetic field gradient. The embodiment of FIG. 26 accordingly allows a user to determine the sum frequency of a particular entangled photon pair, depending on the location along BSM vapor cell 2620 at which fluorescence indicative of entangled-photon absorption is detected.

A embodiment of the present invention that includes BSM vapor cell 2600 of FIG. 26 is capable of detecting information modulated into entangled-photon sum frequencies. Like other entangled-photon parameters capable of being modulated with information, the sum frequency of entangled photons is capable of existing and being measured in at least two different states. Thus, an embodiment of the present invention may transmit information steganographicly by modulating the sum frequency of entangled photons with information, transmitting the entangled photons, and detecting and discriminating the entangled photons according to sum frequency using BSM vapor cell 2600.

In such an embodiment, the sender may modulate entangled photons' sum frequency by a variety of methods. Sender portions 2070, 2270, 2570, 2770, and 2870 of FIGS. 20, 22, 25, 27, and 28, respectively, may be modified to modulate sum frequency. By way of non-limiting examples, the following may be implemented to allow for modulation of the frequency of the pump beam: a dye laser, a diode laser with varying current or temperature, a laser with a cavity whose length is adjustable by way of, e.g., a piezoelectric crystal, and a laser having an acousto-optic modulator for laser tuning. Once the frequency of the pump beam is modulated with information, it is converted into entangled photons by using, for example, a non-linear crystal. The resulting entangled photons have their associated sum frequencies modulated in accordance with the modulated pump frequency.

Embodiments of the present invention that modulate the sum frequency of entangled photons preferably include corresponding confounding light. That is, embodiments that modulate the sum frequency of entangled photons into n distinct states $\omega_1, \ldots, \omega_n$, preferably include confounding light containing photons of each of these frequencies. More preferably, such embodiments also include confounding light containing photons of the same frequencies as the individual signal and idler photons of entangled-photon pairs of each sum frequency.

In an other embodiment of BSM vapor cell 2600 of FIG. 26, a single coil is used. Such an embodiment is capable of detecting entangled photons of a selected sum frequency. The sum frequency that such an embodiment is capable of detecting is controlled by adjusting the current flowing through the single coil. The current may vary dynamically, so that such a single-coil BSM vapor cell embodiment may be used to detect multiple different sum frequencies, one at a time.

Figure 27:
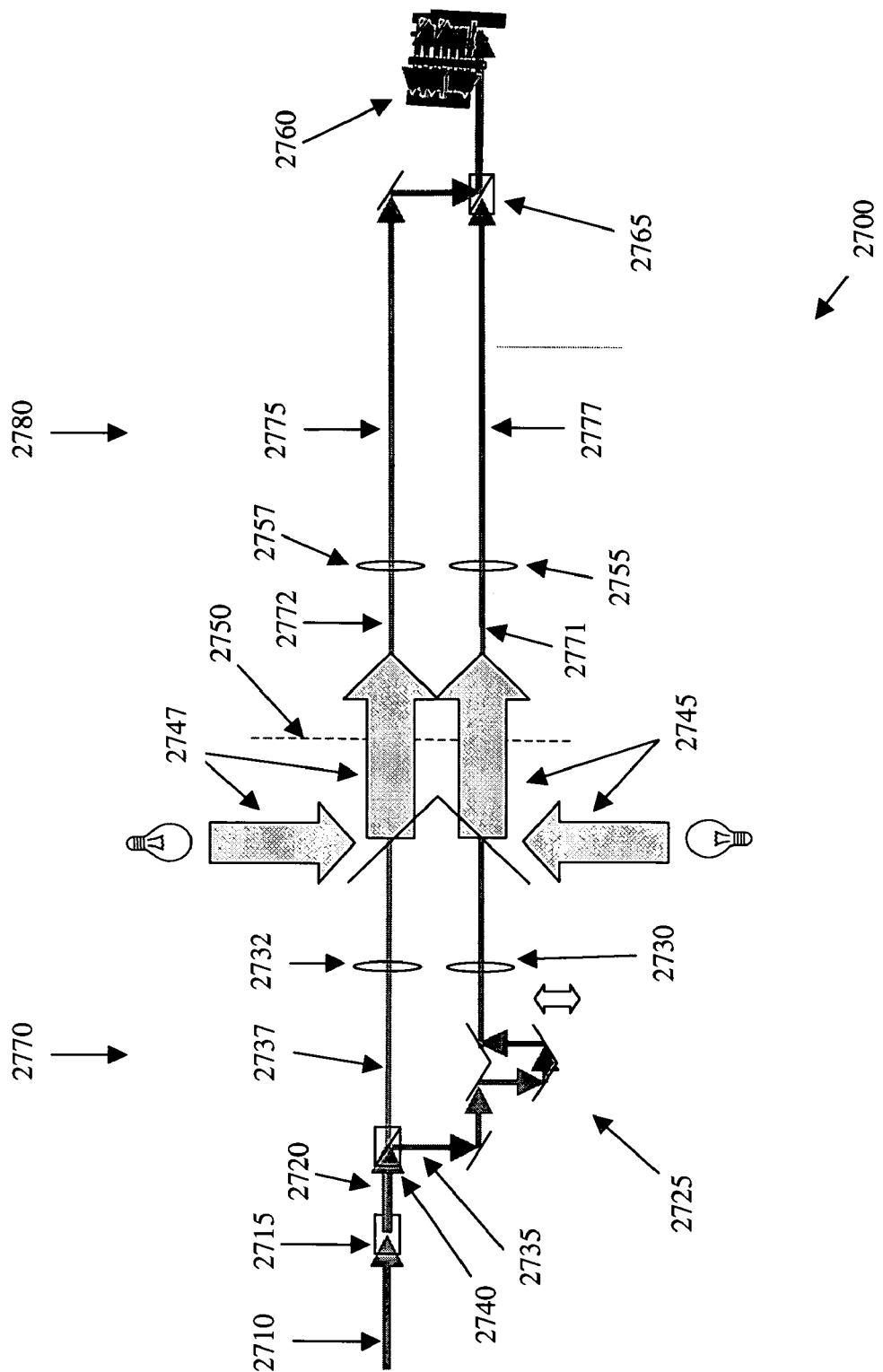
FIG. 27 depicts a quantum steganography system featuring biphoton spatial separation according to an embodiment of the present invention.

FIG. 27 depicts a quantum steganography system 2700 featuring biphoton spatial separation according to an embodiment of the present invention. System 2700 includes a sender portion 2770 and a receiver portion 2780. In sender portion 2770, pump beam 2710 is directed to nonlinear crystal 2715, which produces entangled-photon beam 2720. Polarizing beam splitter 2740 separates entangled-photon beam 2720 into signal photon beam 2737 and idler photon beam 2735. Idler photon beam 2740 is directed to controllable delay 2725 (or substitute delays 2100 of FIG. 21 or 2400 of FIG. 24). Signal photon beam 2737 and idler photon beam 2735 are each independently collimated by collimating optics 2732 and 2730, respectively. Prior to transmission to receiver portion, each of signal photon beam 2737 and idler photon beam 2735 are optionally combined with confounding light 2747, 2745, respectively. Confounding light 2747 and 2745 may be of the same type or different type. More particularly, each of confounding light 2747, 2745 may be independently obfuscatory, reverse obfuscatory, or covering, as those terms are described above in reference to FIG. 20, or may be or absent altogether.

Signal photon beam 2772 and idler photon beam 2771 are transmitted spatially separately to receiver portion 2780. Receiver portion 2780 separately collects transmitted signal photon beam 2772 and transmitted idler photon beam 2771 using focusing optics 2757 and 2755, respectively. Because the beams are transmitted separately, receiver portion 2780 should be properly aligned so as to receive both beams. Therefore, an authorized receiver is preferably informed of the location and time a signal is arriving ahead of time. Receiver portion 2780 may be aligned according to prior instructions. Alternately, or in addition, receiver portion 2780 may be aligned on-the-fly according to instructions received via information carried in entangled photons or another channel of communication.

Spatial separation of transmitted signal photon beam 2772 and idler photon beam 2771 increases an eavesdropper's difficulty in obtaining the information hidden therein. Because the constituent photons of an entangled-photon pair must arrive at a BSM molecule within their entanglement area in order to be absorbed, signal photon beam 2775 and idler photon beam 2777 must be precisely focused for the biphotons to be detected. Details of the spatial alignment constitute a security measure that is effective even if the general biphoton information transfer mechanism is known to the eavesdropper.

Figure 28:
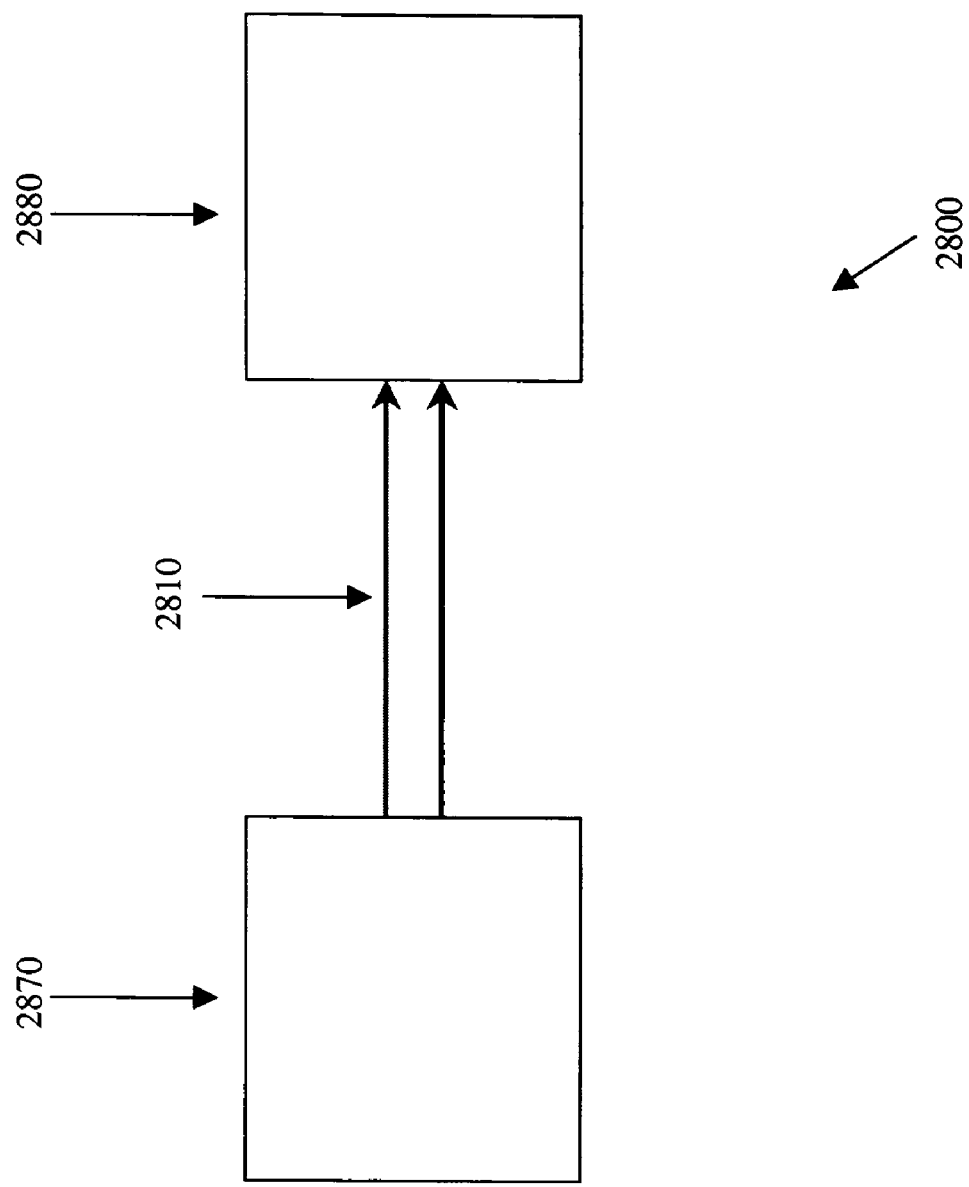
FIG. 28 depicts a generalized embodiment of the present invention in which any, or a combination, of various entangled-photon parameters are modulated with information.

FIG. 28 depicts a generalized embodiment of the present invention in which any, or a combination, of various entangled-photon parameters are modulated with information. In the embodiment of FIG. 28, sender portion 2870 modulates one or more selected entangled-photon parameter(s) with information and directs the resulting modulated entangled photons 2810 to receiver portion 2880. Receiver portion 2880 collects the modulated entangled photons and retrieves the information modulated therein by measuring the selected entangled-photon parameter(s) in at least some of the entangled photons. Receiver portion 2880 may employ one or more detectors capable of detecting and discriminating multiple states, such as serial BSM device 2300 of FIG. 23 or BSM vapor cell 2600 of FIG. 26. Alternately, or in addition, receiver portion 2880 may alter the detecting characteristics of a single detector during reception of entangled photons. Such a scheme is described above in reference to FIGS. 22 and 26.

For any of the embodiments presented herein, including the embodiment of FIG. 28, any entangled-photon parameter, not just inter-biphoton delay or entangled-photon sum frequency, may be modulated with information. All that is required is that the entangled photon parameter be capable of existing and being measured in at least two different states. By modulating the state of such a parameter associated with at least one biphoton with information, transmitting the biphoton(s), and receiving and measuring the state(s), information is effectively transferred in that entangled-photon parameter.

Entangled-photon parameters that may be modulated with information in the embodiment of FIG. 28 include: the allocation of photon energy between signal photon and idler photon $\delta$, entanglement time $T_e$, inter-beam delay time $\tau$, the relative polarizations of the constituent photons of entangled-photon pairs, the sum frequency of entangled-photon pairs, the relative locations of the constituent photons of entangled-photon pairs, and relative momentums of the constituent photons of entangled-photon pairs. BSM materials may be engineered to absorb, detect, and distinguish entangled photons having such parameters in different states while keeping the absorption probability for random photon pairs and single photons extremely low. Moreover, these properties can be modulated without changing the detectible properties of the individual biphotons. Like inter-biphoton delay, these parameters are relative properties of an entangled photon pair and as such can generally only be determined by a receiver if both members of the pair are detected. One of ordinary skill in the art would appreciate that each of the properties discussed in this paragraph may be generalized to entangled photon triples, quadruples, etc.

Multiple bits of information may be transmitted in a single entangled-photon pair in the embodiment of FIG. 28. Such multiple bits maybe encoded in a single entangled-photon parameter that is capable of existing in multiple distinct measurable states. For such a parameter, sender portion 2870 employs multi-state modulation. Alternately, multiple bits of information may be transmitted in a single entangled-photon pair encoded in multiple entangled-photon parameters. By way of non-limiting example, both inter-biphoton delay and sum frequency may be modulated. Continuing this example, both the inter-biphoton delay and the sum frequency parameters may accept two-state encoding. Hence, a single entangled-photon pair may be configured into any one of four (4) different states: two different inter-biphoton delay states and two different sum frequency states. Sender portion 2870 may modulate these parameters by employing a dye laser to modulate sum frequency and a controllable delay, such as 2100 of FIG. 21, to modulate inter-biphoton delay. Receiver portion may use a two-stage serial BSM device, such as a modified embodiment of 2300 of FIG. 23. More particularly, such a two-stage serial BSM device may include two BSM vapor cells capable of detecting and distinguishing the two sum frequency modulation states, such as 2600 of FIG. 26, separated by a delay, such as birefringent crystal 2315 of FIG.

23 or controllable delay 2025 of FIG. 20. The state of the inter-biphoton delay of a detected biphoton may be ascertained by noting which BSM vapor cell absorbs the entangled photon, and the state of the sum frequency of the same detected entangled-photon pair may be ascertained by examining where within the BSM vapor cell the entangled photon is absorbed. The above example is non-limiting; any combination of entangled-photon parameters may be modulated into any number of states. Note that in general, any set of parameters collectively capable of existing and being measured in n different states in the same entangled-photon pair allow such an entangled-photon pair to carry $\lfloor \log_2 n \rfloor$ bits of information, where the brackets denote the integer part of the number contained therein.

Embodiments of the present invention may employ hopping of any of the entangled photon parameters that are amenable to modulation. Such "parameter hopping" encompasses changing one or more encoding conventions during entangled-photon transmission. For the embodiment of FIG. 28, selected parameters of a single entangled-photon pair (or triple, quadruple, etc.) may be in any one of several different collective states. Parameter hopping allows for changing the convention associating particular collective states with particular information values during entangled-photon transmission.

By way of non-limiting example, an embodiment of the present invention may modulate inter-biphoton delay into one of two states, represented as $\Delta t_1$ and $\Delta t_2$, and modulate sum frequency into one of three states, represented as $\Sigma_1$, $\Sigma_2$, and $\Sigma_3$. In such an embodiment, a single entangled-photon pair may exist in any of six (6) possible collective states, which may be represented as: $(\Delta t_1, \Sigma_1)$, $(\Delta t_1, \Sigma_2)$, $(\Delta t_1, \Sigma_3)$, $(\Delta t_2, \Sigma_1)$, $(\Delta t_2, \Sigma_2)$, and $(\Delta t_2, \Sigma_3)$. The following parameter-hopping scheme may be implemented. For the first two entangled-photon pairs transmitted, the state $(\Delta t_1, \Sigma_1)$ corresponds with bit value zero (0), the states $(\Delta t_1, \Sigma_3)$ and $(\Delta t_2, \Sigma_1)$ correspond with bit value one (1), and the remaining states are undefined. For the next two entangled-photon pairs transmitted, the states $(\Delta t_2, \Sigma_1)$, $(\Delta t_2, \Sigma_2)$, and $(\Delta t_2, \Sigma_3)$ correspond with bit value zero (0), the states $(\Delta t_1, \Sigma_1)$ and $(\Delta t_1, \Sigma_3)$ correspond with bit value one (1), and the remaining states are undefined. According to this parameter-hopping scheme, the sequential transmission of entangled photons in collective states $(\Delta t_1, \Sigma_1)$, $(\Delta t_2, \Sigma_1)$, $(\Delta t_2, \Sigma_1)$, and $(\Delta t_1, \Sigma_3)$ yields the following bit sequence: ( 0, 1, 0, 1).

Note that parameter hopping may be dynamic or preset. As with delay-hopping as described above in reference to FIG. 22, dynamic parameter hopping has the advantage of requiring an eavesdropper to possess very efficient intercept and retransmit capability in order to launch a man-in-the-middle attack. Coupled with low-intensity biphoton transmission, such parameter hopping ensures that the messages conveyed by way of entangled photons are effectively intercept-proof.

For any of the embodiments presented herein, including the embodiment of FIG. 28, quantum-mechanically entangled particles other than photons may be used. Such particles include, by way of non-limiting example, atoms, ions, nuclear particles, quantum dots, electrons, electron holes, positrons, and excitons. Each of these particles may be entangled with one or more of the same kind of particles or with one or more different types of particles. That is, two or more types of particles may be entangled together. By way of non-limiting example, pairs of particles that may be entangled together include: atom entangled with atom, atom entangled with photon, ion entangled with ion, ion entangled with photon, atom entangled with ion, quantum dot entangled with quantum dot, quantum dot entangled with photon, electron entangled with electron hole, electron entangled with positron, exciton entangled with exciton, exciton entangled with photon, electron entangled with atom, electron entangled with ion, and molecule entangled with photon. Entangled particle triples, quadruples, etc. are also contemplated where two or more types of particles are entangled together. Properties of particles referred to in this paragraph that may be modulated with information include inter-particle delay, entanglement time, relative frequencies, relative polarizations, sum frequency, relative locations, momentum, spin, and other quantum mechanical parameters.

Although the embodiment represented by FIG. 28 depicts two modulated entangled photons 2810, any number of modulated entangled photons (or other particles) may be used to convey information.

Figure 29:
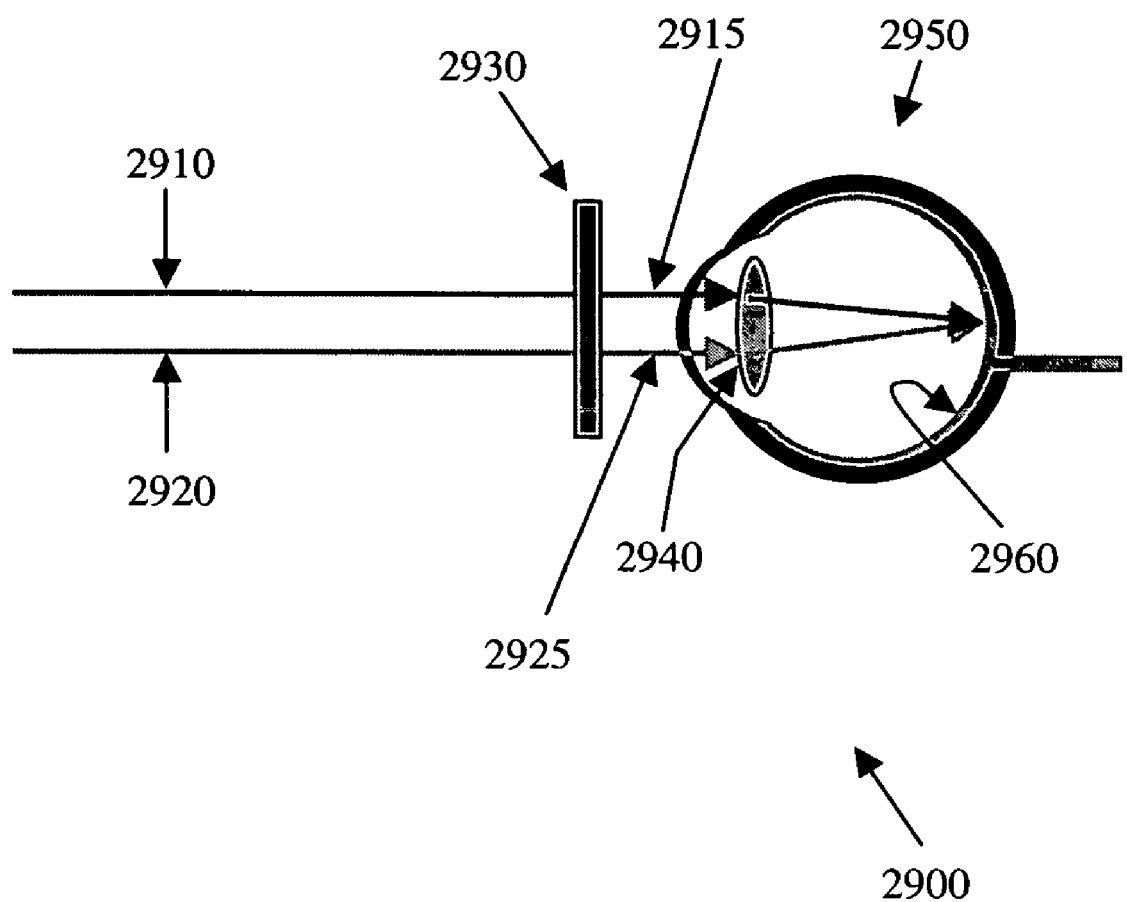
FIG. 29 depicts an embodiment of the present invention in which the human eye detects entangled photons directly.

FIG. 29 depicts an embodiment of the present invention 2900 in which the human eye detects entangled photons directly. The embodiment of FIG. 29 includes a sender portion (not shown) and a receiver portion 2900. The sender portion may be any of sender portions 2070, 2270, 2570, 2770, or 2870 of FIGS. 20, 22, 25, 27, and 28, respectively. Most of the sophisticated equipment of the embodiment of FIG. 29 resides at the sender portion. Preferably, the sender portion implements a two-state modulation of the inter-biphoton time interval. That is, preferably the entangled photons are modulated by configuring each inter-biphoton time interval as one of two states: $\Delta t_1$ and $\Delta t_2$. For example, the two states could be no delay or a delay of $\Delta t$ (e.g., $\Delta t_1 = 0$ and $\Delta t_2 = \Delta t$), or the two states could be two different non-zero delays (e.g., $\Delta t_1 = \Delta t$ and $\Delta t_1 = 2\Delta t$). The quantity $\Delta t$ is preferably greater than the entanglement time, but any $\Delta t$ may be substituted above. After modulation, the sender portion transmits signal photon beam 2910 and corresponding idler photon beam 2920 to receiver portion 2900.

Receiver portion 2900 may include a pair of spectacles with lenses made of birefringent crystal 2930. Signal photon beam 2910 and corresponding idler photon beam 2920 transmitted from the sender portion pass through birefringent crystal 2930. Birefringent crystal 2930 is configured to delay one of the constituent photons in each entangled photon pair. More particularly, where sender portion modulates the inter-biphoton delay of each entangled-photon pair as either $\Delta t_1$ or $\Delta t_2$, birefringent crystal 2930 delays one of the constituent photons such that one of $\Delta t_1$ and $\Delta t_2$ is converted to zero (0) and the other of $\Delta t_2$ or $\Delta t_1$ may be converted to a quantity greater than the entanglement time. Thus, birefringent crystal 2930 brings one of the delays to within the entanglement time, thereby enabling entangled two-photon absorption. Birefringent crystal 2930 further may ensure that at least one of the other delay(s) are greater than the entanglement time, thereby preventing entangled two-photon absorption.

After passing through birefringent crystal 2930, signal photon beam 2915 and idler photon beam 2925 intercept a receiving individual's eye 2950. In the receiving individual's eye, lens 2940 focuses signal photon beam 2915 and idler photon beam 2925 onto retina 2960. Birefringent crystal 2930 allows the receiving individual to see properly-configured entangled photons. The pump beam in the sender portion is preferably visible violet light, e.g., 405 nm wavelength light. When converted into two entangled-photon beams, both signal photon beam 2910 and idler photon beam 2920 may be chosen to be in the near infrared, e.g., 800 nm and 820 nm wavelengths, respectively. Each of signal photon beam 2910 and idler photon beam 2920 are therefore invisible to the unaided human eye. An infrared sensor relying on classical physics would detect only light with no apparent modulation. On the other hand, human retina 2960 is capable of undergoing entangled-photon absorption. Thus, signal photons 2910 and corresponding idler photons 2920 that arrive at retina 2960 within the entanglement time will combine and undergo entangled-photon absorption. The human observer will accordingly see such entangled photons as violet light. Signal photons 2910 and corresponding idler photons 2920 that arrive at retina 2960 separated by an inter-biphoton delay greater than their entanglement time will not undergo entangled-photon absorption and will remain invisible to the unaided human eye. Birefringent crystal 2930 allows the receiving individual to see entangled photons having a particular inter-biphoton delay and not see the other entangled photons. Thus, the receiving individual sees the information contained in biphoton's inter-biphoton time interval as the presence or absence of violet light. The embodiment of FIG. 20 may thus employ on-off encoding. Morse code may be used as a signaling protocol for this embodiment.

In an embodiment of the present invention, birefringent crystal 2930 of FIG. 29 is used in a telescope or other optical device. Birefringent crystal 2930 is not limited to use within spectacles for the embodiment of FIG. 29. By way of non-limiting example, a receiving individual may use a telescope, binoculars, or other optical device to ascertain information contained in inter-biphoton time intervals. Alternately, or in addition, the receiver portion 2900 may be automated by using properly-configured hardware in place of the human eye. In yet another embodiment, engineered fluorescent material may be included directly into retina 2960. In such an embodiment, the receiving individual would detect entangled-photon absorption as a flash of visible light. One advantage of this embodiment is that not only the constituent entangled photons, but also the biphoton pump frequency (and therefore constituent photon sum frequency), may be chose to be invisible to the unaided human eye.

Embodiment of the present invention do not require a BSM. Such embodiments may use a material that suppresses random multiple-photon absorption using techniques that do not rely on constructive or destructive interference as employed by a BSM. As illustrated above by equations (2) and (5), in general, random multiple-photon absorption rates are quadratic in incident flux while entangled multiple-photon rates are linear in incident flux. That is, random multiple photon absorption rates contain a squared term that represents flux while entangled multiple-photon absorption rates contain the same term without the square. At least for fluxes below the critical flux $\phi_c$ (described above in reference to equation (5)), constructive or destructive interference is not required in order to suppress random multiple-photon absorption. Embodiments that rely on the techniques described in this paragraph generally transmit and receive entangled photons having a total flux that is less than the critical flux. However, other fluxes may also be used.

In embodiments of the present invention, the designation of information states corresponding to binary bits zero (0) or one (1) is arbitrary. That is, in any embodiment as described herein, the bit value of zero (0) may be interchanged with the bit value of one (1) as long as such interchange is done consistently.

A serial detector embodiment according to the present invention that replaces birefringent crystals 2315, 2320 in the embodiment of FIG. 23 with alternate delays is contemplated. In such an embodiment, birefringent crystals 2315, 2320 may be replaced with a number of delays that include two PBSs, such as controllable delay 2025 of FIG. 20.

Embodiments of the present invention are contemplated in which each party employs both a sender portion and a receiver portion. In such embodiments, two-way quantum steganographic communication is possible.

In addition to the steganographic techniques disclosed herein, encryption may also be employed. See U.S. Provisional Patent Application No. 60/529,743, filed Dec. 17, 2003, to Conti et al. entitled "Quantum Key Distribution."

Embodiments of the present invention may be used as part of quantum cryptography protocols. Quantum key distribution ("QKD") protocols, for example, are types of quantum cryptography protocols that require information to be transmitted between the participants. Some of this information is transmitted in a quantum channel and some is transmitted in a classical, or "public" channel. The classical channel is typically used to assess disturbances in the quantum channel in order to determine the extent of any noise or eavesdropping. If it is determined statistically that eavesdropping has not occurred, the participants select a body of information from that which is transmitted over the quantum channel in order to form a key that, with a high probability, is known only to them and not to an eavesdropper. A variety of QKD protocols are known, such as BB84, B92, 4+2, Six State, Ekert scheme, and Goldenberg/Vaidman class. By way of non-limiting example, the following describe QKD protocols that employ both a quantum channel and a classical channel: the so-called BB84 protocol, described in C. H. Bennett and G. Brassard, Quantum Cryptography: Public Key Distribution and Coin Tossing, Proceedings of the IEEE International Conference on Computers, Systems and Signal Processing, IEEE, New York, pp. 175-179 (1984), A. K. Eckert, Quantum Cryptography Based on Bell's Theorem, Physical Review Letters, The American Physical Society (1991), and certain protocols described in U.S. Provisional Patent Application No. 60/529, 743, filed Dec. 17, 2003, to Conti et al. entitled "Quantum Key Distribution."

Embodiments of the present invention may be employed as part of these and other protocols in order to convey the information that would typically be conveyed over the classical channel. By way of non-limiting example, the same quantum channel that conveys quantum information in such protocols may be used to convey information manifested in entangled-photon parameters as disclosed herein. A quantum steganography channel as disclosed herein may thus take the place of the classical channel required by many quantum cryptography protocols. Embodiments of the present invention may be used to reduce the number of channels required in quantum cryptography implementations. Moreover, using embodiments of the present invention to convey information that is typically conveyed in a classical channel reduces the amount of information that is available to eavesdroppers, thus fortifying the security of the quantum cryptography protocols so-modified.

In embodiments of the present invention in which entangled photons' sum frequency is modulated as discussed above in reference to FIG. 26, an electric field gradient may be used instead of a magnetic field gradient.

In embodiments of the present invention, multiply-entangled photon absorption may be detected. Multiply-entangled photons are three or more photons entangled together. By way of non-limiting example, entangled photon triples (three photons entangled together) or quadruples (four photons entangled together) may be used. Multiply-entangled photons consisting of greater than four photons may also be used. Those of ordinary skill in the art will appreciate that the techniques disclosed herein may be used to detect multiply-entangled photons without detecting one or multiple random photons. The term "entangled photons" refers to both multiply-entangled photons and to entangled photon pairs Entangled photons may be produced according to a variety of methods. Those of ordinary skill in the art are capable of producing entangled-photon pairs, triples, etc. By way of non-limiting example, entangled photons may be produced according to types I or II parametric down-conversion. Biphotons whose constituent signal and idler photons are orthogonally polarized may be used as well as biphotons whose constituent signal and idler photons are polarized in parallel. For type-I downconversion, signal photons may be separated from idler photons (and recombined with idler photons) using dichroic mirrors. For both types of downconversion, signal photons and idler photos may be selected as they exit the biphoton source by providing apertures at the appropriate angles. Any nonlinear crystal, not limited to BBO, may be used. Other ways to produce entangled photons include: excited gasses, materials without inversion symmetry, and generally any properly phase-matched medium. Entangled-photon production consistent with this disclosure is not limited to using BBO or any other particular non-linear crystal. Furthermore, the entangled photons are not limited to any particular wavelength or frequency.

In other embodiments of the present invention, various indicia of entangled-photon absorption may be used to detect entangled photons. By way of non-limiting example, entangled-photon absorption may result in fluorescence, phosphorescence, direct electron transfer, or ionization of the absorbing material. Detecting fluorescence, phosphorescence, direct electron transfer, or ionization may be used to detect entangled-photon absorption. Also by way of non-limiting example, avalanche photodiodes, photo multiplier tubes (PMT), or other devices may be used to detect the fluorophotons, ionization, direct electron transfer, or other absorption indicia.

In other embodiments of the invention, the BSM is not limited to $^{87}$Rb. By way of non-limiting example, any material with appropriately structured energy levels, such as cesium-133 ($^{133}$Cs) or other alkalis may be used. Preferably, such materials are those with a very narrow multi-photon absorption linewidth. More preferably, such materials are those with a very narrow multi-photon transition to an excited state that decays through a path that includes a radiative transition. Appropriate BSM materials may be in solid, liquid, gaseous, or plasma states. Colloids are also contemplated. In some embodiments of the present invention, quantum dots may be used. Further, embodiments of the invention are not limited to any particular ETPA or RTPA electron energy level transition. Pump, signal, and idler photon frequencies and wavelengths may vary from those disclosed herein.

Generally, random photon rejection not absolute and not all entangled photons are detected. Preferably, the BSM absorbs no more than 10% of random photons directed to it. More preferably, the BSM absorbs no more than 1% of random photons directed to it. Still more preferably, the BSM absorbs no more than 0.1% of the random photons directed to it. Even more preferably, the BSM absorbs no more than 0.01% of entangled photons directed to it. Depending on, inter alia, the entangled photon rate, the absorption rate of random photons may be made as small as one wishes within the constraints of native dark noise in the detector. For some embodiments, random photon absorption rates of less than 10% are acceptable. Regarding entangled-photon absorption, preferably, at least 20% of entangled photons directed to the BSM are absorbed. More preferably, between 20% and 90% of entangled photons directed to the BSM are absorbed. Still more preferably, at least 90% of entangled photons directed at the BSM are absorbed. Even more preferably, at least 99% of entangled photons directed to the BSM are absorbed. Entangled photon absorption rates of up to about 99.99% of are contemplated for some embodiments. Regarding differences between ETPA and RTPA cross sections, preferably, the ETPA cross-section is greater than the RTPA cross-section by an order of magnitude. More preferably, the ETPA cross-section is greater than the RTPA cross-section by two or more orders of magnitude. It is contemplated, however, that for some embodiments of the present invention an the ETPA cross-section greater than the RTPA cross-section by less than one order of magnitude will suffice. In those embodiments an ETPA/RTPA cross-section difference that produces an observable difference in absorbing entangled photons versus absorbing random photons may suffice. Note also that the ratio of random photon absorption to entangled-photon absorption rates is a function of, inter alia, the spread of frequencies (i.e., bandwidth) of signal photons. This ratio is also a function of, inter alia, the idler photon bandwidth. Preferably, the frequency spread of signal (and idler) photons is small.

Embodiments of the present invention may employ standard error correction techniques. These techniques can ameliorate both random photon detection (false positives) and failures to detect entangled photons (false negatives). By way of non-limiting example, such error correction techniques include turbo codes, Reed-Solomon codes, BCH codes, linear codes, or cyclic codes.

The equations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

The particular optical manipulation devices depicted herein are illustrative and representative and are not meant to be limiting. By way of non-limiting example, prisms, apertures, filters, optical fiber, lenses, and particular lasers disclosed herein may be replaced with devices known to those of ordinary skill in the art.

As recited herein, the terms "sending" (or "transmitting") and "receiving" are meant to be interpreted broadly. By way of non-limiting example, both sending (or transmitting) and receiving may take place in the same physical apparatus, location, or environment. Alternately, sending (or transmitting) can occur at a first location and receiving can occur at a second location that is physically separated from the first. Transmission from one terrestrial point to another terrestrial point, from one terrestrial point to a vehicle, from a vehicle to a terrestrial point, or between vehicles is contemplated. In addition, transmission between a terrestrial point or vehicle and a satellite in Earth's orbit is also contemplated.

Other embodiments of the present invention may calculate entanglement area Ae according to the following, which describes a non-limiting exemplary technique for such computation. It is typically possible to calculate fourth-order correlation height and width coefficients. In the direction defined by the x-axis, and for a given signal photon at location xs, the idler photon in location xi will generally arrive within $\Delta x$ of xs (i.e., $xi = xs \pm \Delta x$). Similarly, in the z-axis direction, and for a given signal photon at location zs, the idler photon in location zi will arrive within $\Delta z$ of zs (i.e., $zi = zs \pm \Delta z$). The quantities $\Delta x$ and $\Delta z$ may generally be computed using fourth-order correlation theory. The entanglement area Ae may be derived as the product of $\Delta x$ and $\Delta z$ (i.e., $Ae = \Delta x \Delta z$).

Other embodiments of the present invention may calculate entanglement time according to the following, which describes a non-limiting exemplary technique. Entanglement time $T_e$ may be calculated as a function of crystal length l. In particular, entanglement time may be described as $T_e=l/[2(1/v_i c-1/v_s c)]$, where $v_s$, $v_i$ are the group velocities of the signal and idler photons, respectively, and c is the speed of light in a vacuum.

Embodiments of the present invention may delay one photon in various ways. By way of non-limiting example, a length of optical fiber may be inserted into the path of one or both photons. Alternately, sets of mirrors may be used to increase the path length of one or both photons. Other techniques for delaying one or more photons may also be used.

Embodiments of the present invention may introduce an inter-biphoton delay greater than the entanglement time in order to ensure that, without further adjustment (e.g., removing the delay), the entangled photon pair does not undergo entangled-photon absorption. Alternately, or in addition, an entangled photon pair may be configured not to undergo entangled photon absorption without further processing by selecting its parameters to minimize the probability of absorption. That is, inter-biphoton delays less that the entanglement time that nevertheless generally prevent entangled photon absorption may be selected. By way of non-limiting example, the valleys or low points of FIGS. 7-10 and 17 identify such parameters.

Note that this disclosure follows standard physics notational conventions. By way of non-limiting example, in some places Planck's constant h and the speed of light c are both considered to be one (1) for the purpose of calculations. This convention allows, inter alia, for common units for frequency and energy, as well as common units for time and distance. This notational convention is accounted for after calculations have been performed in order to deduce correct units for application purposes. This disclosure also uses Dirac bracket notation (e.g., $|\psi_i\rangle$), known to those of ordinary skill in the art, to denote quantum states.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses.

We claim:

1. A method of detecting at least one bit of information, the bit of information being manifested on entangled photons, the method comprising:
  producing entangled photons, the entangled photons comprising a first photon and a second photon, the first photon entangled with the second photon;
  modulating at least one bit of information onto at least one entangled photon parameter to produce modulated entangled photons, wherein the parameter is an entanglement time, a relative frequency of the first photon and the second photon, a polarization of the first photon and the second photon, a sum of frequencies of the first photon and the second photon, or a momentum of the first photon and the second photon;
  transmitting the modulated entangled photons;
  receiving at least a portion of the modulated entangled photons;
  detecting a value of the at least one entangled photon parameter in at least one set of entangled photons received by said receiving, wherein said detecting comprises detecting an entangled photon absorption by a material configured to absorb entangled photons and be substantially transparent to random photons; and
  discerning the at least one bit of information based on said detecting.

2. The method of claim 1 wherein said detecting comprises detecting an entangled photon absorption by a biological material.

3. The method of claim 1 wherein said transmitting comprises transmitting a plurality of random photons.

4. The method of claim 3 wherein the plurality of random photons comprises a plurality of random photons intended to provide one of: obfuscatory light, reverse obfuscatory light, and covering light.

5. The method of claim 1 further comprising parameter hopping.

6. The method of claim 5 wherein said parameter hopping is dynamic.

7. The method of claim 5 wherein said parameter hopping is preset.

8. The method of claim 1 wherein the at least one bit of information is used in a quantum cryptography protocol.

9. A method of detecting at least one bit of information, the at least one bit of information being carried by entangled photons, the method comprising:
  receiving a plurality of photons, the plurality of photons including at least one set of photons entangled together, wherein the at least one set of photons entangled together comprise a first photon and a second photon, the first photon entangled with the second photon, the at least one set of photons entangled together having information modulated onto at least one entangled photon parameter, wherein the parameter is an entanglement time, a relative frequency of the first photon and the second photon, a polarization of the first photon and the second photon, a sum of frequencies of the first photon and the second photon, or a momentum of the first photon and the second photon, the plurality of photons being transmitted from a sender;
  detecting an entangled photon absorption, wherein said detecting an entangled photon absorption comprises detecting an entangled photon absorption by a material configured to absorb entangled photons and be substantially transparent to random photons; and
  deducing a state of the at least one entangled photon parameter of the at least one set of photons entangled together;
  wherein said deducing reveals at least one bit of information modulated onto the at least one set of photons entangled together.

10. The method of claim 9 wherein said detecting an entangled photon absorption comprises detecting an entangled photon absorption by a biological material.

11. The method of claim 9 wherein said receiving a plurality of photons comprises receiving a plurality of random photons transmitted by the sender.

12. The method of claim 11 wherein the plurality of random photons are modulated with information.

13. The method of claim 11 wherein the plurality of random photons comprises a plurality of random photons intended to provide one of: obfuscatory light, reverse obfuscatory light, and covering light.

14. The method of claim 9 further comprising parameter hopping.

15. The method of claim 14 wherein said parameter hopping is dynamic.

16. The method of claim 14 wherein said parameter hopping is preset.

17. The method of claim 9 wherein the at least one bit of information is used in a quantum cryptography protocol.

18. A method of transmitting at least one bit of information, the at least one bit of information being carried by entangled photons, the method comprising:
   producing a plurality of sets of photons entangled together, each set of photons entangled together comprising a first photon and a second photon, the first photon entangled with the second photon, the sets of photons entangled together having at least one entangled photon parameter;
   modulating with information, for at least one of the plurality of sets of photons entangled together, the at least one entangled photon parameter, wherein the parameter is an entanglement time, a relative frequency of the first photon and the second photon, a polarization of the first photon and the second photon, a sum of frequencies of the first photon and the second photon, or a momentum of the first photon and the second photon; and
   transmitting a plurality of photons including the plurality of sets of photons entangled together to a recipient;
   wherein the recipient of the plurality of photons determines at least one bit of the information by deducing a state of the at least one entangled photon parameter in at least one set of photons entangled together by detecting an entangled photon absorption by a material configured to absorb entangled photons and be substantially transparent to random photons.

19. The method of claim 18 wherein the plurality of photons comprises a plurality of random photons.

20. The method of claim 19 wherein the plurality of random photons are modulated with information.

21. The method of claim 19 wherein the plurality of random photons comprises a plurality of random photons intended to provide one of: obfuscatory light, reverse obfuscatory light, and covering light.

22. The method of claim 18 further comprising parameter hopping.

23. The method of claim 22 wherein said parameter hopping is dynamic.

24. The method of claim 22 wherein said parameter hopping is preset.

25. The method of claim 18 wherein the at least one bit of information is used in a quantum cryptography protocol.

26. A method of receiving information, the information carried by a plurality of entangled photon sets, each of the plurality of entangled photon sets configured to be in one of at least two configurations, each of the configurations representing particular information, the method comprising:
   providing a first medium suitable for entangled-photon absorption of entangled photons having a first set of properties, wherein the first medium is substantially transparent to random photons;
   providing a second medium suitable for entangled-photon absorption of entangled photons having a second set of properties, wherein the second medium is substantially transparent to random photons;
   receiving a plurality of photons;
   directing the plurality of photons to the first medium; and
   directing the plurality of photons to the second medium;
   wherein an entangled-photon absorption by the first medium indicates first information and an entangled-photon absorption by the second medium indicates second information.

27. The method of claim 26 further including processing the plurality of photons after said directing the plurality of photons to the first medium and before said directing the plurality of photons to the second medium.

28. The method of claim 27 wherein said processing comprises delaying a portion of the plurality of photons.

29. The method of claim 26 wherein the information is used in a quantum cryptography protocol.

30. A system for receiving information conveyed in entangled photons, the system comprising:
   optics for receiving entangled photons;
   means for determining the state of at least one entangled photon parameter using a material that is substantially transparent to random photons, wherein the at least one entangled photon parameter is an entanglement time of an entangled photon set, a relative frequency of a first photon and a second photon, a polarization of at least one of a first photon and a second photon, a sum of frequencies of a first photon and a second photon, or a momentum of a first photon and a second photon; and
   a computer coupled to said means for determining, said computer configured to report information conveyed by the state of the at least one entangled photon parameter.

31. The system of claim 30 wherein the information is used in a quantum cryptography protocol.

32. A method of detecting at least one bit of information, the bit of information being manifested on entangled particles, the method comprising:
   producing entangled particles;
   modulating at least one bit of information onto at least one entangled particle parameter to produce modulated entangled particles, wherein said modulating comprises modulating entanglement time, relative frequencies, relative polarizations, sum frequency, momentum, or spin;
   transmitting the modulated entangled particles;
   receiving at least a portion of the modulated entangled particles;
   detecting a value of the at least one entangled particle parameter in at least one set of entangled particles received by said receiving, wherein said detecting comprises detecting an absorption of entangled particles by a material configured to absorb entangled particles and be substantially transparent to random particles; and
   discerning the at least one bit of information based on said detecting.

33. The method of claim 32 wherein the entangled particles include one or more atom, ion, nuclear particle, quantum dot, electron, electron hole, positron, exciton, or photon.

34. A method of detecting at least one bit of information, the at least one bit of information being carried by entangled particles, the method comprising:
   receiving a plurality of particles, the plurality of particles including at least one set of particles entangled together, the at least one set of particles entangled together having information modulated onto at least one entangled particle parameter, wherein the entangled particle parameter is entanglement time, relative frequencies, relative polarizations, sum frequency, relative locations, momentum, or spin, the plurality of particles being transmitted from a sender;
   detecting the at least one set of particles entangled together, wherein said detecting comprises detecting an absorntion of entangled particles by a material configured to absorb entangled particles and be substantially transparent to random particles; and deducing a state of the at least one entangled particle parameter of the at least one set of particles entangled together;

wherein said deducing reveals at least one bit of information modulated onto the at least one set of particles entangled together.

35. The method of claim 34 wherein the at least one set of particles entangled together includes one or more atom, ion, nuclear particle, quantum dot, electron, electron hole, positron, exciton, or photon.

36. A method of transmitting at least one bit of information, the at least one bit of information being carried by entangled particles, the method comprising:

producing a plurality of sets of particles entangled together, the sets of particles entangled together having at least one entangled particle parameter, wherein the entangled particle parameter is entanglement time, relative frequencies, relative polarizations, sum frequency, momentum, or spin;

modulating with information, for at least one of the plurality of sets of particles entangled together, the at least one entangled particle parameter; and transmitting a plurality of particles including the plurality of sets of particles entangled together to a recipient;

wherein the recipient of the plurality of particles determines at least one bit of the information by deducing a state of the at least one entangled particle parameter in at least one set of particles entangled together by detecting an absorption of the at least one set of particles entangled together by a material configured to absorb entangled particles and be substantially transparent to random particles.

37. The method of claim 36 wherein the at least one set of particles entangled together includes one or more atom, ion, nuclear particle, quantum dot, electron, electron hole, positron, exciton, or photon.

* * * * *